May 24, 1966    O. L. MacSORLEY ETAL    3,253,131
ADDER

Filed June 30, 1961    46 Sheets-Sheet 1

INVENTORS
FRANK R. BIELAWA
OLIN L. MacSORLEY
BY Thomas & Crickenberger
ATTORNEYS May 24, 1966 O. L. MacSORLEY ETAL 3,253,131
ADDER
Filed June 30, 1961 46 Sheets-Sheet 2

May 24, 1966  O. L. MacSORLEY ETAL  3,253,131
ADDER

Filed June 30, 1961  46 Sheets-Sheet 12

May 24, 1966  O. L. MacSORLEY ETAL  3,253,131

ADDER

Filed June 30, 1961  46 Sheets-Sheet 17

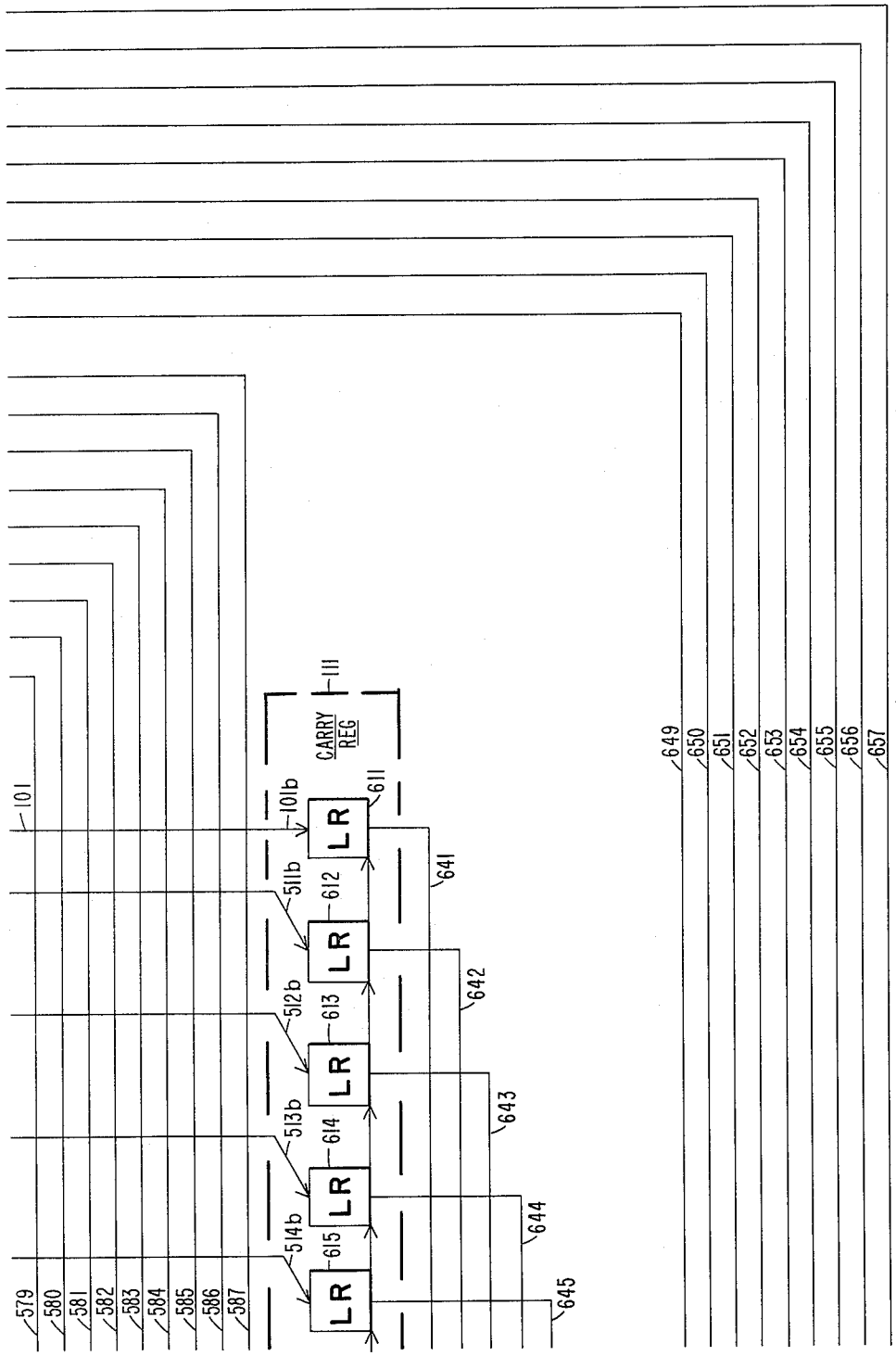

May 24, 1966  O. L. MacSORLEY ET AL  3,253,131
ADDER
Filed June 30, 1961  46 Sheets-Sheet 23
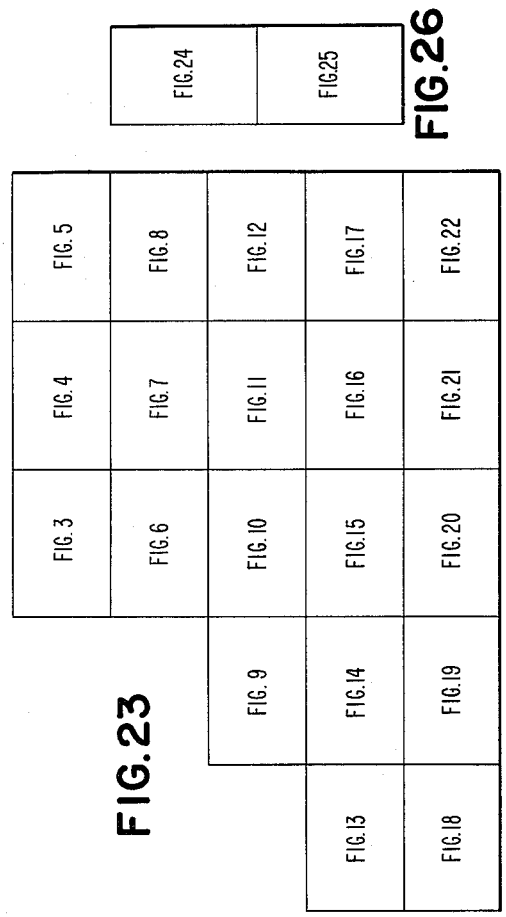
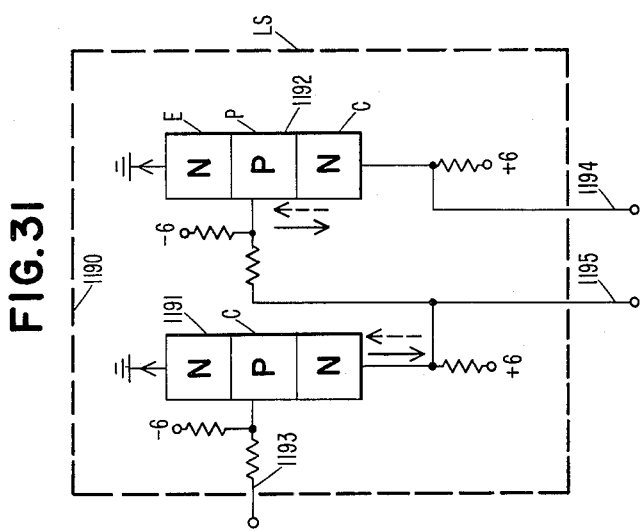

May 24, 1966    O. L. MacSORLEY ETAL    3,253,131
ADDER

Filed June 30, 1961    46 Sheets-Sheet 24

May 24, 1966    O. L. MacSORLEY ET AL    3,253,131
ADDER
Filed June 30, 1961    46 Sheets-Sheet 25

May 24, 1966  O. L. MacSORLEY ET AL  3,253,131
ADDER
Filed June 30, 1961  46 Sheets-Sheet 27

May 24, 1966    O. L. MacSORLEY ET AL    3,253,131
ADDER
Filed June 30, 1961      46 Sheets-Sheet 28

May 24, 1966   O. L. MacSORLEY ETAL   3,253,131
ADDER
Filed June 30, 1961   46 Sheets-Sheet 29
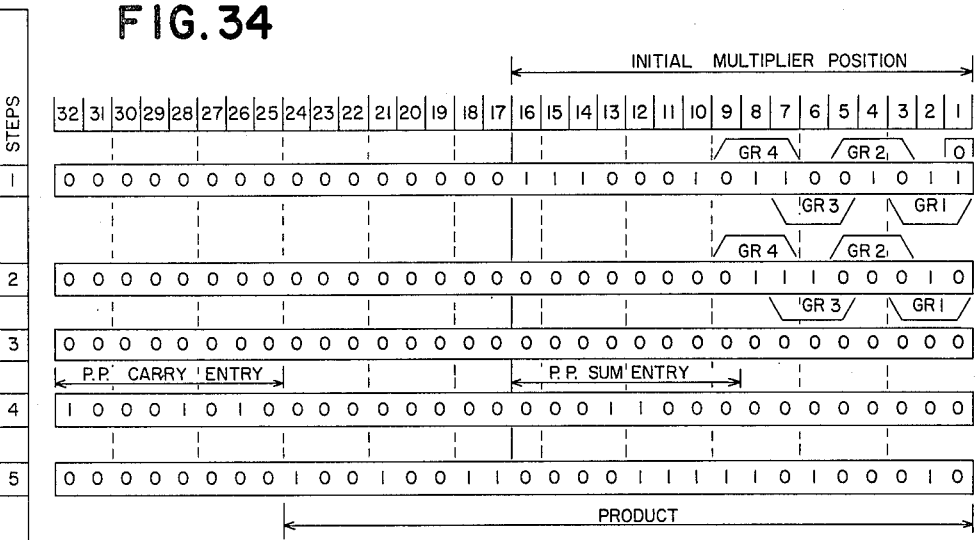
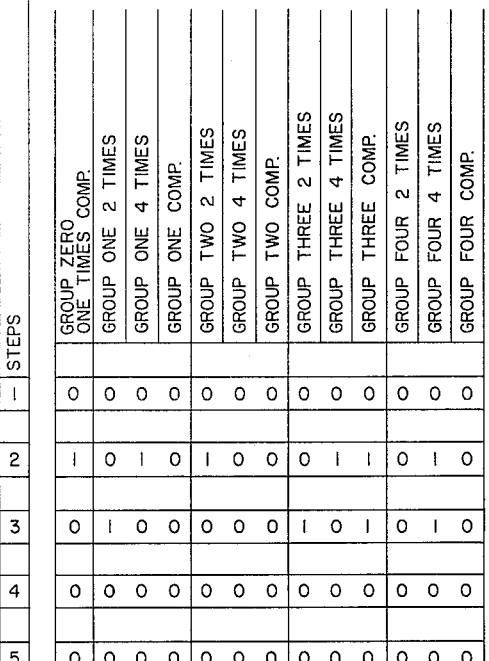
FIG.36

FIG. 35

May 24, 1966  O. L. MacSORLEY ETAL  3,253,131
ADDER

Filed June 30, 1961  46 Sheets-Sheet 32

May 24, 1966 O. L. MacSORLEY ET AL 3,253,131
ADDER
Filed June 30, 1961 46 Sheets-Sheet 35

May 24, 1966 O. L. MacSORLEY ETAL 3,253,131
ADDER
Filed June 30, 1961 46 Sheets-Sheet 37

May 24, 1966   O. L. MacSORLEY ETAL   3,253,131
ADDER

Filed June 30, 1961   46 Sheets-Sheet 43

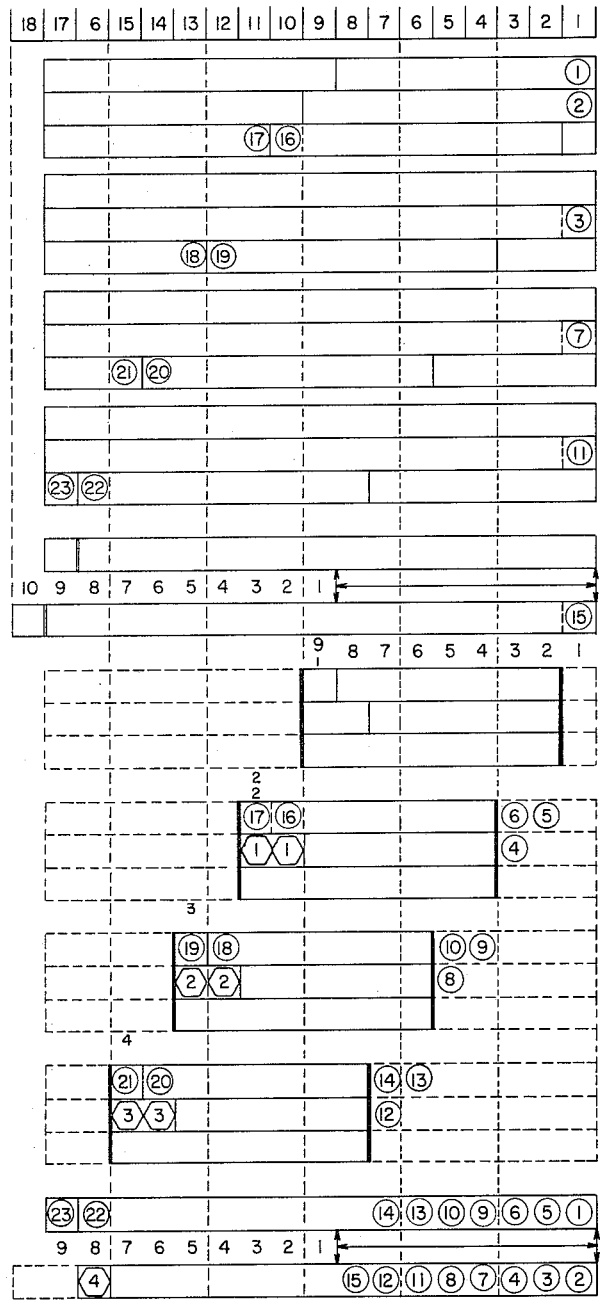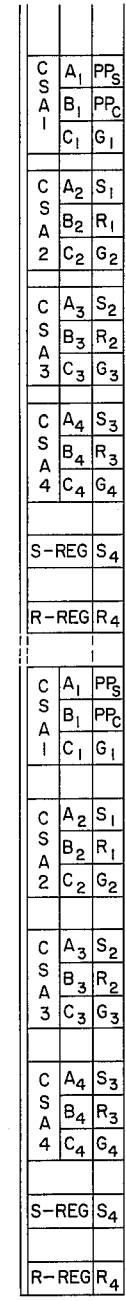
FIG.50

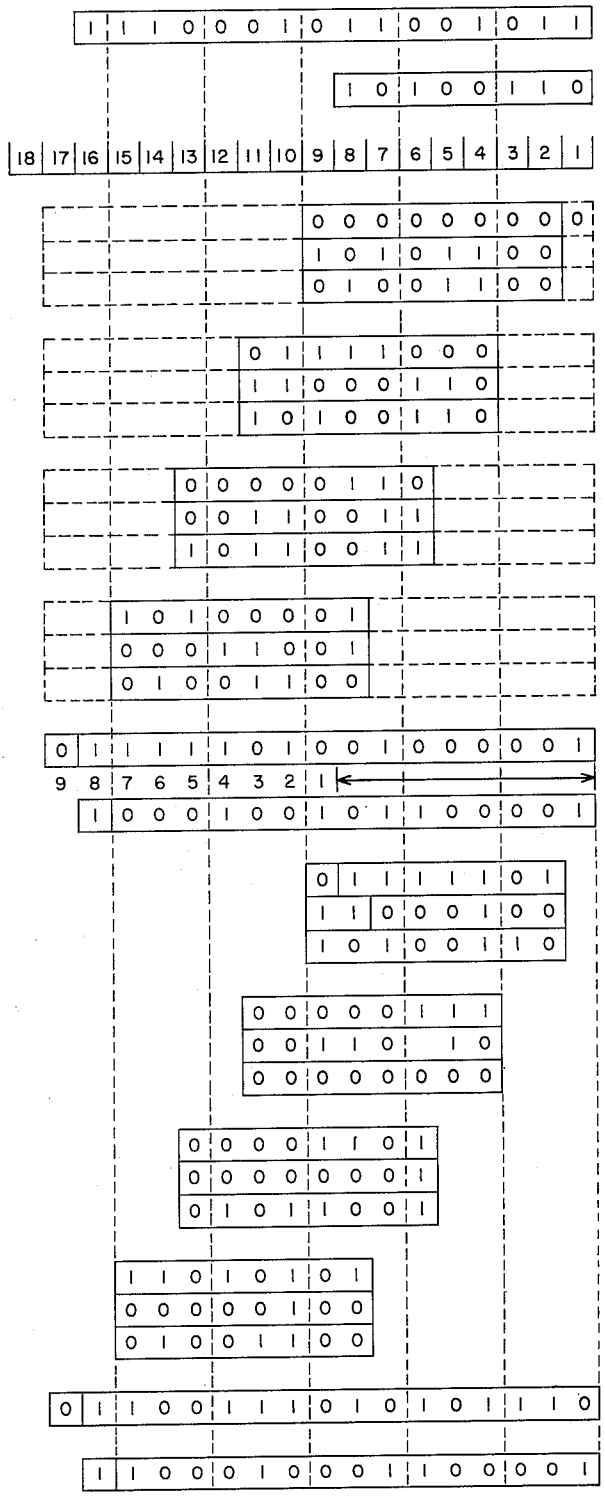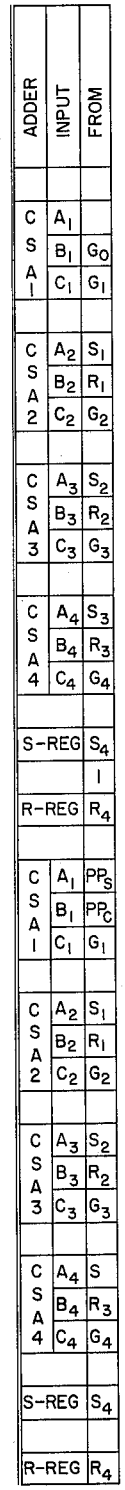
FIG. 51

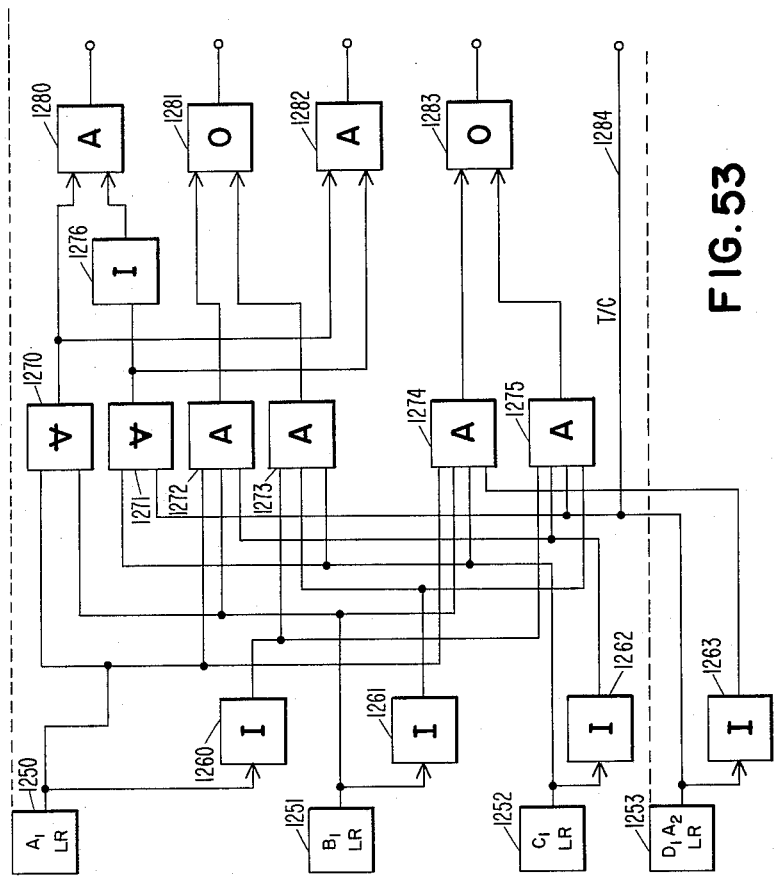

United States Patent Office 3,253,131
Patented May 24, 1966

3,253,131
ADDER
Olin L. MacSorley and Frank R. Bielawa, Wappingers Falls, N.Y., assignors to International Business Machines Corporation, New York, N.Y., a corporation of New York
Filed June 30, 1961, Ser. No. 121,024
16 Claims. (Cl. 235—159)

This invention relates to data processing systems and more particularly to an arithmetic device for performing addition operations as information is processed.

The speed at which calculations may be performed in many computing devices is a paramount consideration. In order to reduce the time required to perform calculations it is customary to employ parallel arithmetic devices wherein calculations are performed on all orders or digits simultaneously. It is important to reduce the time for performing multiply operations in parallel arithmetic devices still further, and it is this aspect of computing devices to which this invention is directed.

It has been customary in many earlier computing devices to perform multiply operations by generating and accumulating one partial product for each bit or order of the multiplier, thereby involving a shift operation or an add operation plus a shift operation for each bit of the multiplier. For the purpose of minimizing the time required to perform a multiply operation there is provided according to this invention a multiplier arrangement which reduces the total number of addition operations.

According to another aspect of this invention provision is made to employ two or more adders in tandem with several partial products each determined from different groups of bits of the multiplier going to the various adders whereby a plurality of partial products are generated and accumulated simultaneously.

According to another feature of this invention a plurality of adders, each having a plurality of adder stages, are provided in tandem and a reduction in the number of adder stages is effected by eliminating selected inputs to the adders which are always zeros or are always ones and shifting inputs from one adder stage in a tandem relationship or column to another adder stage in the same column.

In one adder arrangement according to this invention one or more carry save adders are provided with each carry save adder having two or more positions or stages, each stage having a full adder with three inputs A, B and C and a sum output and a carry output where all high order A inputs starting with $A_n$ are identical and all high order B inputs starting with $B_n$ are also identical although the A and the B inputs are not necessarily the same same, the carry save adders being interconnected whereby the sum outputs of the first carry save adder are coupled to corresponding positions as inputs to the second carry save adder and the carry outputs of the first carry save adder are coupled as inputs to the second carry save adder shifted one position, the second carry save adder having its outputs connected in like fashion to the third carry save adder and so forth, and all of the highest order B bits are given the value $D=(A_n \underline{\vee} B_n)\overline{C}_n \vee AB$ with the carry output of the adder in position $n$ not being used and all high order A bits starting with $A_n+1$ are made equal to zero.

It is a feature of this invention to generate partial products which are multiples of the multiplicand with a minimum of equipment. For this purpose the number of required multiples of the multiplicand are kept to a minimum. The multiplier bits are divided into groups with each group containing an equal number of bits, and a decoder device is provided for each group of bits. Signals from the multiplier bits are supplied as inputs to the decoder, and the decoder has output lines on which signals appear for the purpose of selecting a given multiple of the multiplicand. One way to operate the decoders is to provide an output line for each possible multiple of the multiplicand. For example, where the multiplier bits are divided into groups of two bits each, multiples of zero, one, two and three of the multiplicand could be made available for selection by the decoder. Such an arrangement, however, involves a great deal of equipment merely to generate the selected multiples.

Accordingly, there is provided according to this invention a decoder arrangement which responds to groups of bits from the multiplier and selects only even multiples of the multiplicand. Each groups of multiplier bits is decoded to give the numerical value of the group if it has an even value and to give a value of one greater than the numerical value if the value of the group is odd. If the low order bit of the next higher order group is one then $2^n$ is subtracted from numerical value of the decoded group, where $n$ is number of bits in decoded group. The lowest order bit of the multiplier is treated independently, and if it is a binary one, one times the multiplicand is subtracted from the partial product. The decoding scheme may be applied to multiplier groups having varying numbers of bits although in practice groups of two bits each or three bits each are preferably employed.

For the purpose of illustrating how the foregoing decoding scheme operates, let it be assumed that multiplier groups of three bits each are used and that the multiplier is 110 101 100 011. Treating the multiplier in this fashion the product could be obtained by adding three times the multiplicand because this is the value of the octal group on the right, then shift three places and add in four times the multiplicand because this is the value of the octal group second from the right, then shifting three more places and adding in five times the multiplicand because this is the value of the octal group third from the right, and finally shifting three more places and adding in six times the multiplicand because this is the value of the octal group on the left. In this case four addition operations are performed to generate the final product. To treat all cases in this way, however, would require the availability of eight multiples, i.e. 0, 1, 2 . . . 7 of the multiplicand for each addition operation. This is extravagant from the standpoint of equipment both for the generation of multiples and the provision of gates to direct the select multiple to the adder.

Accordingly, the present invention provides a decoding scheme which requires fewer multiples. The multiples of two, four or eight times the multiplicand can be obtained merely by shifting the multiplicand one, two or three positions, respectively, and the multiple of six times the multiplicand may be obtained by adding two times the multiplicand to four times the multiplicand and making this value available in a register. By using the multiples of 2, 4, 6 and 8 a group of equalities may be developed as set out in Table 1 below.

TABLE 1

| Multiplier Bits | Multiples Combinations |
|---|---|
| 000 | 0 |
| 001 | 2−1 |
| 010 | 2 |
| 011 | 4−1 |
| 100 | 4 |
| 101 | 6−1 |
| 110 | 6 |
| 111 | 8−1 |

It is readily observed from Table 1 above that four of the multiples require both an addition and a subtraction operation. In order to demonstrate how this second addition operation (the subtraction) may be avoided, consider the preceding example of twelve multiplier bits. The left most multiplier octal group causes no difficulty since the six times multiple is readily available. In the case of the third octal group from the right which has a value of five, the proper multiple may be obtained by adding the six times multiple and effectively subtracting the one times multiple. Now the one times multiple in the octal group third from the right is equivalent to an eight times multiple in the octal group second from the right which has a value of four. Hence, the six times multiple may be added for the octal group third from the right if the eight times multiple is subtracted for the octal group second from the right. This would involve subtracting the four times multiple for the second octal group from the right. Similarly, the first octal group on the right has a value of three, and the multiple of four times the multiplicand would be added to the partial product, remembering that the eight times multiple would have to be subtracted for the next lower order octal group. Since the lowest order bit of the first octal group, the right most bit, is a binary one, it is treated independently as explained above, and since it is a binary one, the multiple of one times the multiplicand is subtracted from the partial product. Thus, it is seen that the proper multiples may be obtained using but a single addition operation for each octal multiplier group. The preceding explanation was given in terms of examining the high order multiplier bits first. Actually, a machine treats the multiplier bits in the reverse order. That is, the low order bits are first examined. This may appear to present a problem when using the above scheme because it is necessary to subtract to compensate for an over-addition that has not yet occurred and the existence of which may not yet have been discovered. This problem is easily overcome. By examining the combinations in Table 1 above it is seen that a subtraction of the eight times multiple in the present octal position is always required when the next higher order octal group is odd. This can be determined by examining the low order bit of the next higher order octal group. Thus, the decoder device must examine each octal group plus the lowest order bit of the next higher order octal group. The previous example of twelve bits would then be treated as

X 1 1 0 1 0 1 1 0 0 0 1 1

Accordingly, Table 1 above may be revised to provide Table 2 below:

TABLE 2

| 4-bit Group | Multiple Combinations | Actual Adder Input (the partial product is the other) |
| --- | --- | --- |
| 0000 | 0 | 0 |
| 0001 | 2−1 | 2 |
| 0010 | 2 | 2 |
| 0011 | 4−1 | 4 |
| 0100 | 4 | 4 |
| 0101 | 6−1 | 6 |
| 0110 | 6 | 6 |
| 0111 | 8−1 | 8 |
| 1000 | −8+0 | −8 |
| 1001 | −8+2−1 | −6 |
| 1010 | −8+2 | −6 |
| 1011 | −8+4−1 | −4 |
| 1100 | −8+4 | −4 |
| 1101 | −8+6−1 | −2 |
| 1110 | −8+6 | −2 |
| 1111 | −8+8−1 | 0 |

Thus, the above example would yield

```
             6          2
    X 1 1 0 1 0 1 1 0 0 0 0 1
          6          −4
X=0,  6
X=1, −2
```

Special treatment is given to the lowest order octal digit of the multiplier. If this digit is odd, it is clear from Table 2 that the product will be too large by an amount equal to one times the multiplicand in the lowest order position. Therefore, when the low order bit is a one, one times the multiplicand must be subtracted from the partial product.

It is seen at this point that the operations involved in multiplication are reduced to one addition operation for each octal group of the multiplier which is four additions in the above case, and they are equivalent to twelve additions. To further increase the speed of multiplication, four adders may be provided in tandem with each adder receiving a selected multiple as determined by an associated octal group of the multiplier. In this fashion four addition operations, the equivalent of twelve add operations, are performed simultaneously, thereby further reducing the time required to perform a multiply operation. The foregoing principles demonstrated with respect to multiplier groups of three bits each are equally well applied to multiplier groups of two bits each in which case the decoding would involve multiples of two or four times the multiplicand, and the lowest order bit of the multiplier would likewise be treated separately, one times the multiplicand being subtracted from the partial product when the lowest order bit is a one.

The foregoing and other objects, features and advantages of the invention will be apparent from the following more particular description of preferred embodiments of the invention, as illustrated in the accompanying drawings:

FIGS. 3 through 22 illustrate in detail the logic circuits for the multiplier arrangement shown in FIGS. 1 and 2.

FIG. 23 illustrates how FIGS. 3 through 22 should be arranged with respect to one another.

FIG. 26 illustrates the manner in which FIGS. 24 and 25 should be arranged with respect to each other.

FIG. 31 illustrates in detail a circuit diagram for the level setters illustrated in block form in FIG. 29.

FIGS. 34, 35 and 36 are charts which help to illustrate the operations which take place in the various parts of the multiplier arrangement illustrated in FIGS. 1 through 22 during a multiply operation.

FIG. 50 illustrates how adder reduction is accomplished in the carry save adders of FIGS. 37 through 49.

FIG. 51 illustrates how a multiply problem is performed using the modified adder arrangement of FIGS. 39 through 46.

FIG. 52 illustrates in chart form how decoding is accomplished when multiplier groups have three bits each.

FIG. 53 illustrates logic circuits which may be employed in a decoder for decoding a multiplier group having three bits.

Figure 1:
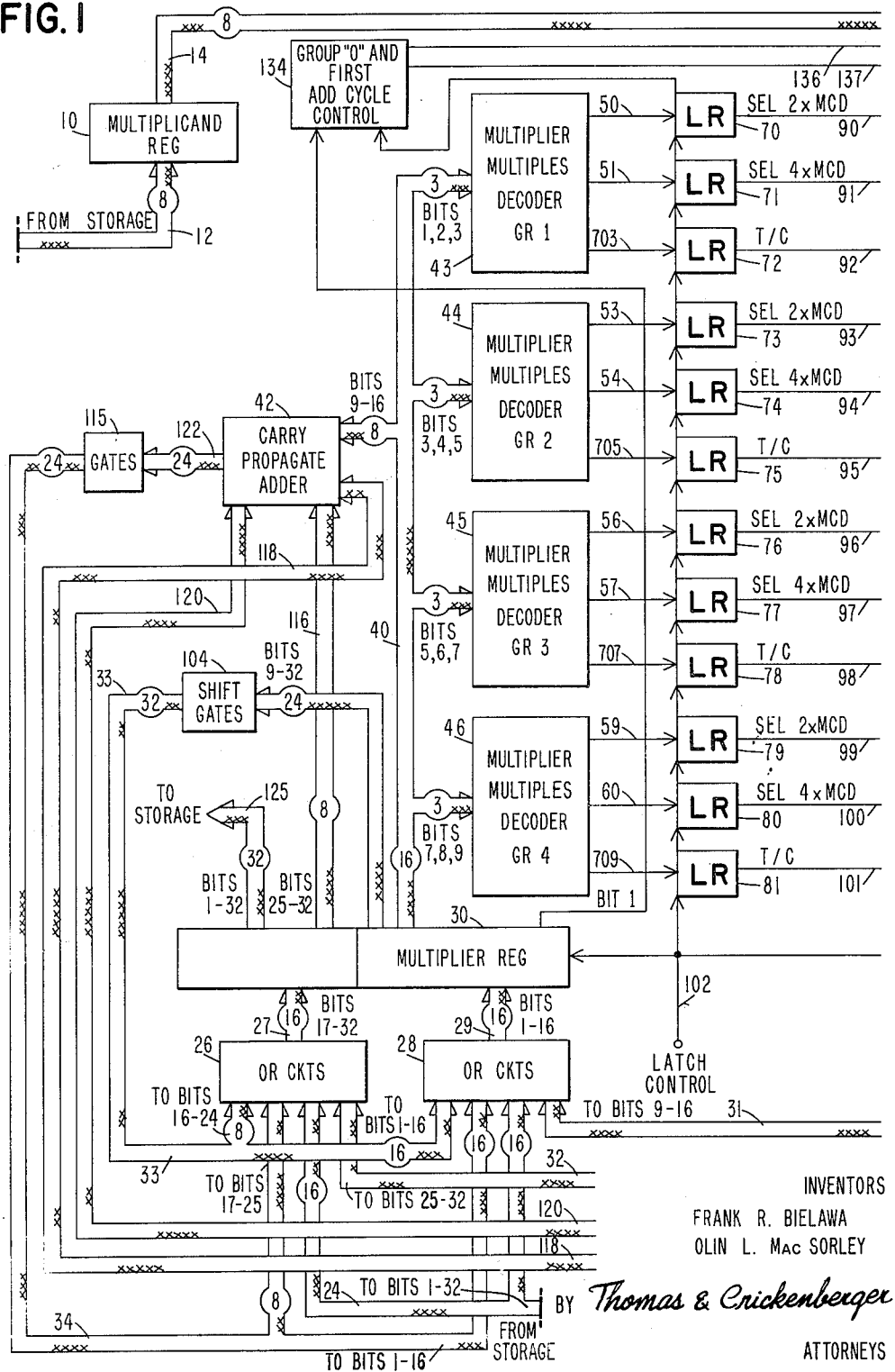
FIGS. 1 and 2 illustrate in block form a multiplier arrangement according to this invention.

A multiplier arrangement according to this invention may use multiplier groups of two bits each or three bits each. In the interest of simplicity a multiplier arrangement which uses two bit groups in the multiplier is illustrated. A multiplier of sixteen bits and a multiplicand of eight bits are selected for illustration although in practice the larger number of sixteen bits may be treated as the multiplicand and the smaller number of eight bits may be treated as the multiplier. The benefits of the improved multiplier according to the present invention are more noteworthy as the multiplicand and the multiplier become very great in length, say 48 bits each in length for instance. Positive logic is employed throughout the circuits of this invention unless indicated otherwise. D.C. levels are employed to operate the logic circuits illustrated, and in some instances the circuits are operated by pulses which swing toward a positive level and return to a more negative level upon termination of the pulses. Signal levels representing binary information are positive when representing binary one and negative when representing binary zero. Levels are referred to hereinafter as positive and negative levels, but this designation is arbitrarily used since in many instances two positive levels, one being more positive than the other, or two negative levels, one being more negative than the other, may be suitable employed in various types of logic circuits. Throughout the figures of the drawing arrowheads indicate the direction of information flow or the direction of control for D.C. or pulse signals, and signals going to a circuit may be connected to any portion of the block representation of the circuit. Numerals disclosed within circular portions of cables indicate the number of conductors in the cable.

Figure 2:
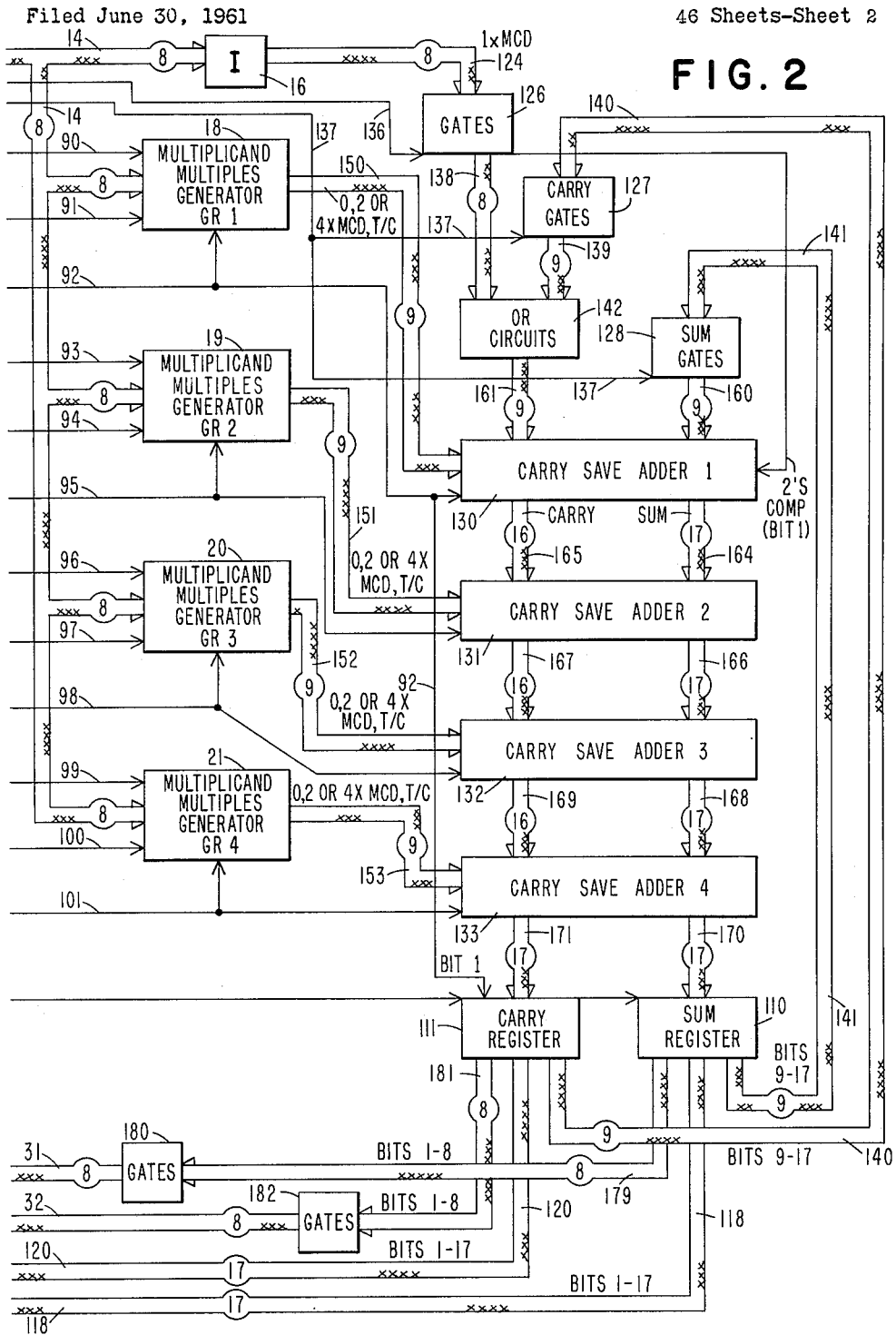

A multiplier arrangement according to this invention is illustrated in block form in FIGS. 1 and 2. Referring first to FIG. 1, a multiplicand register 10 receives signals representing information on eight lines disposed within a cable 12. Output signals representing such information are supplied on eight conductors disposed within a cable 14 to an inverter 16 and multiplicand multiples generators 18 through 21 in FIG. 2. Signals representing a multiplier are supplied along the conductors of a cable 24 in FIG. 1 through OR circuits 26 and 28 and along associated cables 27 and 29 to a register 30. As explained later the multiplier is disposed in the righthand portion of the register 30, and zeros are inserted in the lefthand portion of the register 30. As the multiplier is shifted to the right during the multiplication process, partial products are stored in the lefthand portion of the register 30 and in that portion of the righthand section which is cleared as the multiplier is shifted to the right. Other cables convey input information to the register 30, and they include cables 31 through 34 which are discussed subsequently.

The lowest order bits of the multiplier are disposed in the right most positions of 30, and signals from the lowest eight order bits are conveyed along conductors of a cable 40 to a carry propagate adder 42 and to multiplier multiples decoders 43 through 46. Bits 1, 2 and 3 are coupled to the group one decoder 43 and bits 3 through 5 are coupled to the group two decoder 44. Also, bits 5, 6 and 7 are coupled to the group three decoder 45, and bits 7, 8 and 9 are coupled to the group four decoder 46. These decoders determine from the associated bits of the multiplier which multiples of the multiplicand are to be accumulated during the generation of a partial product for eight bits of the multiplier. Output lines 50, 51, 703, 53, 54, 705, 56, 57, 707, 59, 60 and 709 are connected to respective latch register circuits 70 through 81, which constitute a multiplicand selection latch register, and the output signals of these latch register circuits are conveyed on respective lines 90 through 101 to circuits indicated in FIG. 2. The latch register circuits are controlled by a signal on a line 102. When the line 102 is energized with a positive level, information supplied to the input of each latch register circuit is accepted therein and after the pulse terminates, such information appears on the output lines 90 through 101.

Before each partial product for eight bits of the multiplier is generated, information held in the register 30 is shifted to the right eight positions. This shift is accomplished by shift gates 104 which respond to output signals from bits 9 through 32 and supplies information represented by these signals along the conductors of the cable 33, through the OR circuits 26 and 28 and associated cables 27 and 29 to bit positions 1 through 24 of the register 30. A shift of this sort takes place after each partial product is generated. After all partial products have been generated, sum and carry signals stored in the register 30 and sum and carry signals stored in registers 110 and 111 in FIG. 2 are accumulated in the carry propagate adder 42 in FIG. 1 to provide a final product. Sum signals are stored in the right half portion of the register 30 and carry signals are stored in the left half portion of this register. Sum signals are conveyed from the bits 9 through 16 in the right half portion of the register 30 along the cable 40 to the carry propagate adder 42, and carry signals are conveyed from bits 25 through 32 in the left hand portion of the register 30 along a cable 116 to the carry propagate adder 42. Also, sum signals are supplied from the sum register 110 in FIG. 2 along the cable 118 to the carry propagate adder 42 in FIG. 1, and carry signals from the carry register 111 in FIG. 2 are conveyed along the cable 120 to the carry propagate adder 42 in FIG. 1. After these signals are accumulated in the carry propagate adder 42, signals are supplied on the conductors of a cable 122 to gates 115, and these signals represent the final product. The signals representing the final product are gated through the gates 115, along a cable 44, through the OR circuits 26 and 28 and along associated cables 27 and 28 to the register 30 where they are stored in bit positions 1 through 24. The final product may be conveyed from the register 30 along conductors of a cable 125 to a load device.

Referring next to FIG. 2, carry save adders 130 through 133 are connected in tandem, and they perform the function of accumulating the proper partial products for eight bits of the multiplier. The carry save adder 130 is designated as carry save adder 1, and it may receive information during the generation of the first partial product from gates 126 but not from the gates 127 or the gates 128. On the second and all subsequent partial products the carry save adder 1 may receive information from the gates 127 and 128, but not from the gates 126. Signals from the inverter 16 in FIG. 1 are supplied on the conductors of a cable 124 to the gates 126, and these signals represent the one's complement of the multiplicand. The gates 126 in FIG. 2 are controlled by the group 0 and first add cycle control 134 in FIG. 1, and these gates are conditioned by signals on a conductor 136. Signals on a conductor 137 from the group 0 and first add cycle control in FIG. 1 control the gates 127 and 128 in FIG. 2. The gates 127 in FIG. 2 receive information signals on the conductors of a cable 140 from the carry register 111, and the gates 128 receive information signals on the conductors of the cable 141 from the sum register 110. Signals from the gates 126 or the gates 127 are conveyed along the conductors of respective cables 138 or 139 through an OR circuit 142 to the carry save adder 1. Signals from the multiplicand multiples generators 18 through 21 are coupled to respective carry save adders 130 through 133 via respective cables 150 through 153. Lines 92, 95, 98 and 101 are coupled to respective carry save adders 130 through 133, and they determine whether the multiple of the multiplicand supplied to the associated carry save adders is in true or complement form. Each carry save adder receives three sets of input signals during the generation of each partial product. On the first partial product generated the carry save adder 1 receives signals representing binary zeros from the gates 128 via conductors of a cable 160, and the carry save adder 1 receives signals representing zeros via conductors of the cable 161 if both sets of gates 126 and 127 are not conditioned to pass information signals. However, the carry save adder 1 may receive signals via conductors of the cable 161 representing the one's complement of the multiplicand if the gates 126 are conditioned by a positive level on the line 136. A third set of input signals are applied to the carry save adder 1 via the conductors of the cable 150 which carry signals representing zero, two or four times the multiplicand. When zero times the multiplicand is represented, all conductors of the cable 150 are energized with negative signals, and if two or four times the multiplicand is represented, the conductors of the cable 150 are energized with positive signals or negative signals, depending upon whether ones or zeros are respectively represented. Accordingly it is seen that signals representing three numbers are supplied to the carry save adder 1 via cables 150, 160 and 161. The carry save adder 1 generates one set of output signals representing the sum and another set of output signals representing the carry of the three numbers supplied as inputs thereto. The signals representing the sum are conveyed along the conductors of the cable 164 as one input to the carry save adder 2, and the signals representing carrys from the carry save adder 1 are conveyed along the conductors of a cable 165 as a second input to the carry save adder 2. Signals on the conductors of the cable 151 represent the selected multiple of the multiplicand as a third input to the carry save adder 2. Sum and carry signals are generated for the three inputs supplied to the carry save adder 2. The sum signals generated in the carry save adder 2 are conveyed along the conductors of a cable 166 as one input to the carry save adder 3, and the carry signals from the carry save adder 2 are conveyed along the conductors of a cable 167 as a second input to the carry save adder 3. The third input to the carry save adder 3 is the selected multiplicand multiple supplied along the conductors of the cable 152. The carry save adder 3 generates sum and carry signals for the three inputs supplied thereto and conveys sum signals on the conductors of a cable 168 as one input to the carry save adder 4 and conveys carry signals on the conductors of the cable 167 as a second input to the carry save adder 4. A third input to the carry save adder 4 is the selected multiplicand multiple supplied along the conductors of the cable 153. The carry save adder 4 generates sum and carry signals for the three inputs supplied thereto and conveys sum signals on the conductors of the cable 170 to the sum register 110 where these signals are stored, and carry signals from the carry save adder 4 are conveyed along the conductors of a cable 171 to the carry register 111 where these signals are stored. Bits 1 through 8, the eight lowest order bits, of the sum register 110 are transferred along the conductors of a cable 179, through gates 180, along the conductors of a cable 31, through the OR circuit 28 and along the conductors of the cable 29 to bit positions 9 through 16 of the register 30. Carry signals from bit positions 1 through 8, the eight lowest order bits, of the carry register 111 are conveyed along the conductors of the cable 181, through gates 182, along the conductors of the cable 32, through the OR circuit 26 and along the conductors of the cable 27 to bit positions 25 through 32 of the register 30. Signals stored in bit position 9 through 17 of sum register 110 are conveyed along the conductors of the cable 141 to the gates 128. Signals stored in bit positions 9 through 17 of the carry register 111 are conveyed along the conductors of a cable 140 to the gates 127. During the second and subsequent partial products which are generated, the sum signals for bit positions 9 through 17 of the previous partial product are supplied through the gates 128 via the cable 160 as one input to the carry save adder 1, and carry signals for bit positions 9 through 17 of the previous partial product are conveyed through the gates 127, along the conductors of the cable 139, through the OR circuits 142 and along the conductors of the cable 161 as a second input to the carry save adder 1. The multiples of the multiplicand supplied on the conductors of cables 150 through 153 to respective carry save adders 130 through 133 are changed as required by the next eight bits of the multiplier, and the partial product for these eight bits is accumulated in the carry save adders 1 through 4 in the manner explained above. The information in the register 30 is shifted right eight positions before each partial product is generated for the purpose of clearing that portion of this register which is used to store sum and carry signals from respective registers 110 and 111 of FIG. 2. After the last partial product is generated, signals from the sum register 110 and the carry register 111 are conveyed on respective cables 118 and 120 to the carry propagate adder 42, and sum and carry signals stored in the register 30 are conveyed on respective cables 40 and 116 to the carry propagate adder 42. These signals are accumulated in the carry propagate adder, and the final product is represented by signals on the conductors of the cable 122. The final product may be gated through the gates 115, along the conductors of the cable 34, through the OR circuits 26 and 28, and along the conductors of respective cables 27 and 29 to the register 30. The final products may be transferred from the register 30 along the conductors of the cable 125 to a load device not shown.

Figure 3:
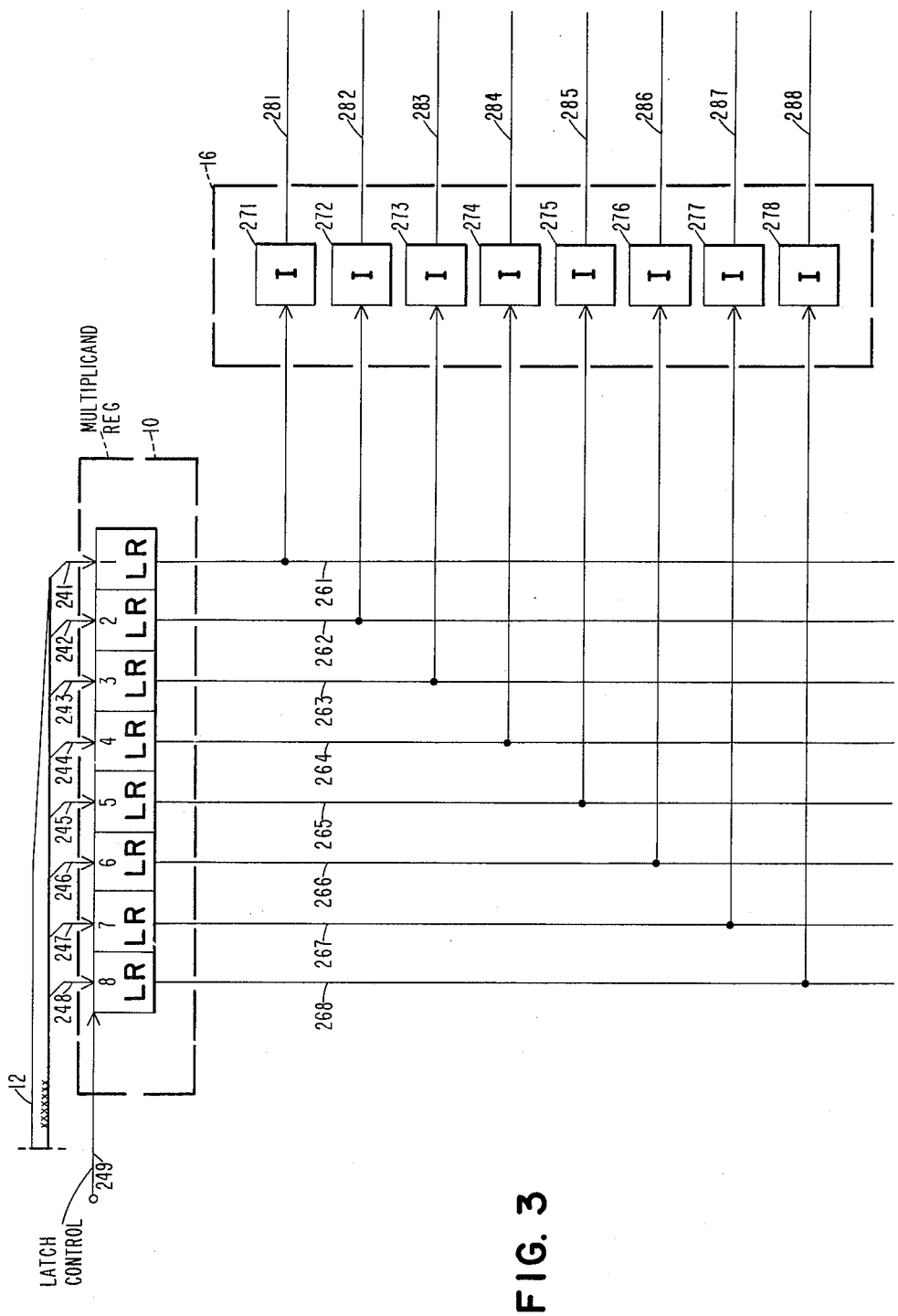

The multiplier arrangement illustrated in block form in FIGS. 1 and 2 is shown in detail in FIGS. 3 through 22. Referring first to FIG. 3, the multiplicand register 10, shown in block form in FIG. 1, is illustrated in detail as a latch register having individual latch register stages 1 through 8. Latch register stage 1 is the lowest order stage of the multiplicand register 10. Signals representing information are supplied along conductors 241 through 248 of the cable 12 to respective latch register stages 1 through 8. The signals on the conductors 241 through 248 may have either of two levels with a more positive level representing binary one and the more negative level representing binary zero. Hereinafter the more positive level is arbitrarily assumed to be a plus signal and the more negative level is arbitrarily assumed to be a minus signal. A latch control signal is applied along a conductor 249 to each of the latch register stages 1 through 8, and when the latch control signal is positive, the individual latch register stages 1 through 8 are operated upon by signals on respective input lines 241 through 248. If signals on the input lines 241 through 248 are positive, the associated latch register stage is set to represent a binary one; whereas, if the signals on the input lines 241 through 248 are negative, the associated latch register stages are operated to represent a binary zero. When the latch control signal on the line 249 changes from a negative value to a positive value, the individual latch registers 1 through 8 operate to provide an output signal on lines 261 through 268 having the same polarity as the polarity of the input signal on associated lines 241 through 248. It is pointed out that the output signals do not change their polarity to agree with the polarity of the associated input signals until the latch control signal on the conductor 249 goes positive. Once the latch control signal on the line 249 goes negative, the polarity of the output signals on the lines 261 through 268 remains constant as long as the latch control signal on the line 249 remains negative even though the polarity of the input signals on associated conductors 241 through 248 may change their polarity. Accordingly, signals on the input lines 241 through 248 are effective to change the signals on the output lines 261 through 268 after a positive latch control signal is applied to the line 249.

Output signals on the lines 261 through 268 are applied to the inverter 16 in FIG. 3 which is composed of individual inverter circuits 271 through 278 that receive signals from respective lines 261 through 268. The output lines 261 through 268 also are connected to the multiplicand multiples generator 43 in FIG. 6, the multiplicand multiples generators 44 and 45 in FIG. 10, and the multiplicand multiples generator 46 in FIG. 15. The lines 261 through 268 in FIGS. 3, 6, 10 and 15 form the conductors of the cable 14 shown in FIGS. 1 and 2. The individual inverter circuits 271 through 278 have associated output conductors 281 through 288 which are connected to the set of gates 126 in FIGS. 4 and 5. The gates 126 include individual AND circuits 301 through 308 connected to respective input conductors 281 through 288. The signals on the lines 281 through 288 to respective AND circuits 301 through 308 represent the complement of one times the multiplicand. The AND circuits 301 through 308 have respective output conductors 311 through 318 connected to respective OR circuits 321 through 328. The OR circuits 142, illustrated in block form in FIG. 2, include the individual OR circuits 321 through 329 shown in FIGS. 4 and 5. The OR circuits 321 through 329 have as a second input respective conductors 331 through 339 which conductors are the output lines of respective AND circuits 341 through 349. The AND circuits 341 through 349 constitute collectively a set of carry gates 127 which are shown in block form in FIG. 2. The OR circuit 329 in FIG. 4 has a second input conductor 136 which is the output conductor of an AND circuit 360 in FIG. 7. This AND circuit is operated by two inputs one of which is supplied along a conductor 361 from a latch register 362 in FIG. 6. The other input to the AND circuit 360 is supplied along the conductor 363. The signal on the conductor 363 is positive during the first add cycle, and it is negative during the remainder of the multiplication process. The signal on the conductor 363 is applied to an inverter 364, and the output signal of the inverter is conveyed on a conductor 137 to the sum gates 128 in FIGS. 7 and 8 and to the carry gates 127 in FIGS. 4 and 5. During the first add cycle when the line 363 is positive, the inverter 364 supplies a negative signal on the line 137 to the sum gates 128 in FIGS. 7 and 8 which causes the sum gates to supply negative signals representative of binary zero to the carry save adder 130 in FIGS. 7 and 8, and the negative signal on the line 137 is applied to the carry gates 127 in FIGS. 4 and 5 thereby causing the carry gates to supply negative signals representative of binary zero through the OR circuits 142 in FIGS. 4 and 5 to the carry save adder 130 in FIGS. 7 and 8. The latch register 362 in FIG. 6 is set with the information from the lowest order bit of the multiplier. If this information is a binary one, the latch register 362 supplies a positive signal on the conductor 361 to the AND circuit 360. Thus, the conductors 361 and 363, may be energized with positive signals during the first add cycle, and a positive signal then is supplied on the conductor 136 to the set of gates 126 in FIGS. 4 and 5. Since these gates are supplied with signals representing the complement of the multiplicand, this complement value is conveyed through the OR circuits 142 in FIGS. 4 and 5 to the carry save adder 130 in FIGS. 7 and 8. Since the number thus supplied is in complement form, the OR circuit 329 in FIG. 4 receives a positive signal representing a binary one on the conductor 136 and conveys a positive signal to the associated adder circuit 429 of the carry save adder 130 in FIG. 7.

Figure 7:
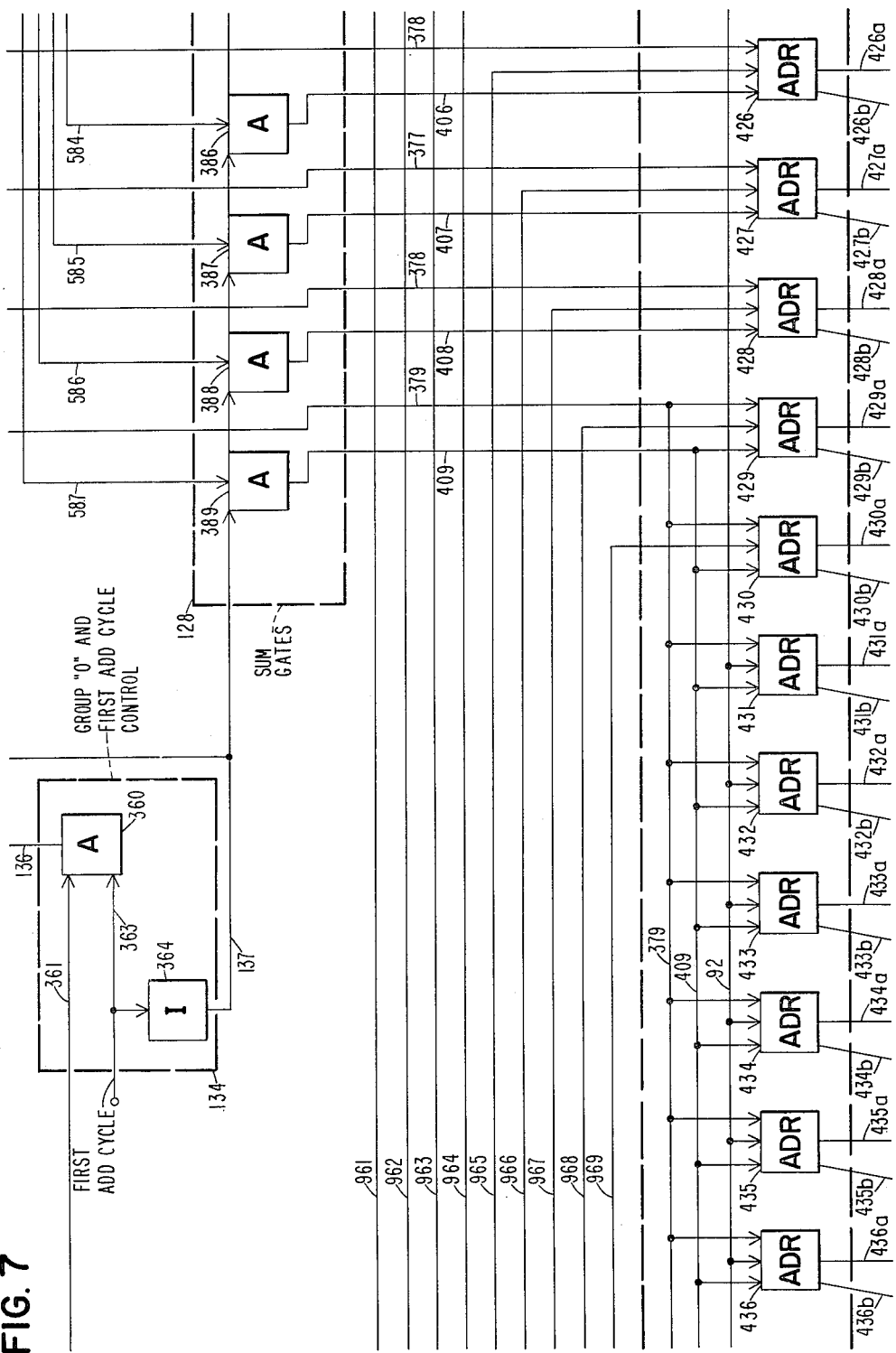
Figure 8:
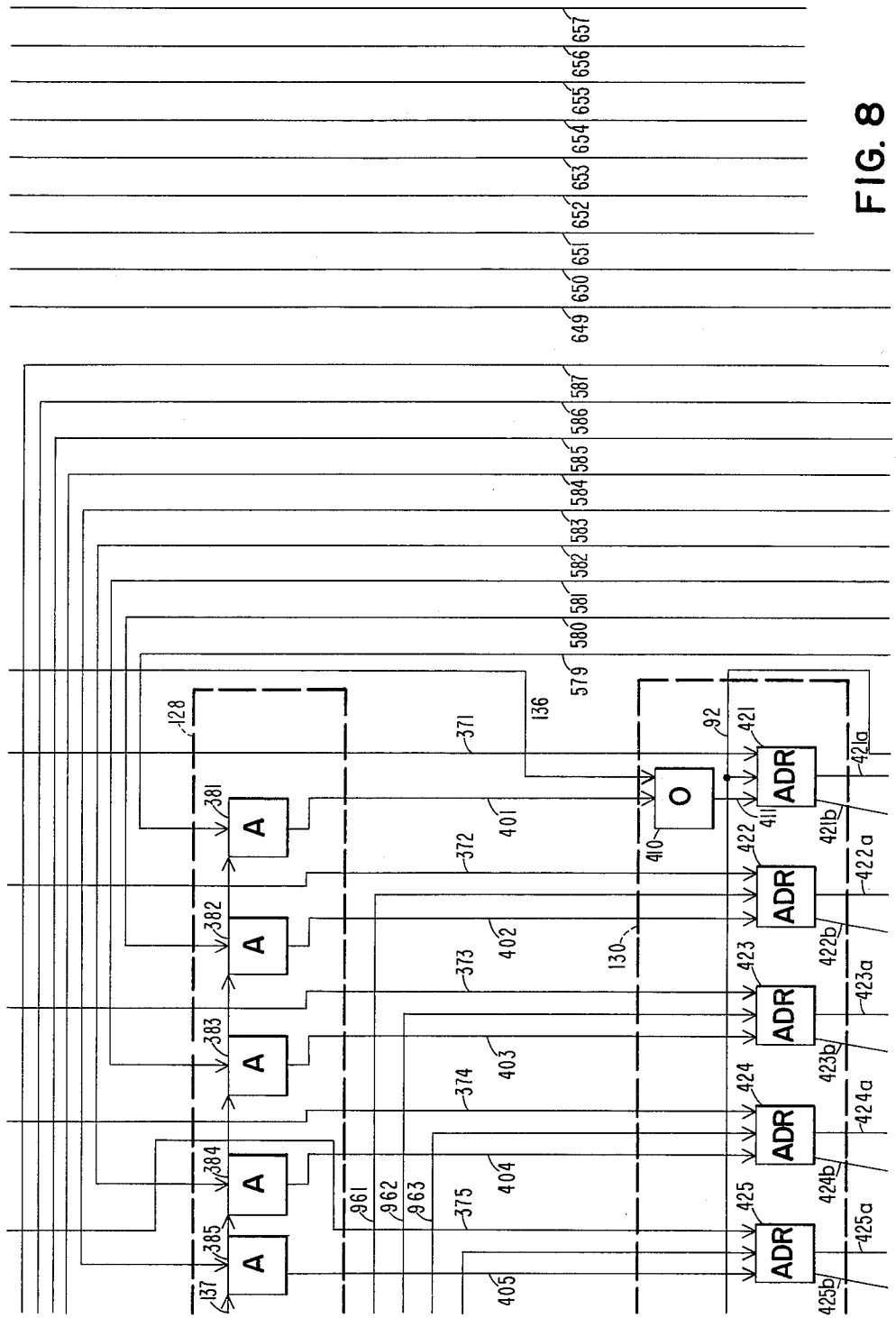

The OR circuits 321 through 329 have output conductors 371 through 379 coupled to associated adder circuits of the carry save adder 130 in FIGS. 7 and 8. The sum gates 128, shown in block form in FIG. 2, include individual AND circuits 381 through 389 as illustrated in FIGS. 7 and 8. These AND circuits are controlled by a conditioning level supplied on the line 137. The AND circuits 381 through 389 have output conductors 401 through 409 coupled to associated adders of the carry save adder 130 in FIGS. 7 and 8. The output conductor 401 from the AND circuit 381 in FIG. 8 and the conductor 136 are connected to an OR circuit 410 which has an output conductor 411 coupled to an associated adder 421 of the carry save adder 130 in FIG. 8.

The carry save adder 130 in FIGS. 6, 7 and 8 includes individual adder circuits 421 through 437. The carry save adder 131 in FIGS. 10, 11 and 12 includes individual adder circuits 451 through 467. The carry save adder 132 in FIGS. 10, 11 and 12 includes individual adder circuits 481 through 497.

The carry save adders 130 through 133 in FIGS. 6 through 8, 10 through 12 and 15 through 17 have individual adder circuits each of which has three input conductors and two output conductors connected as illustrated in the various figures. The output conductors represent a sum and a carry. The sum output line has the same number as the associated adder with the letter "a" affixed. The carry output conductor has the same number as the associated adder with the letter "b" affixed. For example, the adder 421 in the carry save adder 130 in FIG. 8 has a sum output line designated by the number 421a and a carry output line designated by the number 421b.

Figure 15:
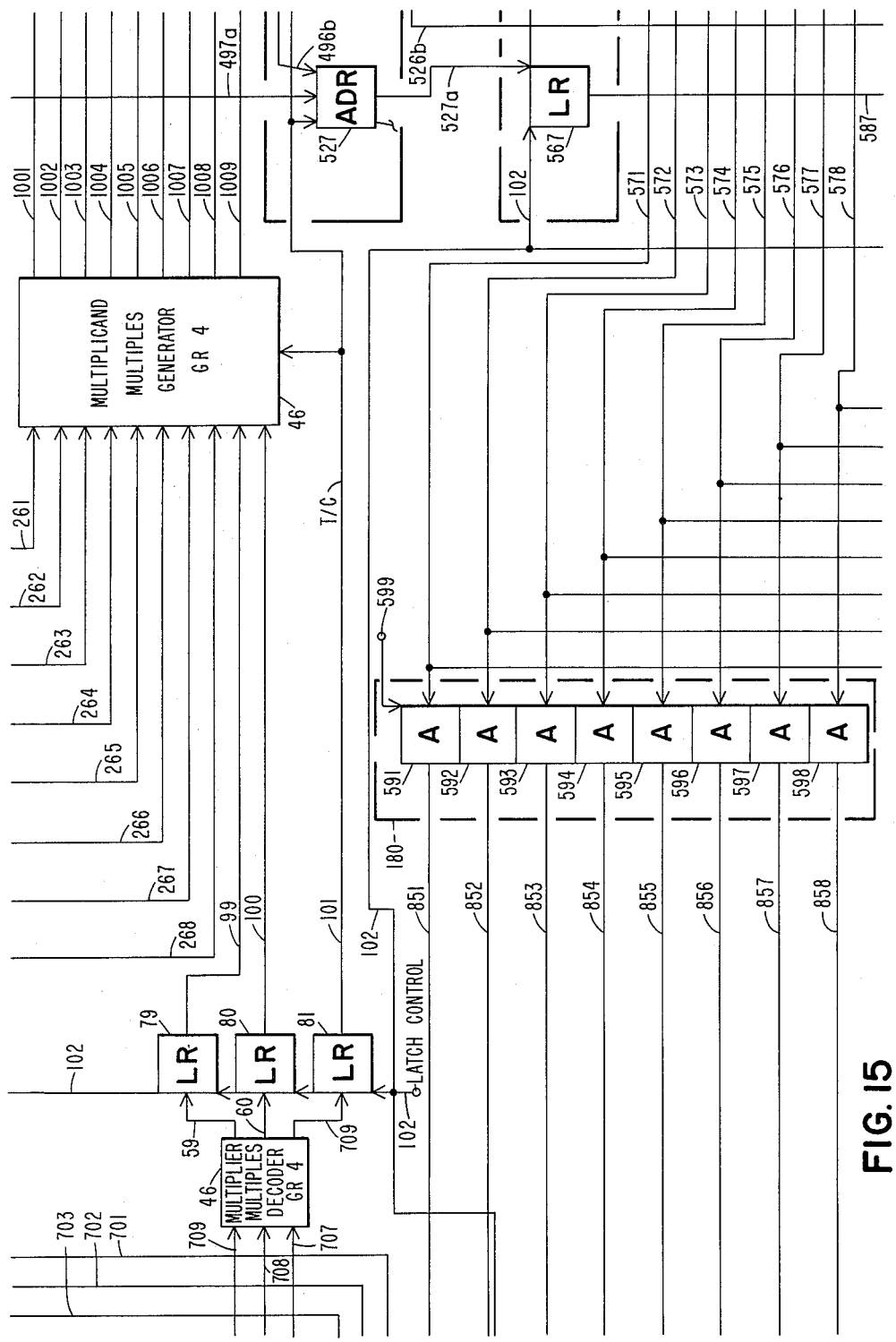
Figure 16:
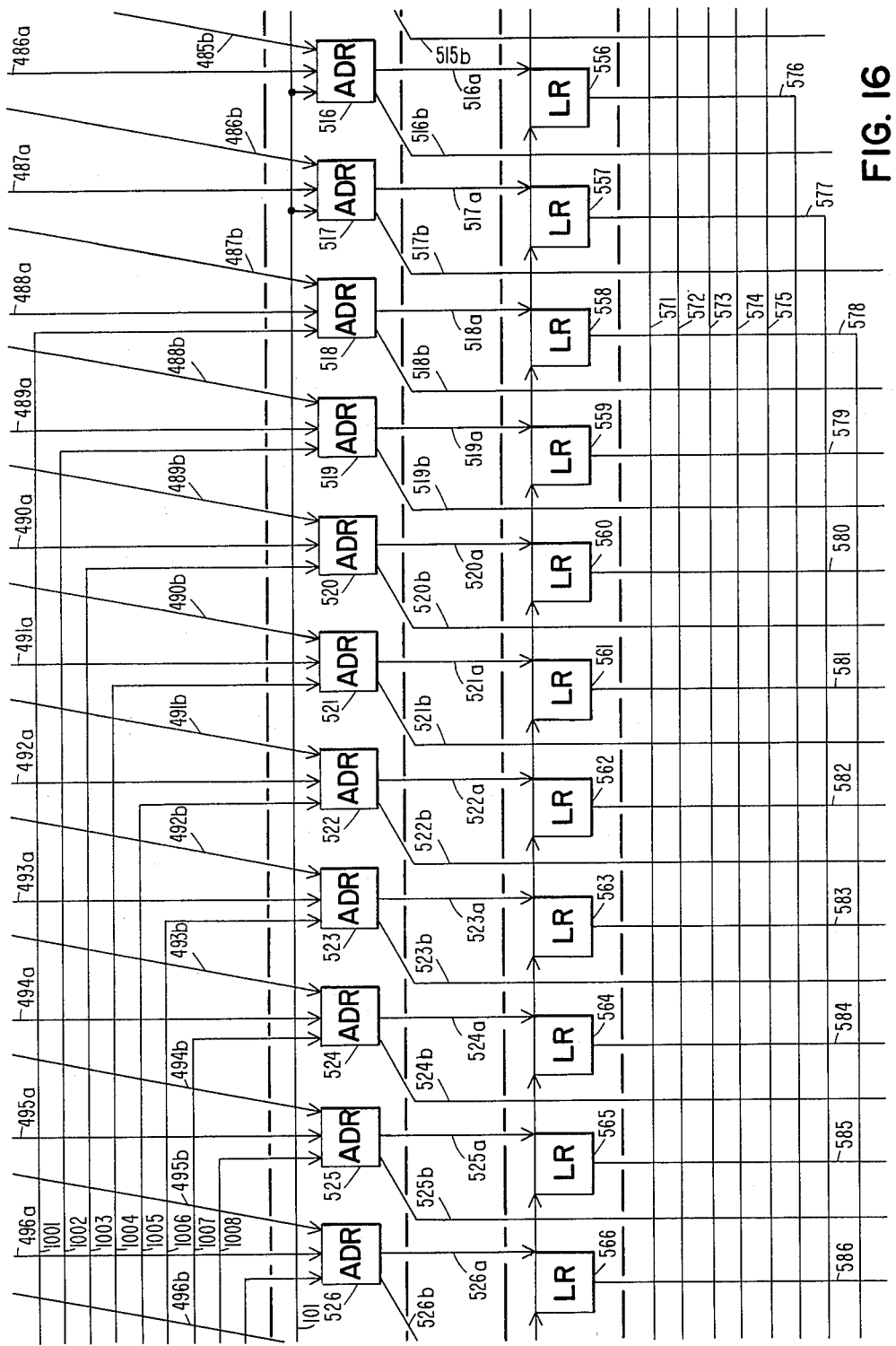
Figure 17:
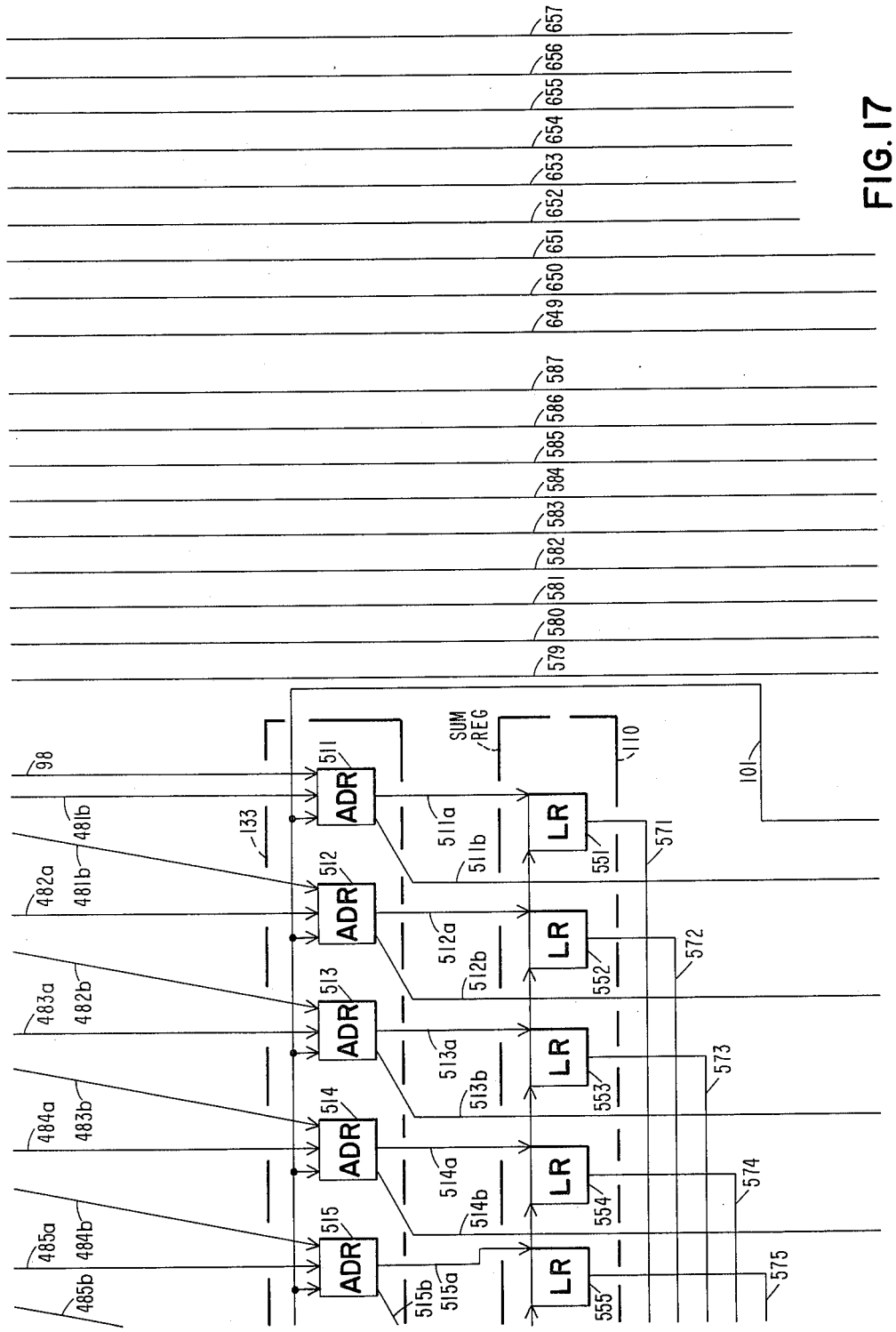
Figure 18:
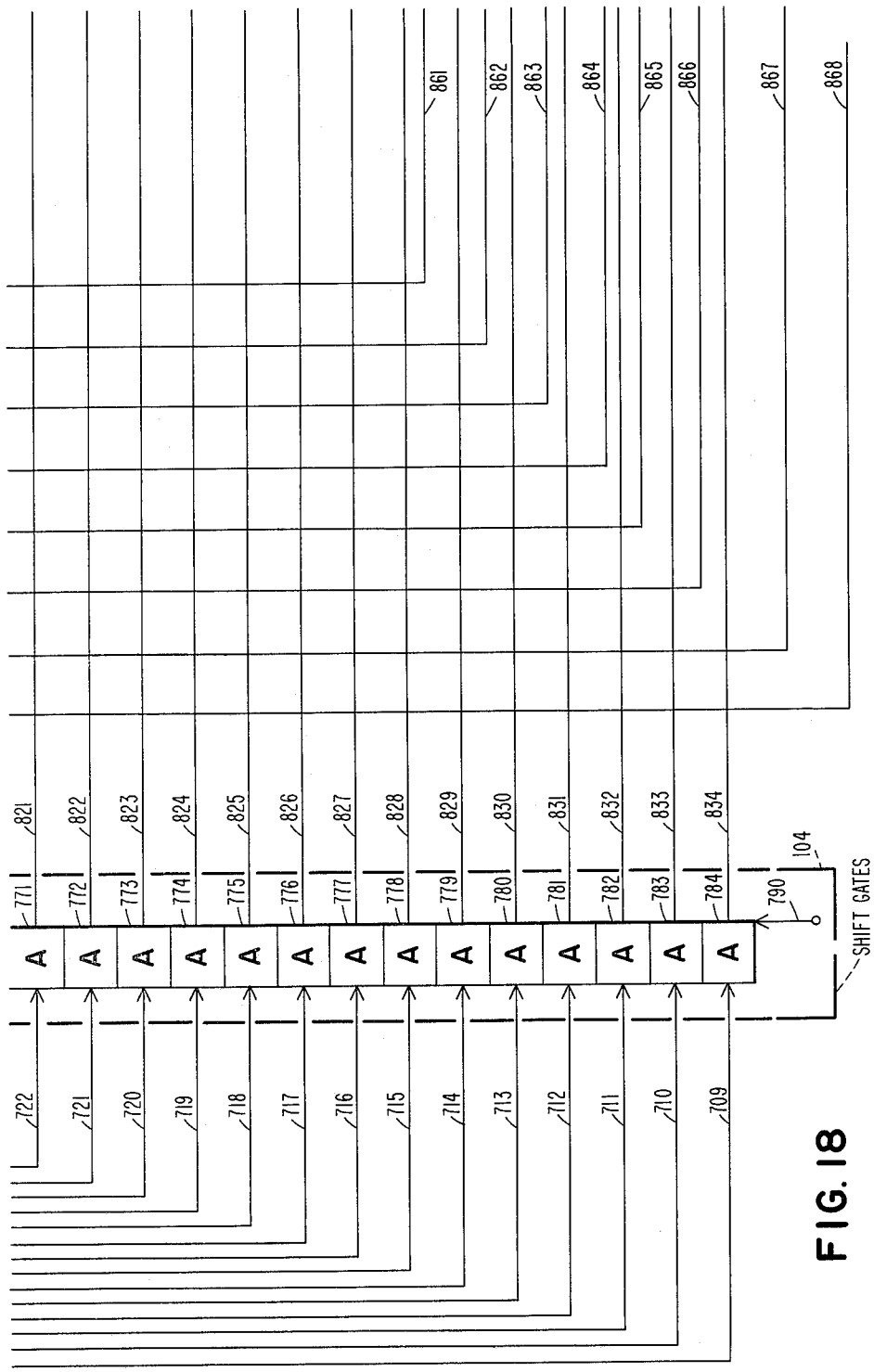

The sum output lines 511a through 527a from the carry save adder 133 in FIGS. 15 through 17 are connected as input lines to respective individual latch registers 551 through 567 of the sum register 110 in FIGS. 15 through 17. Signals on the sum output lines 511a through 527a to the sum register 110 control the information stored in the latch registers 551 through 567 whenever the sum register 110 is operated by a signal on the latch control line 102, and the sum register 110 is a latch register operated in the same manner as explained above with respect to the multiplicand register 10 in FIG. 3. Output signals from the individual latch registers 551 through 567 appear on respective output lines 571 through 587. The output lines 571 through 578 in FIGS. 15 through 17 are connected to respective AND circuits 591 through 598 which constitute the set of gates 180 illustrated in block form in FIG. 2. The AND gates 591 through 598 are controlled by a signal on a line 599 which is connected to each of these AND gates. Information passed by the gates 180 is stored in an empty portion of the multiplier register 30 as explained more fully hereinafter. Output lines 579 through 587 in FIGS. 15 and 16 pass through FIGS. 21, 22, 17, 12, 8 and 7 to respective AND circuits 381 through 389 of the sum gates 128 in FIGS. 7 and 8.

Figure 20:
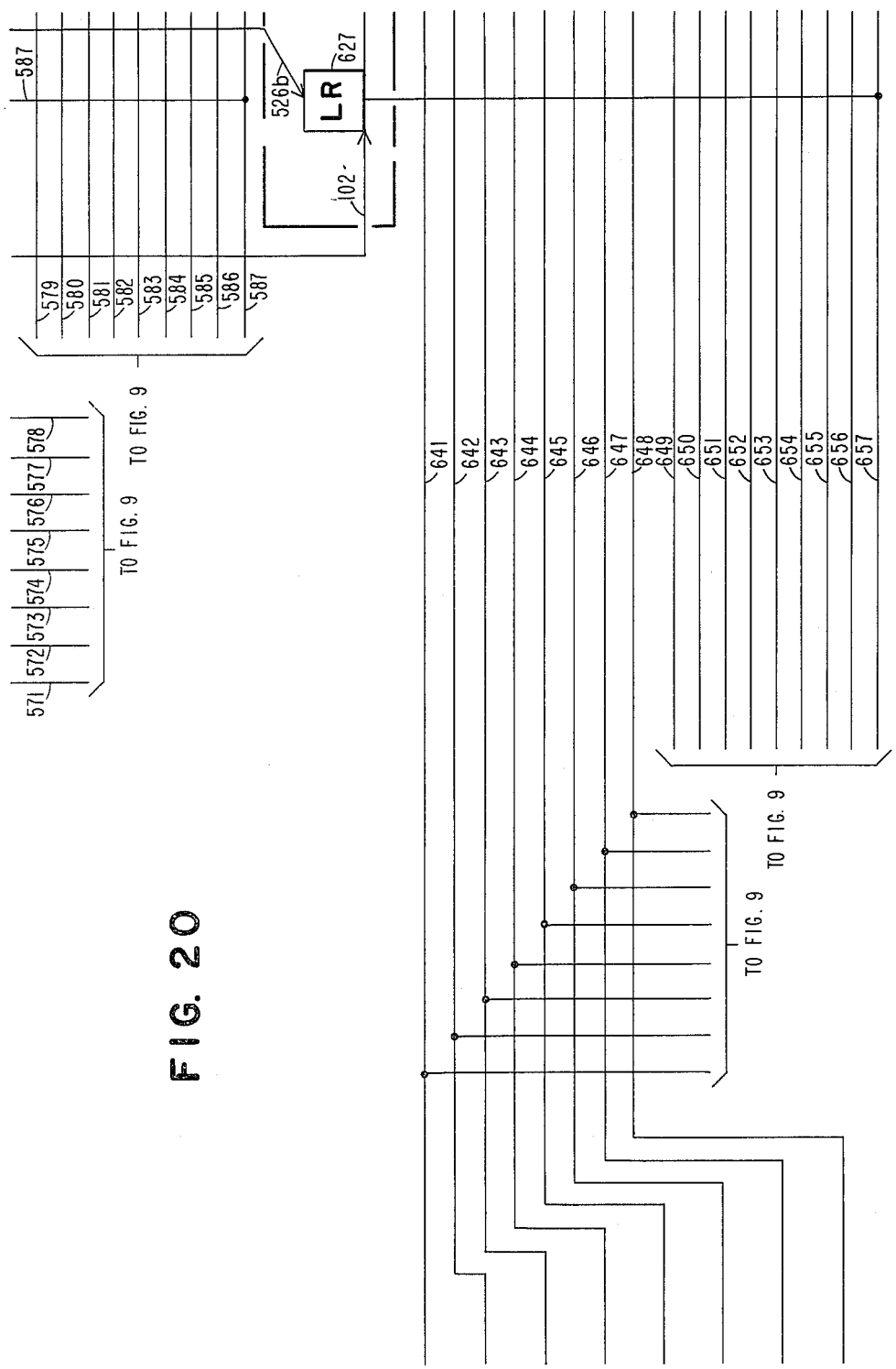
Figure 21:
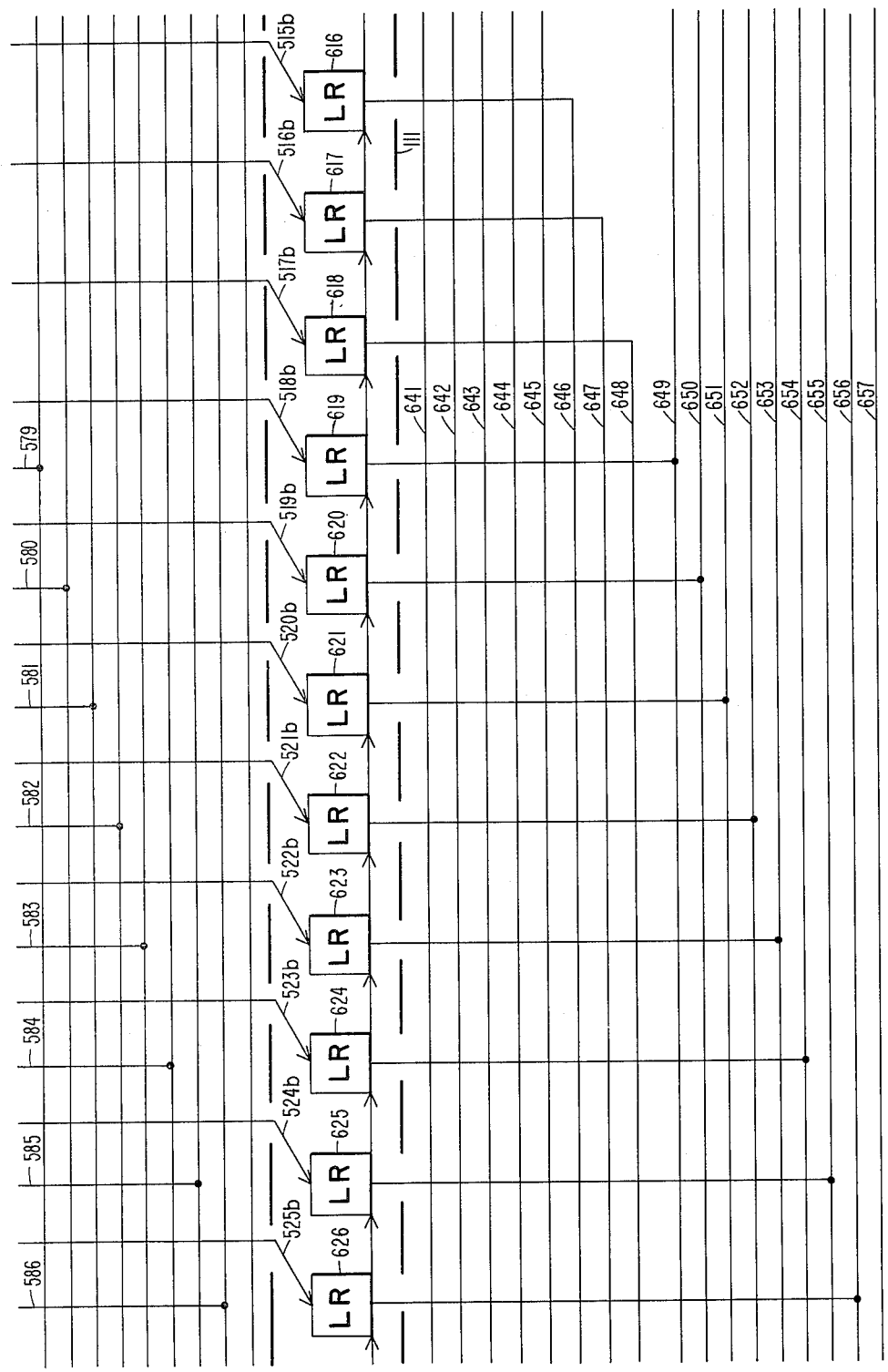

The carry output lines 511b through 526b from the carry-save adder 133 in FIGS. 15 through 17 are connected to associated stages of the carry register 111 in FIGS. 20 through 22. The carry register 111 in FIGS. 20 through 22 is a latch register having individual latch register stages 611 through 627, and this latch register is operated by signals on the latch control line 102 and signals on the carry output lines 511b through 526b to store information in the manner explained above with respect to the multiplicand register 10 in FIG. 3. It is pointed out that the carry output lines from the carry-save adder 133 in FIGS. 15 through 17 are connected to the carry register 111 in FIGS. 20 through 22 displaced one position to the left. This insures that carry signals are sent to the next higher order stage to produce a correct sum when at a subsequent time information in the sum and carry registers are combined either in the carry propagate adder 42 or the carry save adders 130 through 133.

The individual latch registers 611 through 627 of the carry register 111 have respective output lines 641 through 657. The output lines 641 through 648 in FIGS. 21 and 22 pass through FIG. 20 to FIG. 19, and they are connected to respective AND circuits 661 through 668 which constitute the set of gates 182 illustrated in block form in FIG. 2. These AND gates are controlled by a signal on the line 669 which is connected to each of the AND gates 661 through 668.

Figure 4:
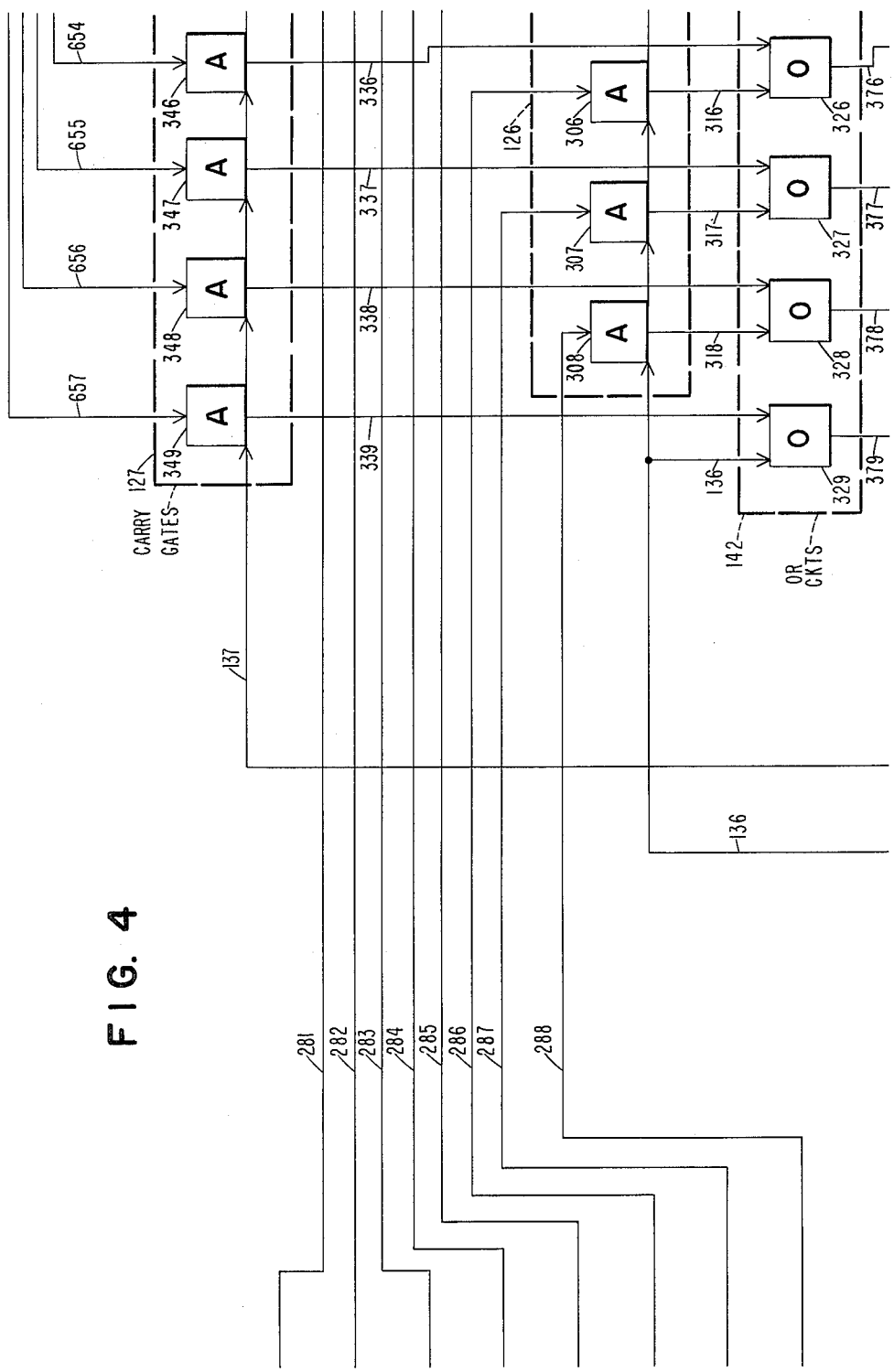
Figure 5:
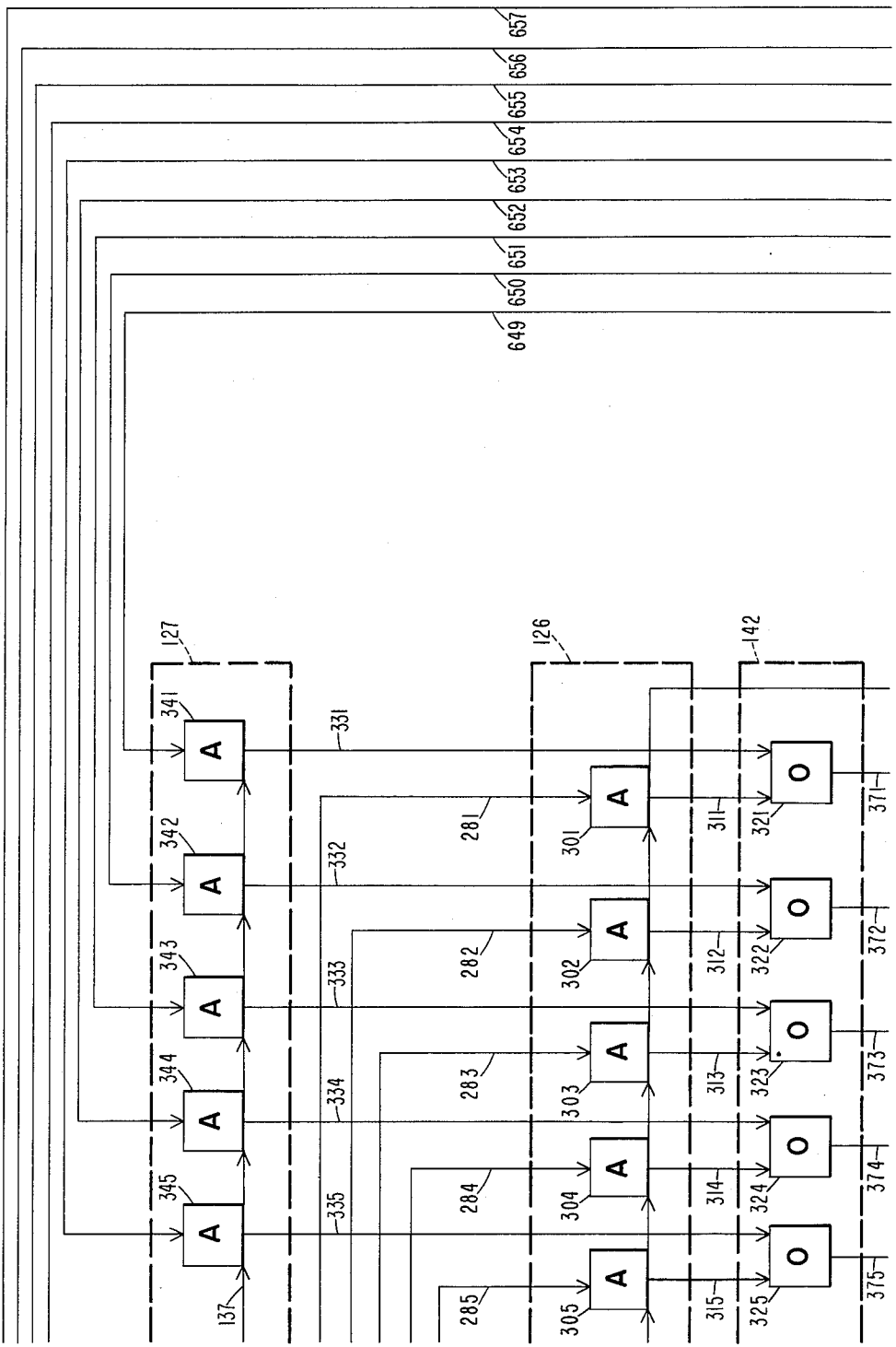
Figure 6:
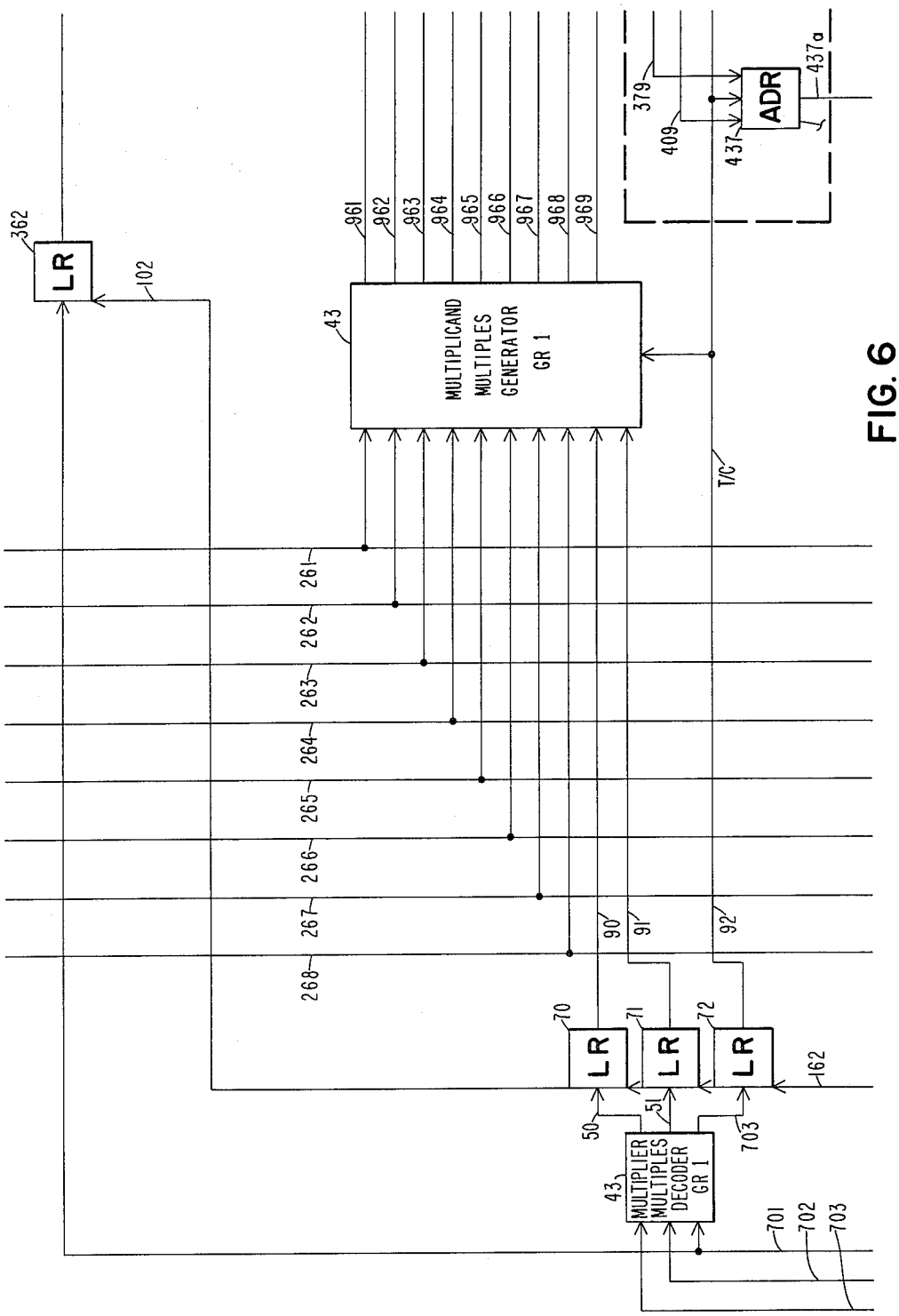

The output lines 649 through 657 of the carry register 111 in FIGS. 20 and 21 pass through FIGS. 22, 17, 12, 8, 5 and 4, and to respective AND circuits 341 through 349 of the carry gates 127 in FIGS. 4 and 5.

Figure 13:
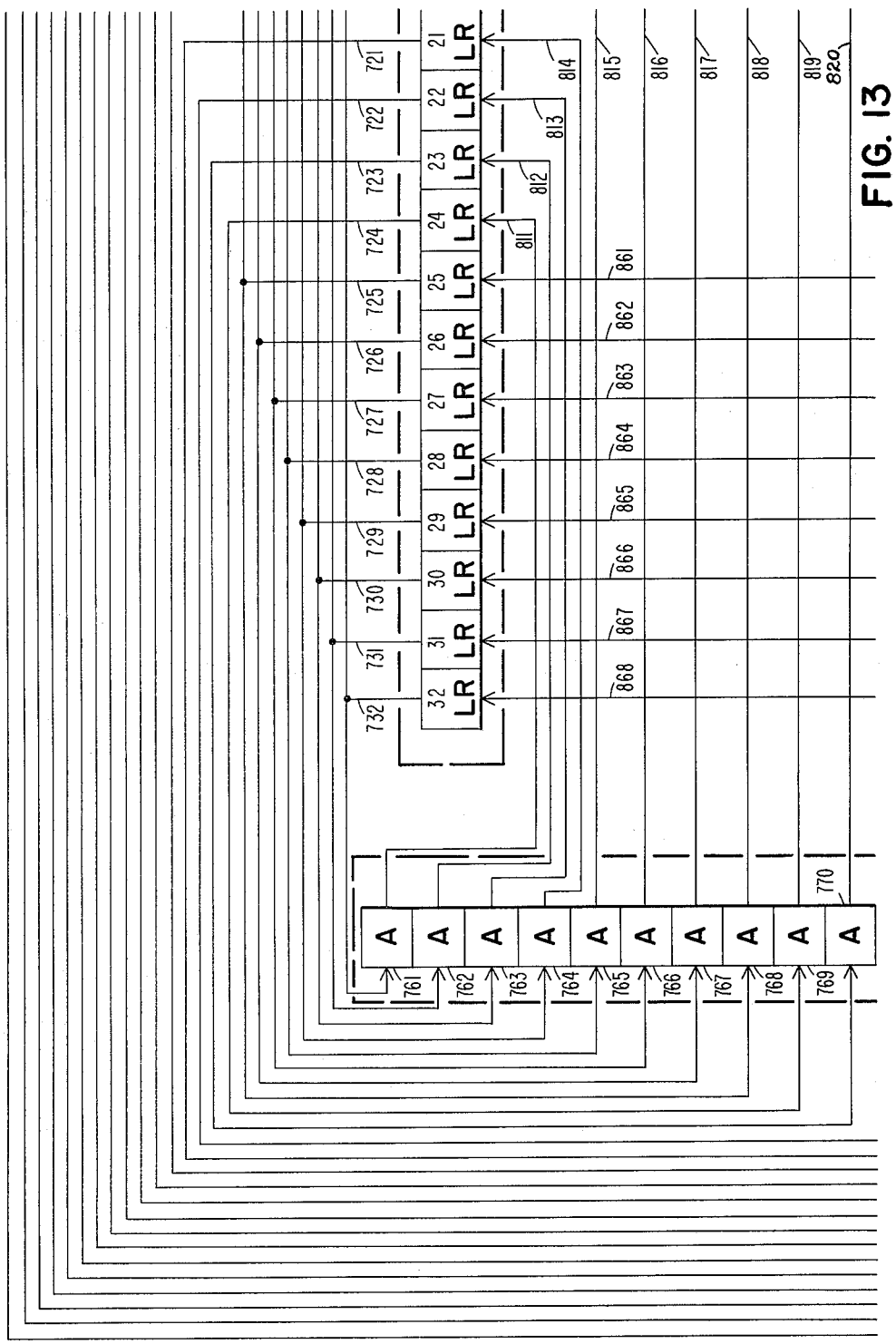
Figure 14:
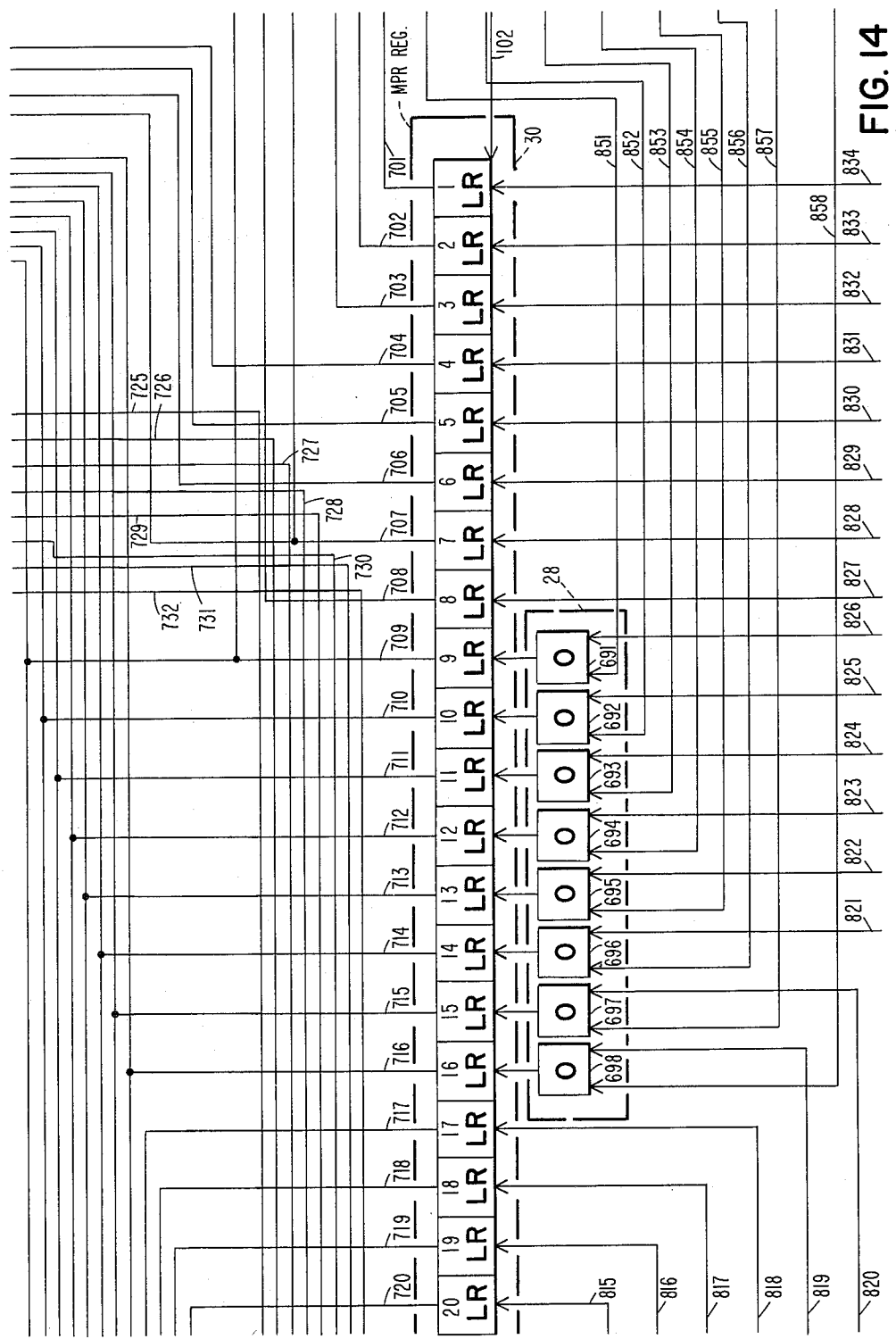

Reference is made to FIGS. 13 and 14 wherein the multiplier register 30, shown in block form in FIG. 1, is illustrated in detail. The multiplier register 30 in FIGS. 13 and 14 is a latch register composed of individual latch register stages 1 through 32. A latch control signal on the line 102 operates the latch register 30 to store information supplied on input lines in the manner explained above with respect to the multiplicand register 10 in FIG. 3. As illustrated in FIG. 1, information signals are supplied on a cable 24 through OR circuits 26 and 28 to the multiplier register 30, and such signals represent the multiplier in a multiplication problem. The conductors of the cable 24 in FIG. 1, the OR circuits 26 and a portion of the OR circuits 28 are omitted from the circuits in FIGS. 13 and 14 in the interest of simplicity. A portion of the OR circuits 28, shown in block form in FIG. 1, are illustrated in FIG. 14 only where two input conductors convey signals to a common latch register stage. Latch register stages 9 through 16 meet this requirement, and OR circuits 691 through 698 are employed.

Latch register stages 1 through 32 of the multiplier register 30 in FIGS. 13 and 14 have respective output conductors 701 through 732. The output lines 701 through 703 pass through FIGS. 15 and 10 to FIG. 6 where they are connected as inputs to the multiplier multiples decoder 43. The line 701 is further connected to the latch register 362 in FIG. 6. The output lines 703 through 705 in FIG. 14 pass through parts of FIGS. 9 and 15 to FIG. 10 where they are connected to the multiplier multiples decoder 44. The output lines 705 through 707 in FIG. 14 pass through FIG. 9 to FIG. 10 where they are connected to the multiplier multiples decoder 45. The output lines 707 through 709 in FIG. 14 are connected to the multiplier multiples decoder 46 in FIG. 15. The output lines 709 through 732 in FIGS. 14 and 13 are connected to respective AND gates 761 through 784 which constitute a set of shift gates 104 disposed in FIGS. 13 and 18. The AND circuits 761 through 784 are controlled by signals on a line 790. When the signals on the line 790 are positive, signals on the lines 732 through 709 may pass through respective AND circuits 761 through 784 to corresponding output lines 811 through 834. When the signal level on the line 790 is negative, the signal level on each of the lines 811 through 834 is negative. The AND gates 761 through 784 have respective output lines 811 through 834 which are connected as input lines to respective latch register stages 24 through 1 of the multiplier register 30 in FIGS. 13 and 14. Signals on the lines 826 through 819 pass through respective OR circuits 691 through 698 to respective stages 9 through 16 of the multiplier register 30 in FIG. 14. Stages 9 through 16 of the multiplier register 30 in FIG. 14 may receive signals through the OR circuits 691 through 698 on respective lines 851 through 858 from respective AND circuits 591 through 598 which constitute the set of gates 180 in FIG. 15. Stages 25 through 32 of the multiplier register 30 in FIG. 13 have respective input lines 861 through 868 which are supplied with signals from respective AND circuits 661 through 668 which constitute the set of gates 182 in FIG. 19.

Figure 9:
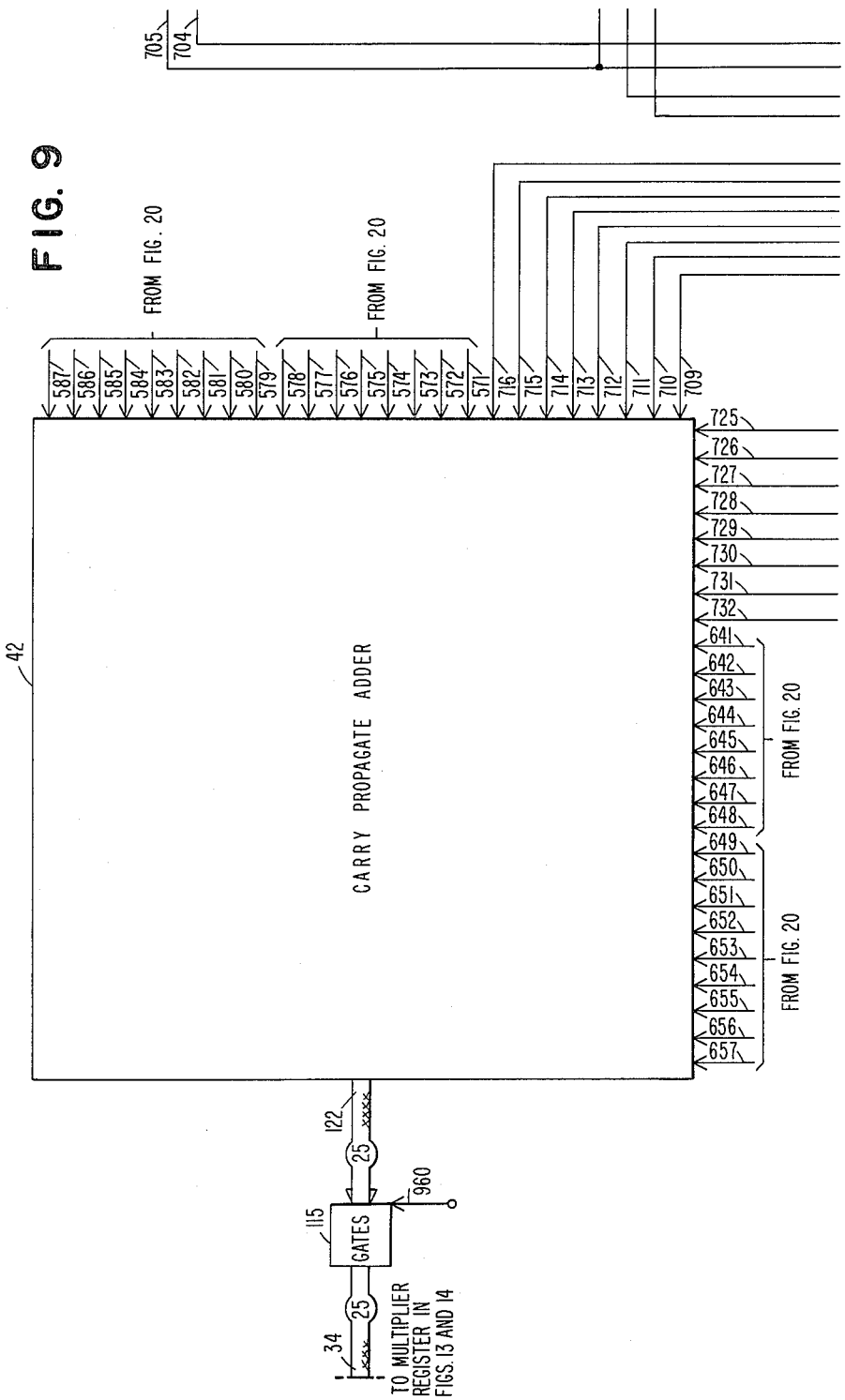

The carry propagate adder 42 in FIG. 9 has two sets of input lines, one set representing a sum value and the other representing a carry value, and when the two values are added, the result is the final product. The input lines 709 through 716 and 571 through 587 and 641 through 657 convey signals representing a carry value. The input lines 709 through 716 to the carry propagate adder 42 in FIG. 9 convey sum signals which have been stored in states 9 through 16 of the multiplier register 30 in FIG. 14, and the input lines 571 through 587 to the carry propagate adder 42 in FIG. 9 convey sum signals directly from respective stages 551 through 567 of the sum register 110 in FIGS. 15 through 17.

The input lines 725 through 732 to the carry propagate adder 42 in FIG. 9 convey carry signals from respective stages 25 through 32 of the multiplier register 30 in FIGS. 13 and 14, and the input lines 641 through 657 to the carry propagate adder 42 in FIG. 9 convey carry signals directly from respective stages 611 through 627 of the carry register 111 in FIGS. 20 through 22. The final product generated by adding the sum and carry signals in the carry propagate adder 42 in FIG. 9 is represented by signals on the conductors of the cable 122. The signals on the conductors of the cable 122 are passed by a set of gates 115 to output conductors in a cable 34 whenever the line 960 is energized with a positive signal. As illustrated in FIG. 1, signals conveyed on the conductors of cable 34 are connected to stages 1 through 25 of the multiplier register 30 in FIG. 1, but the conductors of the cable 34 are not shown thus connected in FIGS. 13 and 14 in the interest of simplicity. The gates 115 in FIG. 9 are like the set of gates 182 in FIG. 19, for example, and they are not shown in detail. The final product represented by signals on the conductors of the cable 34 in FIG. 9 may be conveyed to any storage device not shown although FIG. 1 shows signals on these lines being stored in the multiplier register 30 from whence they may be conveyed on the conductors of a cable 125 to a storage device not shown therein. In essence, the multiplier register 30 in FIG. 1 is shown employed as a buffer storage device for the final product although it need not be so employed.

The multiplicand multiples generator 43 in FIG. 6 receives signals representative of the multiplicand on lines 261 through 268 from the multiplicand register 10 in FIG. 3, and the multiplicand multiples generator 43 in FIG. 6 receives a positive signal on either the line 90 or the line 91 from respective latch registers 70 or 71. If the line 90 has a positive signal thereon, the multiplicand multiples generator 43 in FIG. 6 provides signals on output lines 961 through 969 representative of two times the multiplicand; whereas, if the line 91 has a positive signal thereon, the multiplicand multiples generator 43 in FIG. 6 provides signals on the output lines 961 through 969 representative of four times the multiplicand. The lines 961 through 969 are connected as inputs to respective adders 422 through 430 of the carry save adder 130 in FIGS. 7 and 8. If the line 92 in FIG. 6 has a positive signal, this indicates that the multiple from the multiplicand multiples generator 43 is a negative value which should be in complement form, and accordingly the multiplicand multiples generator supplies the complement of the selected multiple as signals on the lines 961 through 969. If the line 92 in FIG. 6 is negative, this indicates that the selected multiple is a positive value which should be in true form, and the multiplicand multiples generator 43 supplies signals representative of the true number of the selected multiple on the output lines 961 through 969. Thus, signals on the line 92 in FIG. 6 indicate whether the selected multiple is a positive or negative number, a positive signal on the line 92 indicating that the selected multiple is a negative or complement number and a negative signal on the line 92 indicating that the selected multiple is a positive or true number. The line 92 in FIG. 6 is connected as an input to the adders 421 and 431 through 437 of the carry save adder 130 in FIGS. 6 through 8 and the adder 451 of the carry save adder 131 in FIG. 12. Note that when the line 92 has a positive signal representative of a complement or negative number, this positive signal, representative of a binary one, is supplied to the adders 421 and 431 through 437. These adders receive a negative signal representative of a binary zero whenever the selected multiple, represented by signals on the line 961 through 969, is a positive number.

Figure 10:
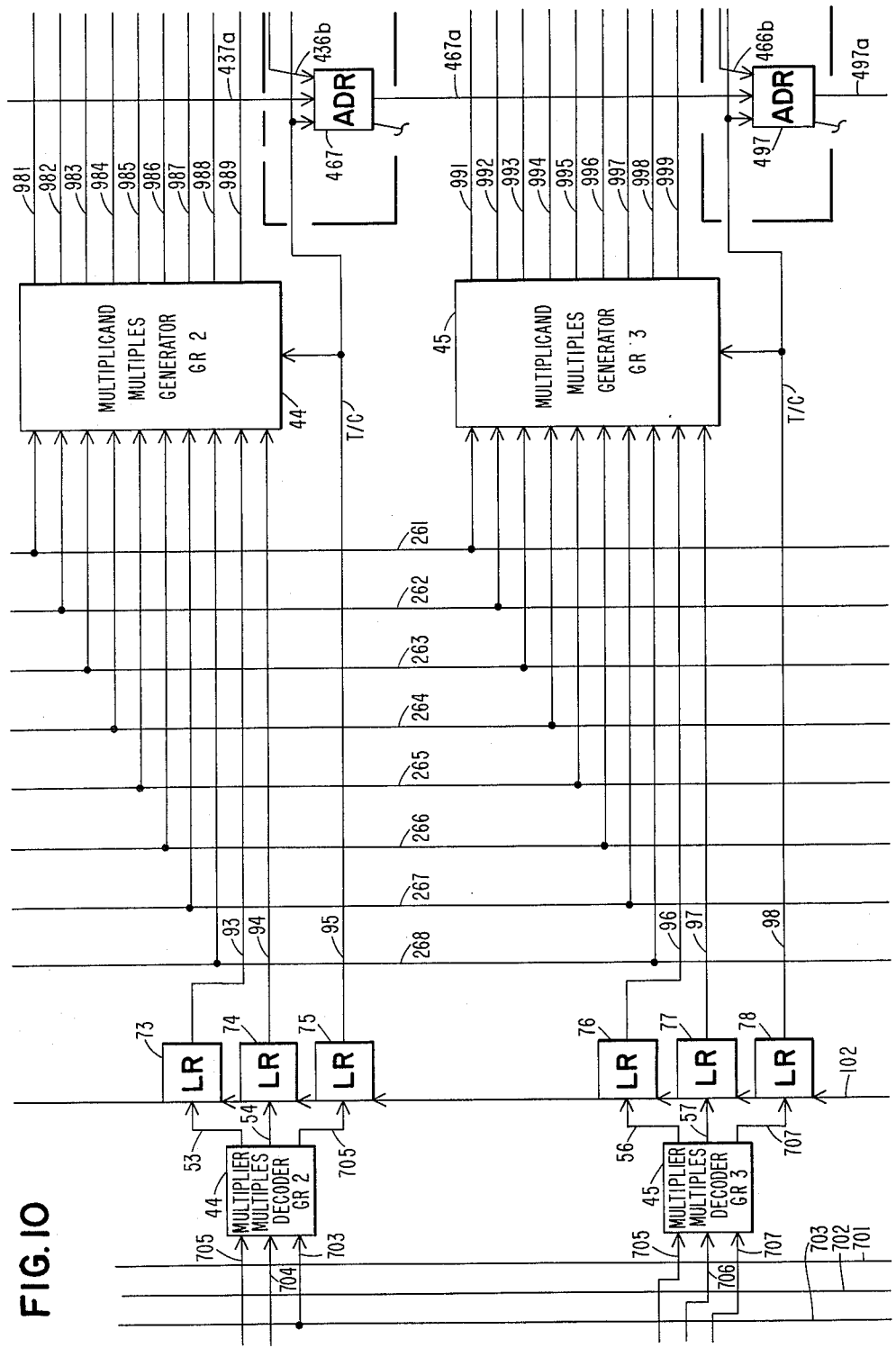

The multiplicand multiples generators 44, 45, and 46 are operated in like fashion to supply the selected multiple for the corresponding higher order bits of the multiplier to respective carry save adders 131 through 133. The multiplicand multiples generator 44 supplies signals representative of the selected multiple on lines 981 through 989 to respective adders 454 through 462 of the carry save adder 131 in FIGS. 10, 11 and 12. The line 95 in FIG. 10 supplies signals representative of the true or complement of the selected multiple to the adders 451 through 453 and 463 through 467 of the carry save adder 131 in FIGS. 10 through 12 and the adder 481 of the carry save adder 132 in FIG. 12. The multiplicand multiples generator 45 in FIG. 10 supplies signals representative of the selected multiple on lines 991 through 999 to respective adders 486 through 494 of the carry save adder 132 in FIGS. 10, 11 and 12. The true or complement control line 98 in FIG. 10 is connected to the adders 481 through 485 and 495 through 497 of the carry save adder 132 in FIGS. 10 through 12 and to the adder 511 of the carry save adder 133 in FIG. 17. The multiplicand multiples generator 46 in FIG. 15 supplies signals representative of the selected multiple on lines 1001 through 1009 to respective adders 518 through 526 of the carry save adder 133 in FIGS. 15, 16 and 17. The true or complement control line 101 in FIG. 15 is connected to adders 511 through 517 and 527 of the carry save adder 133 in FIGS. 15 through 17 and to the latch register stage 611 of the carry register 111 in FIG. 22.

Figure 24:
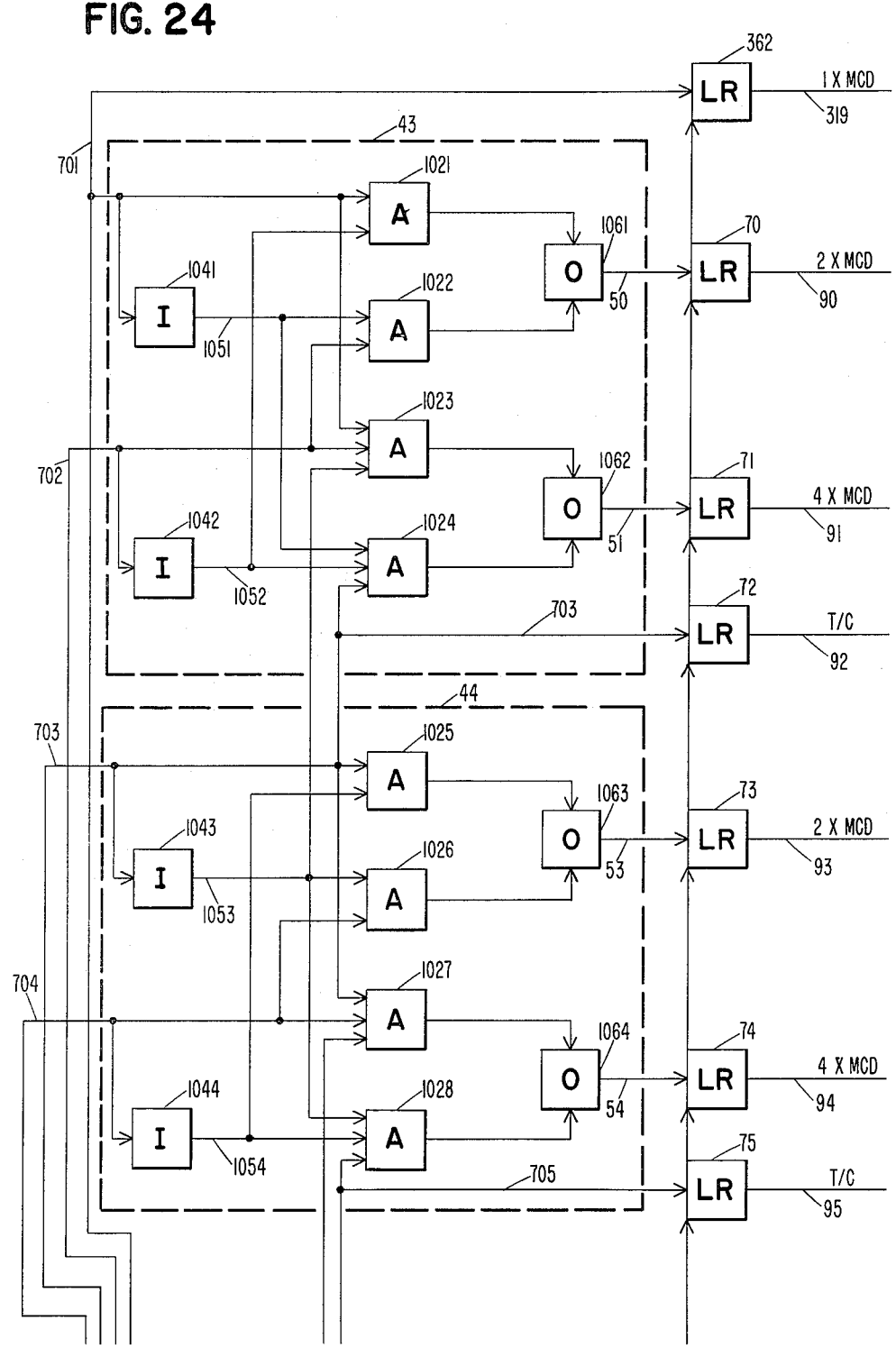
FIGS. 24 and 25 illustrate in detail the logical circuits employed in the multiplier multiples decoders which are shown in block form in FIG. 1.
Figure 25:
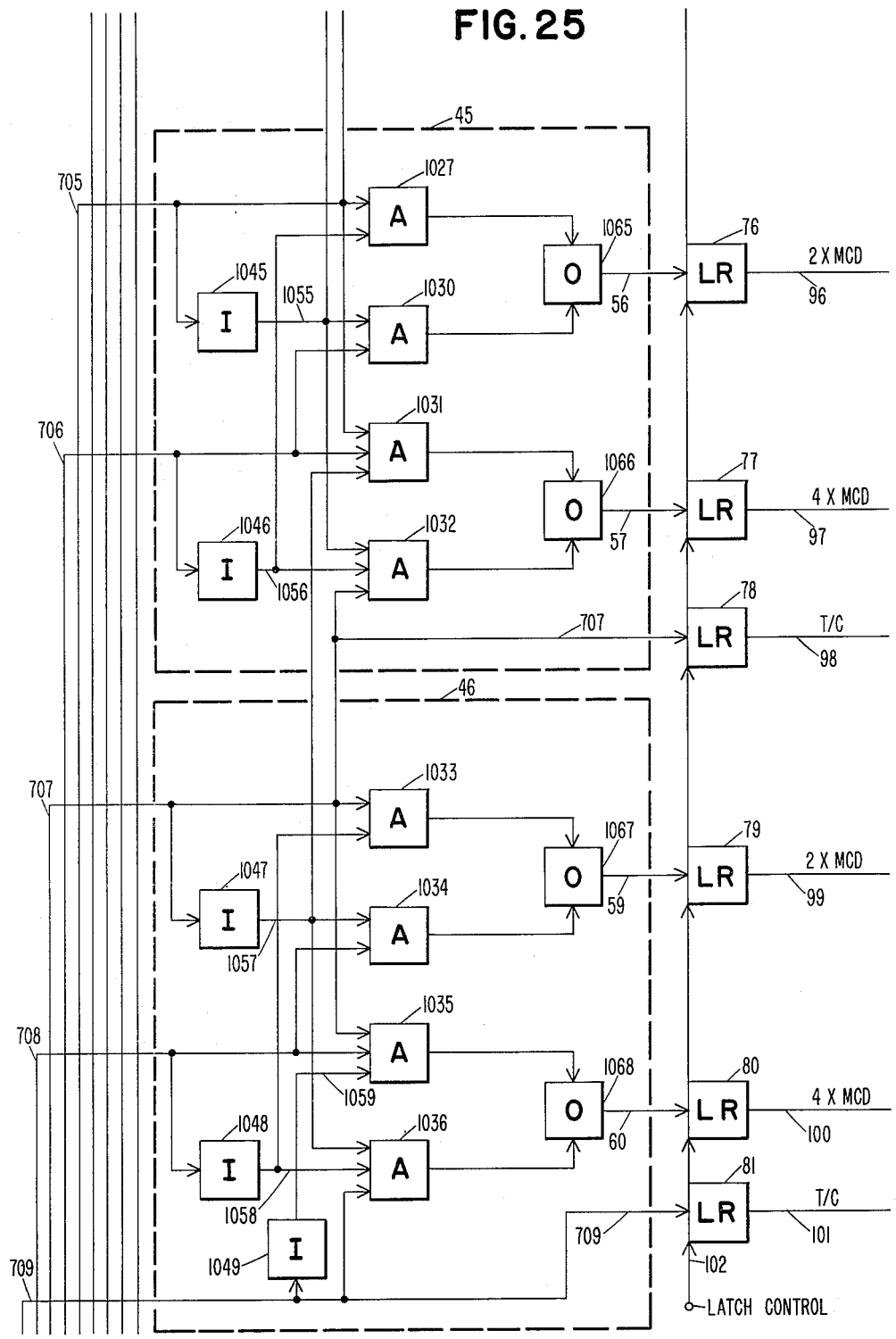

Reference is made to FIGS. 24 and 25 for a detailed description of the multiplier multiples decoders 43 through 46 in the FIGS. 1, 6, 10 and 15. FIGS. 24 and 25 should be arranged as indicated in FIG. 26. The lines 701 through 709 from respective stages 1 through 9 of the multiplier register 30 in FIG. 14 are connected as input lines to the multiplier multiples decoders 43 through 46 in FIGS. 24 and 25. The multiplier multiples decoders 43 through 46 include AND circuits 1021 through 1036. The lines 701 through 709 are connected to respective inverter circuits 1041 through 1049 which in turn have respective output lines 1051 through 1059 connected as illustrated. The AND circuits 1021 through 1036 are operated by signals on the lines 701 through 709 and signals on the lines 1051 through 1059. These AND circuits are connected to associated OR circuits 1061 through 1068. The OR circuits 1061 and 1062 are connected by associated output lines 50 and 51 to respective latch registers 70 and 71 which provide output signals on respective lines 90 and 91. The input line 703 is connected directly to the latch register 72 which in turn provides an output signal on the line 92. When the line 90 is energized with a positive signal by the multiplier multiples decoder 43, the multiple of two times the multiplicand is selected, and when the line 91 is energized with a positive signal, the multiple of four times the multiplicand is selected. The signals on the line 92 determine whether the selected multiple from the multiplier multiples decoder 43 is to be in true or complement form. If the output line 92 is positive, a binary one is represented, and this indicates that the selected multiple indicated by the line 90 or 91 is a negative number and should be represented in complement form. If the signal on the line 92 is positive, this indicates that the selected multiple indicated by the line 90 or 91 is a positive number and should be represented in true form.

The manner in which the multiples are selected by the multiplier multiples decoder 43 may be understood by referring more specifically to the AND circuits 1021 through 1024. Whenever the AND circuits 1021 or 1022 are selected, the multiple of two times the multiplicand is selected. The AND circuit 1021 is selected whenever the line 701 has a positive signal thereon and the line 702 has a negative signal thereon. Note that the negative signal on the line 702 is inverted by the inverter 1024 and applied as a positive signal on the line 1052 to the AND circuit 1021. The AND circuit 1022 is selected whenever the line 701 has a negative signal and the line 702 has a positive signal. Note that the negative signal on the line 701 is inverted by the inverter 1041 and applied as a positive signal on the line 1051 to the AND circuit 1022.

Whenever the AND circuits 1023 or 1024 are selected, the multiple of four times the multiplicand is selected. The AND circuit 1023 is selected whenever the line 701 has a positive signal, the line 702 has a positive signal and the line 703 has a negative signal. Signals on the lines 701 and 702 are connected directly to the AND circuit 1023; whereas, a negative signal on the line 703 is inverted by the inverter 1043 and applied as a positive signal on the line 1053 to the AND circuit 1023. The AND circuit 1024 is selected whenever the line 701 is negative, the line 702 is negative and the line 703 is positive. The negative signals on the lines 701 and 702 are inverted by respective inverters 1041 and 1042 and applied as positive signals to the AND circuit 1024. It is pointed out that whenever the line 703 has a positive signal thereon the complement of the multiples selected by one of the AND circuits 1021 through 1024 is to be used, and this in essence indicates a subtract operation is to take place.

The multiplier multiples decoders 44 through 46 operate in a like manner as the multiplier multiples decoder 43. The logic on which each of the multiplier multiples decoders 43 through 46 operate may be expressed mathematically as follows:

(1) $\quad 2 \times MCD = A \cdot \overline{B} \vee \overline{A} \cdot B$
(2) $\quad 4 \times MCD = \overline{A} \cdot B \cdot C \vee A \cdot \overline{B} \cdot \overline{C}$ where A, B and C represent consecutive bits of the multiplier with A being the lowest order bit and C the highest order bit.

For example, A, B and C for the multiplier multiples decoder 43 in FIG. 24 are represented by the signals on respective lines 701 through 703. For the multiplier multiples decoder 4, the letters A, B and C are represented by signals on respective lines 703 through 705. For the multiplier multiples decoder 45 in FIG. 25, the letters A, B and C are represented by signals on the lines 705 through 707, respectively, and for the multiplier multiples decoder 46, the letters A, B and C are represented by signals on the lines 707 through 709, respectively.

In the multiplier arrangement under discussion the multiplier is divided into two-bit groups, and an extra zero is added to the high order end to produce an even number of bits whenever the multiplier has an odd number of bits. Each two-bit group of the multiplier is supplied to a multiplier multiples decoder. The number of decoders employed may be one or more. In the instant illustration four multiplier multiples decoders have been arbitrarily selected. Once the number of multiplier multiples decoders has been arbitrarily selected, there must be at least as many carry save adder inputs employed as there are such decoders used. Once the number of multiplier multiples decoders is fixed, the number of add operations required to perform a multiply operation becomes fixed, and it may be determined by dividing the number of bits in the multiplier by two times the number of multiplier multiples decoders. For purposes of discussion at this point the term addition refers to the insertion of a positive number in a carry-save adder and the term subtraction refers to the insertion of a complement number in a carry-save adder. Accordingly, one addition or one subtraction is made for each multiplier multiples decoder during a given add cycle. The term add operation at this point in the discussion refers to the totalization of various multiples simultaneously in the various carry-save adders whereby signals representative of a sum and signals representative of carry are supplied to respective sum and carry registers. By using the low order position or bit in each two-bit multiplier group as a reference, an addition or subtraction, as the case may be, will consist of either two times or four times the multiplicand. These multiples may be obtained by shifting of the entry of the multiplicand into the adder one or two positions left from the reference position.

The general rule is that, following any addition or subtraction, the resulting partial product will be either correct or larger than it should be by an amount equal to one times the multiplicand. Thus, if the higher order pair of bits of the multiplier is 00 or 10, the multiplicand would be multiplied by 0 or 2 and added, which gives a correct partial product. If the high order pair of bits is 01 or 11, the multiplicand is multiplied by 2 or 4, not 1 or 3, and added. This gives a partial product that is larger than it should be, and the next add cycle must correct for this.

Following the addition the partial product is shifted left two positions. This multiplies it by four, which means that it is now larger than it should be four times the multiplicand. This may be corrected during the next addition by subtracting the difference between four and the desired shift. Thus, if a pair ends in zero, the resulting partial product will be correct and the following operation will be an addition. If a pair ends in a one, the resulting partial product will be too large, and the following operation will be a subtraction. It can now be seen that the operation to be performed by any pair of bits of the multiplier may be determined by examining that pair of bits plus the low order bit of the next higher order pair. If the bit of the higher order pair is a zero, an addition will result; if it is a one, a subtraction will result. If the lower order bit of a pair is considered to have a value of one and the high order bit a value of two, then the multiple called for by a pair is the numerical value of the pair if that value is even and one greater if it is odd. If the operation is an addition, this multiple of the multiplicand is used. If the operation is a subtraction (the lower order bit of the next higher order pair being a one), this value is combined with minus 4 to determine the correct multiple to use. The result would be zero or negative, with a negative result meaning subtract instead of add. These results are summarized in Table 3 below:

TABLE 3

| Bits | Operation |
| --- | --- |
| CBA | |
| 000 | 0+0= +0 |
| 001 | 0+2= +2 |
| 010 | 0+2= +2 |
| 011 | 0+4= +4 |
| 100 | −4+0= −4 |
| 101 | −4+2= −2 |
| 110 | −4+2= −2 |
| 111 | −4+4= −0 |

The possibility that the low order bit of the multiplier will be a one presents a special problem. When operating from the low order end of the multiplier this problem may be handled very easily. On the first cycle there is no previous partial product. Therefore, zeros are normally being entered into two of the three inputs to the carry save adder 130. If the low order bit of the multiplier is a one, the complement of one times the multiplicand may be entered into the adder by way of the input usually used for the re-entry into the carry save adder 130 of a portion of the previous partial product. In the instant arrangement the gates 126 in FIG. 2 are operated to supply the complement of one times the multiplicand to the OR circuits 142 during the first add operation. The carry gates 127 supply inputs to the OR circuits 142 in FIG. 2 during the second and remaining add operations. At the same time that the complement of one times the multiplicand is entered through the OR circuits 142 in FIG. 2 the multiple of the multiplicand selected by the multiplier multiples decoder 43 in FIG. 1 is entered as a second input along the conductors of the cable 150 in FIG. 2 to the carry-save adder 1.

Accordingly, it is seen that during the first add operation one times the multiplicand in complement form may be supplied to the carry-save adder 130 in FIG. 2 simultaneously as the multiples of the multiplicand are entered into the carry-save adders 130 through 133 as determined by the decoding operation and that on the second and subsequent add cycles only the selected multiples of two or four times the multiplicand in true or complement form, as the case may be, are supplied to the carry-save adders 130 through 133, thereby ultimately generating a correct final product.

Figure 27:
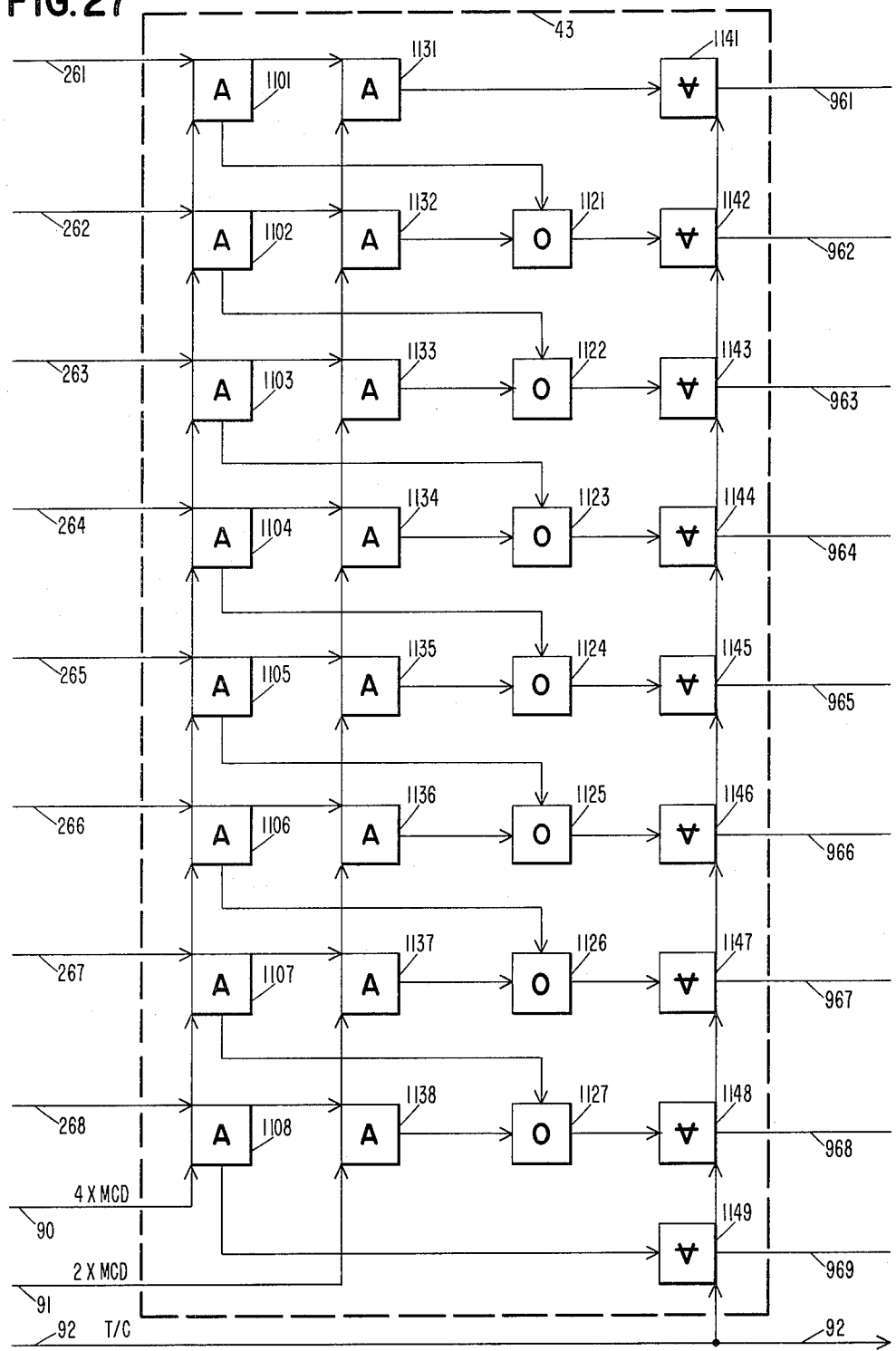
FIG. 27 illustrates in detail the logic circuits employed in the multiplicand multiple generators which are shown in block form in FIG. 2.

The multiplicand multiples generator 43, illustrated in block form in FIGS. 1 and 6, is illustrated in detail in FIG. 27. The multiplicand multiples generator 43 in FIG. 27 receives signals representative of the multiplicand on the lines 261 through 268 and provides signals on the output lines 961 through 969 representative of two times or four times the multiplicand in either the true or the complement form. When the line 90 in FIG. 27 is energized with a positive signal, this indicates that four times the multiplicand is selected. Accordingly, the AND circuits 1101 through 1108 are conditioned to pass positive signals to associated OR circuits 1121 through 1127 if a positive signal is received on the lines 261 through 268 by the respective AND circuits 1101 through 1108. In case negative signals are received on the input lines 261 through 268 when the line 90 is positive, then the AND circuit 1101 through 1108 supplied negative signals to associated OR circuits 1121 through 1127. When the line 91 in FIG. 27 is energized with a positive signal, this indicates that two times the multiplicand is selected, and AND circuits 1131 through 1138 are conditioned by the positive signal on the line 91 to pass positive signals on the lines 261 through 268 to associated OR circuits 1121 through 1127. The OR circuits 1121 through 1127 have output lines connected to exclusive OR circuits 1142 through 1148, respectively. The AND circuit 1131 is connected directly to the exclusive OR circuit 1141, and the AND circuit 1108 is connected directly to the exclusive OR circuit 1149, When the line 92 in FIG. 27 is energized with a positive signal, the exclusive OR circuits 1141 through 1149 are operated to provide the complement of the selected multiple on output lines 961 through 969, and when the line 92 is energized with a negative signal, it operates the exclusive OR circuits 1141 through 1149 to provide signals on the output lines 961 through 969 representative of the selected multiple in true form.

Whenever two times the multiplicand is selected, the line 91 in FIG. 27 is energized with a positive signal, and signals on the lines 261 through 268 which represent the multiplicand pass through the AND circuits 1131 through 1138 to the output lines 961 through 968. In this case the line 90 has a negative signal, and thus the AND circuit 1108 supplies a negative signal to the exclusive OR circuit 1149. If the line 92 is positive, indicating that the complement of the selected multiple is to be used, the negative signal from the AND circuit 1108 causes the exclusive OR circuit 1149 to supply a positive signal on the output line 969; whereas, if the signal on the line 92 is negative, indicating that the true form of the selected multiple is to be used, the negative signal from the AND circuit 1108 causes the exclusive OR circuit 1149 to supply a negative signal on the output line 969. It is seen therefore that when the selected multiple is two times the multiplicand, the exclusive OR circuit 1149 provides a negative signal on the output line 969 representative of a binary zero when the selected multiple of two times the multiplicand is represented in true form, and the exclusive OR circuit 1149 provides a positive signal on the output line 969 representative of a binary one when the selected multiple of two times the multiplicand is represented in complement form.

Whenever the selected multiple is four times the multiplicand, the line 90 is positive and the line 91 is negative. In this instance the AND circuit 1131 supplies a negative signal to the exclusive OR circuit 1141, and for reasons explained in the preceding paragraph, the output signal on the line 961 is negative representing a binary zero when four times the multiplicand is represented in true form, and the signal on the output line 961 is positive representing a binary one whenever four times the multiplicand is represented in complement form.

Multiples of the multiplicand may be secured by shifting one position to secure two times the multiplicand or two positions to secure four times the multiplicand with the shifts being in the direction of the higher order bits. Signals on the lines 261 through 268 representative of one times the multiplicand pass directly to output lines 961 through 968 in FIG. 27 without a shift taking place between orders or bits whenever the multiple of two times the multiplicand is selected. The shift of one order or position which doubles one times the multiplicand to generate the multiple of two times the multiplicand is accomplished by shifting the entry position of these lines into the associated carry-save adder 130 in FIGS. 7 and 8. Note that the lowest order adder position is represented by the adder 421 in FIG. 8, and it does not receive signals from the lines 961 through 969. Instead, signals on the lines 961 through 969 are connected to respective adders 422 through 429. Thus it is seen that signals on the lines 961 through 969 representative of one times the multiplicand are effectively shifted one position to the left upon entry into the carry-save adder 130 in FIGS. 7 and 8, thereby doubling one times the multiplicand into two times the multiplicand upon entry into the carry-save adder 130.

Whenever four times the multiplicand is to be supplied to the carry-save adder 130 in FIGS. 7 and 8, the multiplicand multiples generator 43 in FIG. 27 effects a shift of one position to the left by the energization of the AND circuits 1101 through 1108, and a second shift to the left is effected upon entry into the carry-save adder 130 as explained above for the multiple of two times the multiplicand. It is pointed out that when the selected multiple applied to the adder circuits 422 through 429 of the carry-save adder 130 in FIGS. 7 and 8 is a true number, the line 92 is negative and inserts zeros in adder positions 421 and 430 through 437 in FIGS. 6, 7, and 8. When the selected multiple is in complement form, the signal on the line 92 in FIG. 27 is positive, and this inserts binary ones in adder positions 421 and 430 through 437 in FIGS. 6, 7 and 8.

The AND circuits, OR circuits, exclusive OR circuits and inverter circuits employed in the multiplier arrangement of this invention may be any one of various suitable types, and a detailed consideration of them is not considered necessary since they are so widely known.

Figure 28:
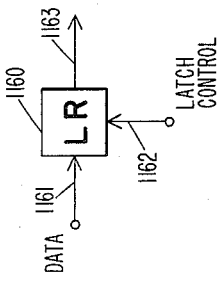
FIG. 28 illustrates a latch register in block form.
Figure 29:
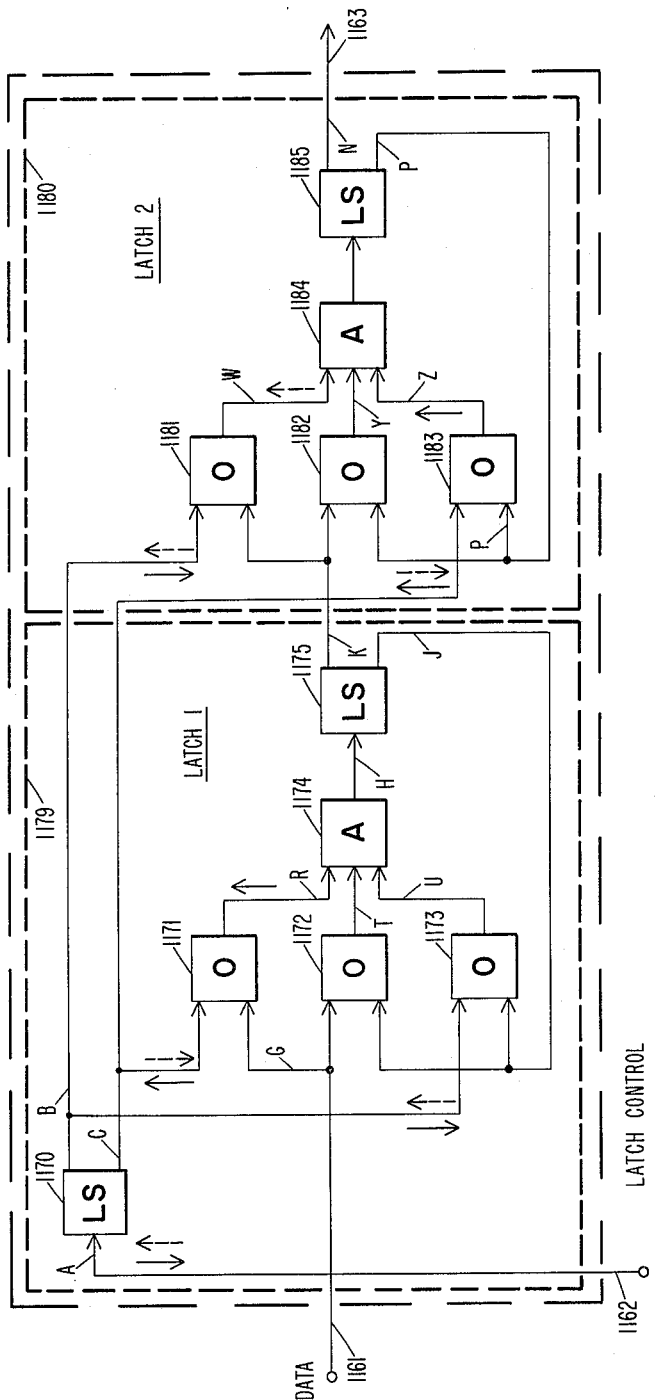
FIG. 29 illustrates in detail the logic circuits employed in the latch register of FIG. 28.

Reference is made to FIGS. 28 and 29 for a detailed discussion of the latch register circuits employed throughout the various figures of the drawings. A latch register is a device having two inputs, a data signal input and a latch control input. The latch register accepts information at the time the latch control signal changes from a de-energized condition to an energized condition. For this purpose the signal input must maintain its desired condition for a small interval of time immediately preceding, during and following the application of the latch control signal, this interval being measurable in terms of circuit transit times. At all other times, regardless of whether the latch signal is energized or de-energized, the output from the latch register is not controlled by the state of the data input signal which may be changed at will.

The latch register circuit illustrated in block form in FIG. 28 is shown in detail in FIG. 29 as including circuits 1170 through 1175 which constitute a first latch 1179 and circuits 1181 through 1185 which constitute a second latch 1180. By "latch" is meant a circuit having a control input and a data input, the output of which will follow the data input when the control input is de-energized, but the output will remain constant at the condition it had when the control input changed as long as the control input is energized, regardless of any changes of the input signal during this time. A latch register differs from a flip-flop in that a flip-flop is a bistable device which, when set to one state, will retain that state until set to the other state.

FIG. 29 shows a basic latch register circuit. It consists of two latch circuits connected in series; that is, the output of the first latch circuit is connected as the input to the second latch circuit. The latch control signals are connected in opposition; that is, when the first latch is locked, the second latch is free, and when the second latch is locked, the first latch is free.

In the illustration the AND and OR circuits are assumed to be constructed of diodes, and the level setter (LS) is made from transistors. The signal on the lower output line from the level setter 1164 has the same polarity as that of the latch control signal on the line 1162; while the polarity of the signal on the upper output line is opposite to the polarity of the signal on the input line 1162. For purposes of this description, the transit time through one level setter is considered to represent one unit of time. The transit time through the diode AND circuits and OR circuits is assumed zero. The logic is assumed to be positive.

Figure 30:
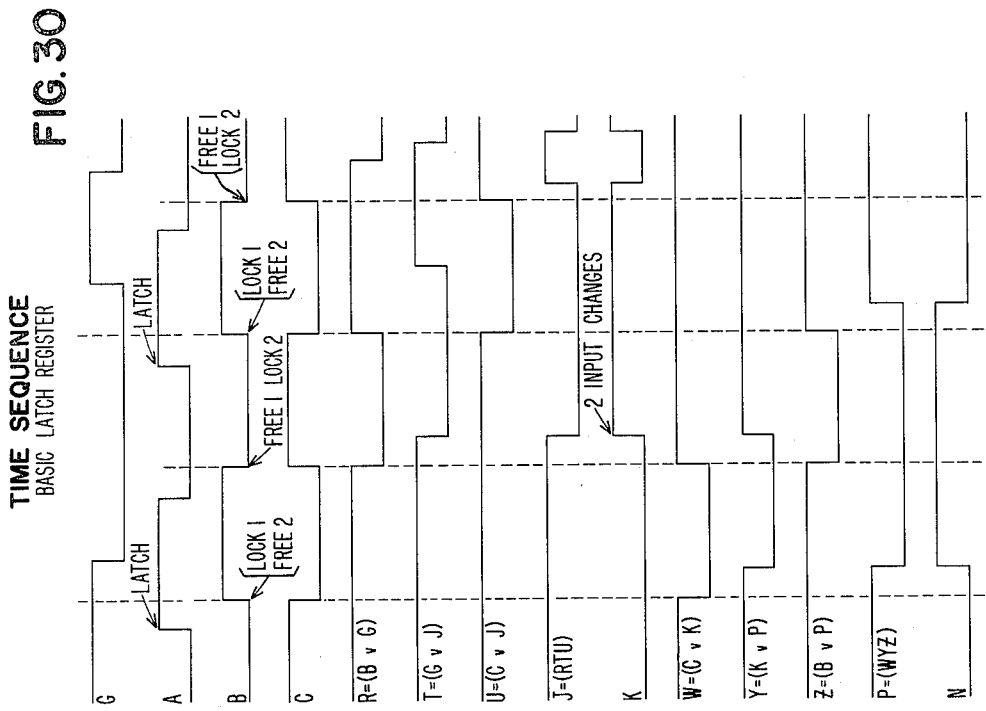
FIG. 30 shows timing diagrams which illustrate the operation of a latch register circuit.

In order to illustrate the operation of the latch register circuit 1160 in FIG. 29, various points in the circuit are designated by different letters of the alphabet, and signals at these points change their potential in a manner indicated in FIG. 30. FIG. 30 is a timing sequence diagram illustrating how the waveforms change at various points in the circuit of FIG. 29. When the latch control signal on the line 1162 is negative, the latch 1 is free and the latch 2 is locked. The dashed arrows indicate the polarity of the signal level at the various points indicated as determined by the latch control signal at A being negative. The point C being positive causes the output of the OR circuit 1173 to be positive, thereby making U positive. This leaves points R and T to determine the condition of H. Since B is negative, R is controlled only by G, and T is positive whenever G is positive. Therefore, the potential point H will follow the potential at G and the potential at J will follow the potential at H, though the changes at J will lag one unit of time behind the corresponding change at H. When the control signal at A is negative, the latch 1 is locked and the latch 2 is free. The solid arrows indicate the polarity of the signal level at the various points indicated as determined by the control signal at A being positive. In this case the condition of the signals at points J and K will not change even though the signals at G do change. Since the signal at B is positive, the signal at R will remain positive. The signal at T will be positive if the signal at J is positive, though the signal at T will not necessarily be negative if G is negative. Since the signal at C is negative, the signal at U is controlled only by the condition of the signal at J. Therefore, if the signal at J is positive, it will be held positive by the feedback through the points U and T. If the signal at J is negative, there is no path by which the signal G can bring the signal level at U positive.

In order to set a signal into the latch register, the data signal at G must be held at its desired condition sufficiently long in advance of changing the signal at B and C for the signal at J to have acquired the same condition as the signal at G, and the signal at G must maintain this condition until the switching of the signals at B and C is completed. The latch 2 operates in the same manner as the latch 1 except that its input is the signal level at K instead of the signal level at G, and the connections of the input lines of the level setter 1170 have been reversed. Note that the signals at B and C have been inverted in latch 2 when compared to latch 1.

FIG. 30 shows a sequence time chart from which it may be seen that although the latch control signal locks latch 2 at the same time it frees latch 1, the change in the output of latch 1 does not occur until one unit of time later which allows sufficient time for the locking action of latch 2 to be completed. An overlap must be maintained here to assure reliable operation.

The use of the signal level at K as an input to the latch 2 is selected to make the signal level at N, which has no other load on it, agree with the signal level at G. This also reduced the effect of skew between B and C. However, if desired the signal level at J could be used as the input to the latch 2 as well as for feedback. If this were done, the signal level at P would be set to agree with the signal level at G, and P instead of N would be used as the output.

The level setters (LS) illustrated in block form in FIG. 29 may be any one of various suitable types, and one suitable arrangement is illustrated in detail in FIG. 31. The level setter 1190 in FIG. 31 includes transistors 1191 and 1192 connected as shown. When a signal is applied to an input line 1193 of one polarity, a signal of the same polarity appears on an output line 1194. The output line 1195 has a signal the polarity of which is opposite to the polarity of the signal on the output line 1194.

In operation a positive signal applied to the input line 1193 causes the transistor 1191 to conduct and the transistor 1192 to be non-conductive. Accordingly, the potential at the output line 1194 approaches a value of approximately positive 6 volts. If a signal level of approximately zero volts is applied to the input terminal 1193, the transistor 1191 becomes non-conductive and the transistor 1192 becomes conductive. Consequently, the potential at the output line 1194 approaches ground or zero level. A zero level is more negative than the positive six volt level, and the zero level is accordingly referred to as a down or negative level. The level setter 1190 serves to accept signal levels on the input line 1193 which vary within limits around plus six volts or zero volts and provides output signals on the line 1194 which are fixed in amplitude within certain precise limits. When the signal on the output line 1194 is six volts positive, a signal on the output line 1195 is approximately zero volts, and when the signal on the output line 1194 is approximately zero volts, the signal on the output line 1195 is approximately six volts positive.

Figure 32:
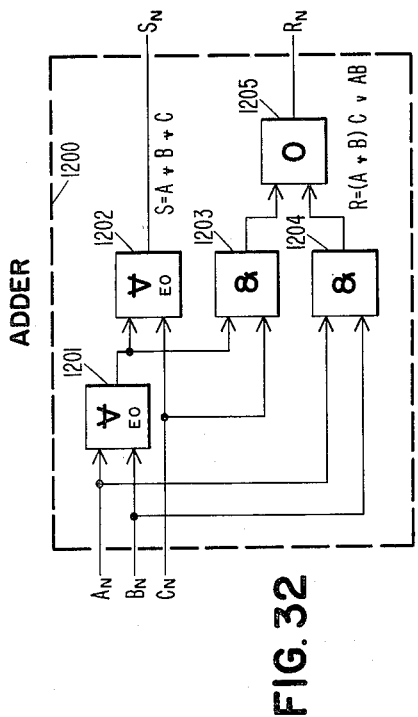
FIGS. 32 and 33 illustrate adder circuits in logic block form.
Figure 33:
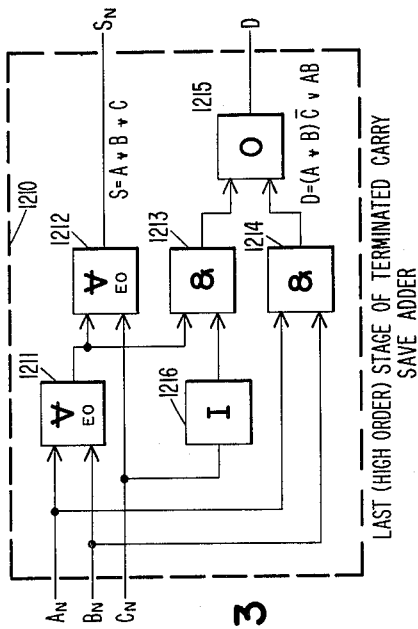

The adder circuits employed in the carry-save adders of this multiplier arrangement may be any one of many suitable types, and one suitable adder circuit is illustrated in FIG. 32. It includes exclusive OR circuits 1201 and 1202, AND circuits 1203 and 1204 and an OR circuit 1205 connected as shown. Three binary inputs to the adder are labeled $A_n$, $B_n$ and $C_n$. The outputs which represent a sum and carry from the addition of the quantities $A_n$, $B_n$ and $C_n$ are designated by the letters $S_n$ and $R_n$. A positive signal on the input lines represents a binary one and a negative signal represents a binary zero. A positive signal on the output line $S_n$ represents a sum of one, and a positive signal on the output line $R_n$ represents a carry of one. Whenever $A_n$ and $B_n$ are unlike, the exclusive OR circuit 1201 supplies a positive signal to the exclusive OR circuit 1202. Whenever the signal supplied by the exclusive OR circuit 1201 to the exclusive OR circuit 1202 is unlike $C_n$, a positive signal is supplied on the output line $S_n$ which represents a binary sum of one. For all other conditions the output line $S_n$ is a negative signal representing a binary sum of zero. The exclusive OR circuit 1201 supplies a signal to the AND circuit 1203. Whenever both of these lines are positive, the AND circuit 1203 provides a positive signal through the OR circuit 1205 to the output line $R_n$. A positive signal on the line $R_n$ represents a carry of one. The lines $A_n$ and $B_n$ are connected to the AND circuit 1204 which in turn is connected through the OR circuit 1205 to the output line $R_n$. Whenever both $A_n$ and $B_n$ are positive, the output line $R_n$ is rendered positive, thereby indicating a carry of one. When neither the AND circuits 1203 nor 1204 provides a positive signal to the OR circuit 1205, a negative signal appears on the output line $R_n$ representing a carry of zero. Accordingly, the adder circuit 1200 responds to signals on the input lines $A_n$, $B_n$ and $C_n$ and provides signals on the output lines $S_n$ and $R_n$ representative of a sum and carry, respectively. The adder 1200 in FIG. 32 is employed in each adder stage of the carry-save adders 130 through 133 of FIGS. 3 through 22. The adder 1201 in FIG. 33 is the same in construction as the adder 1200 in FIG. 32 with the exception that an inverter 1216 is disposed between the input lines $C_n$ and the AND circuit 1213. This adder is used in a multiplier arrangement described subsequently wherein the number of adders in each carry-save adder is reduced, and the reason for the modification of this adder is discussed there.

The carry propagate adder 42 illustrated in block form in FIGS. 1 and 9 is not shown in detail since it may be any suitable adder circuit wherein two numbers are added and the carries between stages are allowed to propagate through the various stages to provide a correct final sum.

Figure 19:
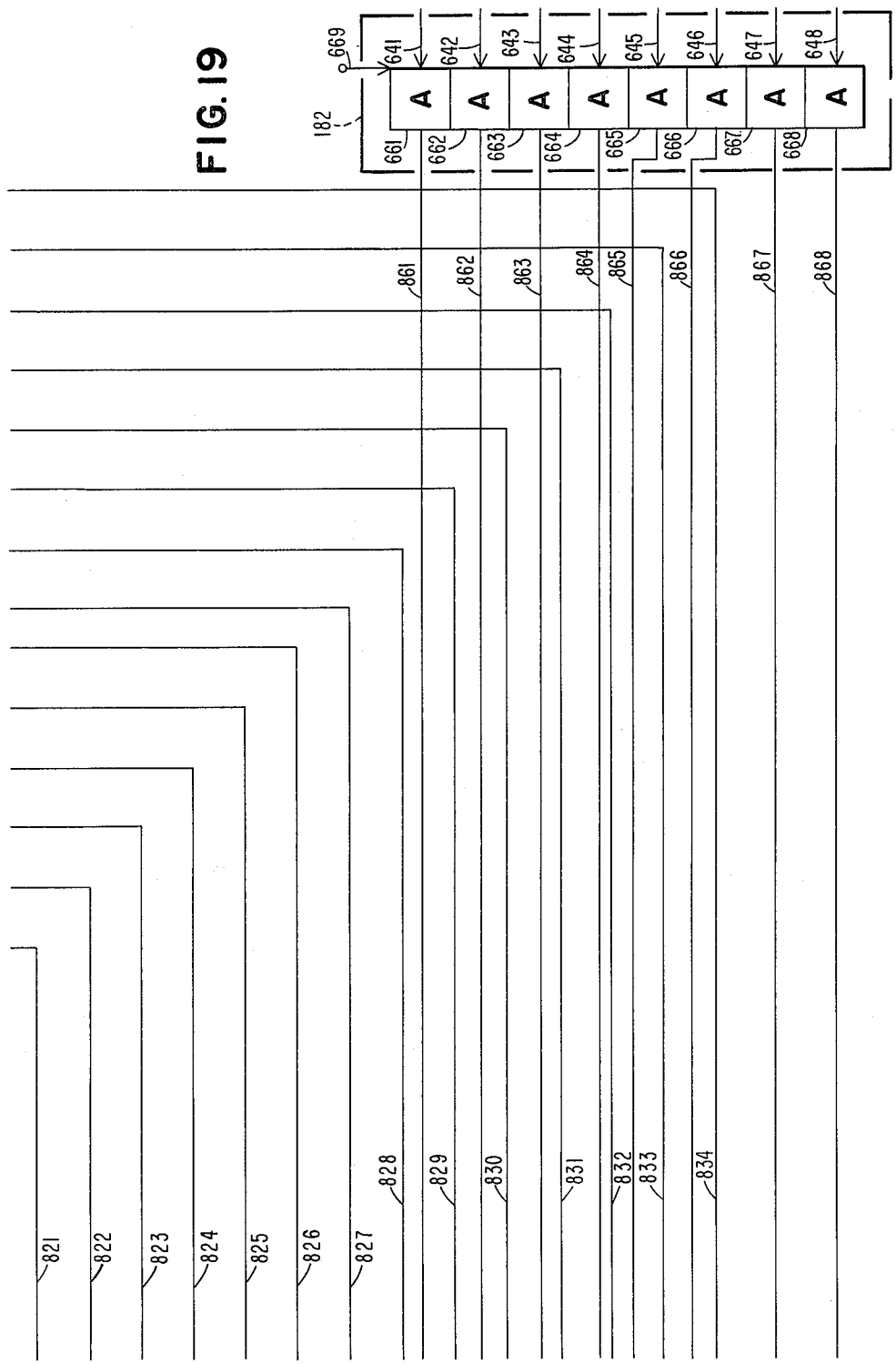

In the operation of the multiplier arrangement illustrated in FIGS. 3 through 22 the final product of two numbers is generated by a sequence of steps. The sequence of operations is summarized in the following steps:

*Step 1.*—Enter the multiplier in positions 1 through 16 of the multiplier register 30 in FIGS. 13 and 14, and enter zeros in positions 17 through 32 of this register. Enter the multiplicand in positions 1 through 8 of the multiplicand register 10 in FIG. 3. The low order position of the multiplier and the multiplicand are positioned in the right most stage which is stage number 1 of their respective registers. The line 790 to the shift gates 104 in FIGS. 13 and 18, the line 599 to the gates 180 in FIG. 15, and the line 669 to the gates 182 in FIG. 19 are energized with a positive signal, and these positive levels are maintained throughout the multiply operation. Clear the sum register 110 in FIGS. 15 through 17 and the carry register 111 in FIGS. 20 through 22 and the multiplicand selection latch register circuits 70 through 81 in FIGS. 6, 10 and 15. The operations thus far may be considered a preliminary cycle

*Step 2.*—Energize the line 363 in FIG. 7 with a positive level to cause proper treatment of the low-order bit of the multiplier. After the first add operation is completed, energize the line 363 in FIG. 7 with a negative signal and maintain this negative level throughout the rest of the multiply operation. Energize the latch control line 102 in FIG. 15 with a positive pulse. As soon as the line 102 in FIG. 15 is made positive, signals on the input lines 50, 51, 53, 54, 56, 57, 703, 705 and 707 are stored in the multiplicand selection latch register circuits 70 through 81. When the positive pulse on the line 102 in FIG. 15 is terminated, the signal level on this line assumes a negative value which causes the signals earlier appearing on the input lines to these latch register circuits to appear on the output lines 90 through 101. The signals on the lines 90 through 101 cause the multiplicand multiples generators 43 through 46 in FIGS. 6, 10 and 15 to supply the selected multiple of the multiplicand in true or complement form to associated carry save adders 130 through 133 in FIGS. 6 through 8, 10 through 12, and 15 through 17. The lowest order bit of the multiplier now is stored in the latch register 362 in FIG. 6. If it is a one, the line 361 is positive, and the AND circuit 360 in FIG. 7 provides a positive output level since the line 363 is positive at this time. Accordingly, the complement of one times the multiplicand is entered through AND circuits 126 and OR circuits 142 in FIGS. 4 and 5 into the carry save adder 130 in FIGS. 7 and 8. If the lowest order bit of the multiplier is a zero, the AND circuit 360 in FIG. 7 provides a negative output signal because the line 361 is negative. Accordingly, zeros are entered through the AND circuit 126 and OR circuit 142 in FIGS. 4 and 5 into the carry-save adder 130 in FIGS. 7 and 8. The positive pulse on the line 102 in FIG. 15 also causes the multiplier in positions 1 through 16 of the multiplier register 30 in FIG. 14 to be shifted to the right eight stages, thereby discarding the eight low order bits of the multiplier and bringing the next group of eight bits into stages 1 through 8 of the multiplier register so that they may be applied to the multiplier multiples decoders 43 through 46. After this eight position shift is completed, positions 9 through 32 of the multiplier register 30 in FIGS. 13 and 14 have zeros because positions 17 through 32 held zeros when the multiplier was set into positions 1 through 16 in step 1 above. Information in the latch register stages 551 through 558 of the sum register passes through the AND circuits 591 through 598 in FIG. 15 and is stored in positions 9 through 16 at the same time that the multiplier is shifted to the right eight positions. Likewise, information in latch registers 611 through 618 of the carry register 111 in FIGS. 21 and 22 passes through the AND circuits 661 through 668 in FIG. 19 and is stored in positions 25 through 32 of the multiplier register 30 in FIG. 13 at the same time that the multiplier is shifted right eight positions. Information in the latch register stages 559 through 567 of the sum register 110 in FIGS. 15 through 17 and data from the latch register stages 619 through 627 of the carry register 111 in FIGS. 20 through 22 is re-entered into the carry-save adder 130 in FIGS. 6 through 8. However, the information from the sum and carry registers is zeros at this time since this transfer takes place before an add operation in the carry-save adders changes the output of these registers.

*Step 3.*—After sufficient time has elasped for the multiples of the multiplicand supplied to the carry-save adders 130 through 133 to pass through all of the adder stages and generate the first partial product as sum signals on the lines 511a through 527a and carry signals on the lines 101b and 511b through 527 b in FIGS. 15 through 17 and FIGS. 20 through 22, the line 102 in FIG. 15 is energized with another positive pulse, and the positive level on the line 363 in FIG. 7 is changed to a negative level which level is maintained throughout the rest of the multiply operation. The positive pulse on the line 102 in FIG. 15 sets the results of decoding the second set of eight bits of the multiplier into the multiplicand selection latch registers 70 through 81 from the multiplier multiples decoders 43 through 46 in FIGS. 6, 10 and 15; it shifts the multiplier eight positions to the right in the multiplier register 30 in FIGS. 13 and 14; it enters the data from the latch register positions 551 through 558 of the sum register 110 in FIGS. 16 and 17 in positions 9 through 16 of the multiplier register in FIG. 14; it enters the data from the latch register positions 611 through 619 to the carry register 116 in FIGS. 21 and 22 in positions 25 through 32 of the multiplier register 30 in FIG. 13; and data from the latch register positions 559 through 567 of the sum register 110 in FIGS. 15 and 16 and the data in the latch register positions 619 through 627 of the carry register 111 in FIGS. 20 through 22 is re-entered into carry-save adder 130 in FIGS. 6 through 8. At the time this transfer takes place the output levels from the carry and sum registers are still zeros. Upon termination of the positive pulse on the line 102 in FIG. 15, the first partial product is stored in the sum and carry registers in FIGS. 15 through 17 and 20 through 22.

*Step 4.*—After sufficient time has elapsed for the multiples of the multiplicand supplied to the carry-save adders 130 through 133 and the re-entered portion of the sum and carry signals from the preceding partial product to pass through all of the adder stages and generate the second partial product as sum signals on the lines 511a through 527a in FIGS. 15 through 17 and carry signals on the lines 101 and 511b through 527b in FIGS. 20 through 22, the line 102 in FIG. 15 is energized with another positive pulse. This pulse sets the results of decoding of the third set of eight bits of the multiplier into the multiplicand selection latch registers 70 through 81 from the multiplier multiples decoders 43 through 46 in FIGS. 6, 10 and 15, but the third set of eight bits of the multiplier is filled with zeros, thereby causing the multiplicand multiples generators 43 through 46 in FIGS. 6, 10 and 15 to supply zeros to the carry-save adders associated therewith. The positive pulse on the line 102 in FIG. 15 causes the multiplier register to be shifted eight positions to the right; it enters the data from the latch register positions 551 through 558 of the sum register 110 in FIGS. 16 and 17 in positions 9 through 16 of the multiplier register in FIG. 14; it enters the data from the latch register positions 611 through 619 of the carry register 116 in FIGS. 21 and 22 in positions 25 through 32 of the multiplier register in FIG. 13; and data from the latch register positions 559 through 567 of the sum register 110 in FIGS. 15 positions 619 through 627 of the carry register 111 in FIGS. 20 through 22 is re-entered into the carry-save adder 130 in FIGS. 6 through 8. At this point the eight lowest order bits of the first partial product sum and the eight lowest order bits of the first partial product carry are stored in the multiplier register 130 with the eight lowest order sum bits being stored in positions 9 through 16 and the eight lowest order carry bits being stored in positions 25 through 32 of the multiplier register 30 in FIGS. 13 and 14, and the second partial product is represented by signals on the output lines 571 through 587 of the sum register 110 in FIGS. 15 through 17 and the output lines 641 through 657 of the carry register 111 in FIGS. 20 through 22.

*Step 5.*—Change the positive signal on the line 599 in FIG. 15 to a negative signal, thereby deconditioning the set of gates 180 and causing negative signals representative of binary zero to be supplied on output lines 851 through 858. Change the positive signal on the line 669 in FIG. 19 to a negative signal, thereby deconditioning the set of gates 182 and establishing negative signals representative of binary zero on the output lines 861 through 868. Change the positive signal on the line 790 in FIG. 18 to a negative level, thereby deconditioning the set of shift gates 104 and establishing negative signals representative binary zero on the output lines 811 through 834. That portion of the first partial product sum stored in positions 9 through 16 of the multiplier register 30 in FIG. 14 is represented by signals on output lines 709 through 716 in FIG. 14, and the signals on these lines are coupled to the carry propagate adder 42 in FIG. 9. The lines 709 through 716 to the carry propagate adder 42 at FIG. 9 represent inputs to the lower order position of this adder. The sum signals of the second partial product appearing on output lines 571 through 587 from the sum register 110 in FIGS. 15 through 17 are coupled to the carry progagate adder 42 in FIG. 9 to higher ascending orders of this adder. That portion of the first partial product carry stored in positions 25 to 32 of the multiplier register 30 in FIG. 13 is coupled on output lines 725 through 732 to the carry propagate adder 42 in FIG. 9, and, that portion of the second partial product carry appearing on output lines 641 through 657 of the carry register 111 in FIGS. 20 through 22 is coupled to the carry propagate adder 42 in FIG. 9. The line 725 is coupled to the lowest order stage of the carry propagate adder 42 in FIG. 9 with adjacent lines to the left being connected to successively higher order stages of this adder. The line 657 is coupled to the highest order stage of the carry propagate adder 42. The carry signals and the sum signals supplied to the carry propagate adder 42 are added therein and the result appears as signals on the conductors of the cable 122. The signal level on the line 960 in FIG. 9 is maintained at a negative value throughout the multiply operation, but it is changed from a negative value to a positive value at this point so that data signals on the conductors of the cable 122 may pass to the conductors of the cable 34, and they are coupled to positions 1 through 25 of the multiplier register 30 as shown in FIG. 1. The line 102 in FIG. 15 is energized with a positive pulse, and this causes the signals on the conductors of the cable 34 to be stored in positions 1 through 25 of the multiplier register 30 in FIGS. 13 and 14. Accordingly, the final product is stored in the multiplier register.

It is convenient at this point to examine in greater detail the operations which take place in the various parts of the multiplier arrangement illustrated in FIGS. 1 through 22 during a multiply operation. For this purpose, FIGS. 34, 35 and 36 are helpful and they will be referred to to indicate the data or the control action at the locations indicated. It takes five steps to perform a multiply operation as explained above. FIG. 34 illustrates the condition of the multiplier register 30 in FIGS. 1, 13 and 14 at the end of each step. FIG. 35 shows the condition of the carry-save adders 1 through 4 in FIG. 2, FIGS. 6 through 8, FIGS. 10 through 12 and FIGS. 15 through 17 at the end of each step. FIG. 36 shows the condition of the multiplicand multiples selection latch registers 70 through 81 at the end of each step.

For purposes of illustration let it be assumed that the multiplier is the binary number 1110001011001011 and that the multiplicand is the binary number 10100110. During the first step the foregoing multiplier is stored in the multiplier register 30 and the multiplicand is stored in the multiplicand register 10. Referring to FIG. 34, it is seen that the multiplier is stored in positions 1 through 16 and zeros are stored in positions 17 through 32 of the multiplier during step 1. During step 2 the multiplier register is shifted to the right eight positions and zeros are accordingly entered in positions 9 through 16 as the multiplier is shifted to the right. During step 3 the multiplier register is shifted to the right eight positions, and the multiplier is shifted completely out of this register. During step 4 the eight lowest order carry bits of the partial product are stored in positions 25 through 32 of the multiplier register, and the eight lowest order bits of the first partial product sum are stored in positions 9 through 16 of the multiplier register. During step 5 the final product is generated in the carry propagate adder 42 in FIG. 9, and the final product is stored in positions 1 through 24 of the multiplier register. Accordingly, it is seen from FIG. 34 what data is held in the multiplier register 34 at the end of each of the steps 1 through 5.

Figure 11:
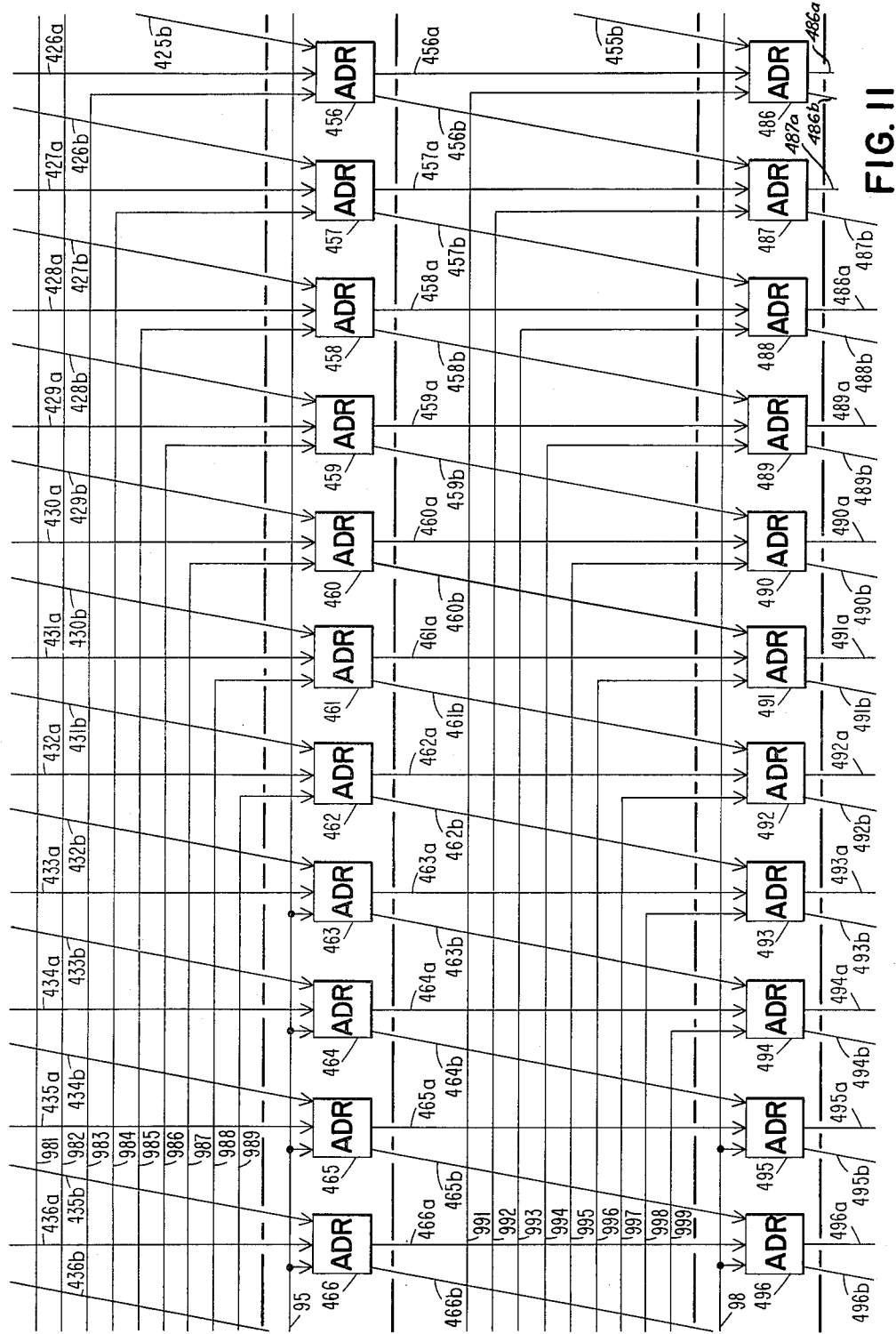
Figure 12:
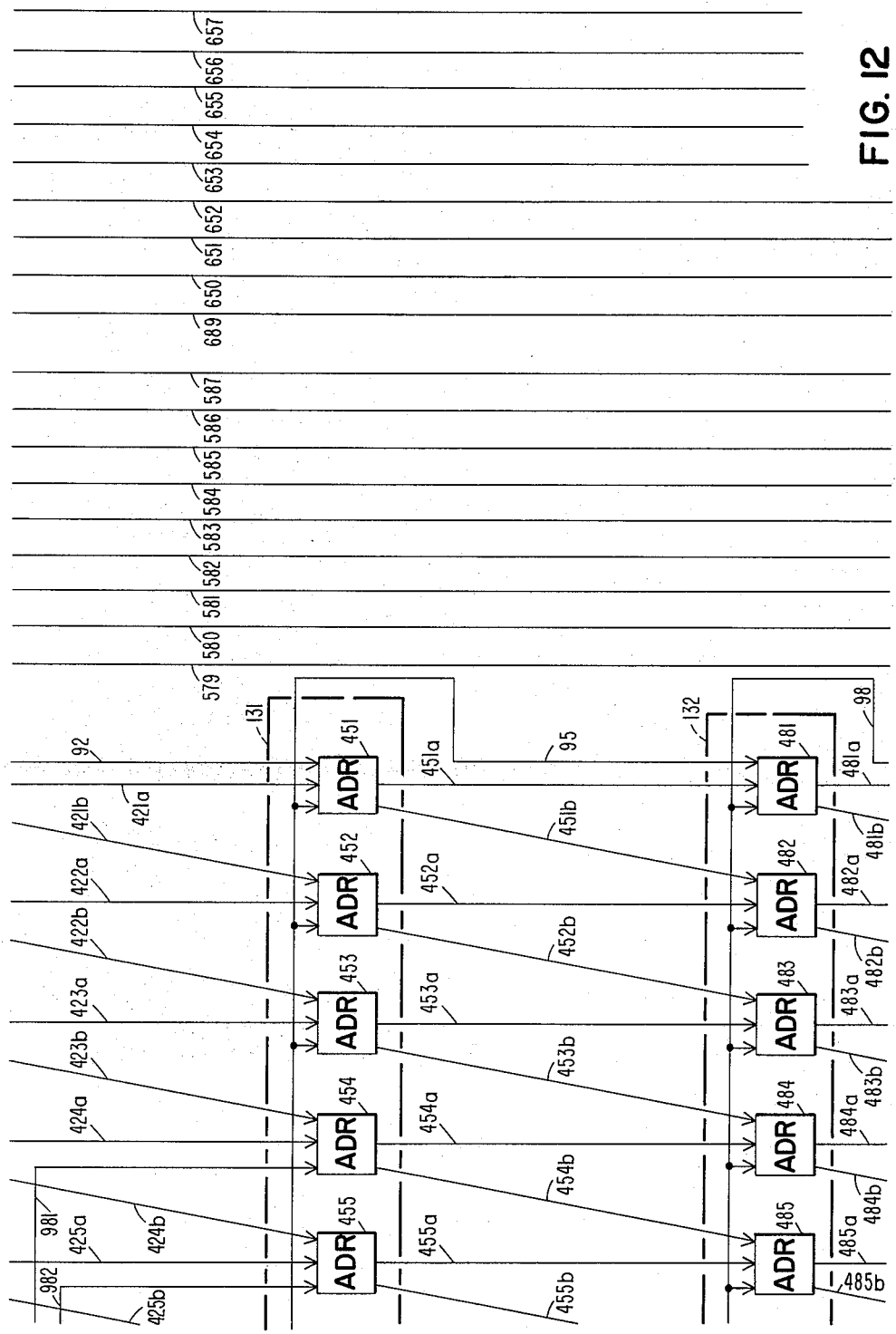

Referring next to FIG. 35, the inputs to the carry save adders 1 through 4 are shown along with an indication as to where the information came from. The column labeled "Group" uses numbers 0 through 4 to designate which one of the respective multiplier multiples decoders 43 through 46 provides the selected multiple. The column entitled "Reference" employs the numbers 1, 3, 5 and 7 to indicate which position or order of the adder stages indicated at the top of FIG. 35 is the lowest order entry position of the selected multiple. The column labeled "Times" has numbers therein which indicate the multiples of the multiplicand which is selected by decoding the multiplier, and the column labeled "From" indicates which group of the multiplier multiples decoder the multiple is taken from. The column labeled "Adder" indicates the carry save adder involved. The column labeled "Input" uses the letters A, B and C to indicate arbitrarily the three sets of input lines to the carry save adders 1 through 4. These inputs are described in more detail at this point. The input $A_1$ for carry save adder 1 for step 2 is representative of signals on the lines 401 through 409 from the sum gates 128 in FIGS. 7 and 8. During step 2 the signals on these lines are always negative, and accordingly binary zeros are inserted into the carry save adder 1. This is true in every case for step 2 because the output signals from the sum segister 110 are all zeros during step 2. The input $A_1$ for the carry save adder 1 in step 3 represents the re-entered portion of the first partial product sum, and such signals appear on the lines 401 through 409 to the carry save adder 1 in FIGS. 6 through 8. The inputs $A_2$, $A_3$ and $A_4$ to respective carry save adders 2, 3 and 4 are the sum output lines of respective carry save adders 1, 2 and 3. For example, the input $A_2$ to the carry save adder 2 in FIGS. 10, 11 and 12 is represented by signals on the sum lines 421a through 437a from the carry save adder 1 in FIGS. 6 through 8. The input $B_1$ to carry save adder 1 for step 2 in FIG. 34 is taken from the lines 281 through 288 in FIGS. 4 and 5, and the signals on these lines represent the complement of one times the multiplicand. The signals on the lines 281 through 288 pass through the OR circuits 142 in FIGS. 4 and 5 and then on respective lines 371 through 379 to the carry save adder 1 in FIGS. 7 and 8. The complement of one times the multiplicand is supplied to the carry save adder 1 in FIGS. 6 through 8 because the lowest order bit of the multiplier is a binary one which makes the line 361 in FIG. 7 positive at the same time the first add cycle line 363 is made positive which occurs during step 2 only; accordingly, the AND circuit 360 provides a positive signal on output line 136 to the AND circuits 301 through 308 which permits entry of the complement of one times the multiplicand to the carry save adder 1. The positive signal on the line 136 is coupled through the OR circuit 410 in FIG. 8 to the first stage adder 421 of the carry save adder 1. This binary one is entered through the OR circuit 410 because the line 401 to this OR circuit has a negative signal during step 2 which represents a binary zero, and the reason for entering the one on the line 136 is to change the one's complement to the two's complement. The input $B_1$ to the carry save adder 1 during step 3 is taken from the carry gates 127 in FIGS. 4 and 5, and these signals pass through the OR circuits 321 through 329 and then along respective lines 371 through 379 to the carry save adder 1. During step 3 and all remaining steps the line 136 to the AND circuits 301 through 308 which constitute the set of gates 126 in FIGS. 4 and 5 is a negative level which prevents the complement of one times the multiplicand from being supplied to the carry save adder 1 in FIGS. 6 through 8. The inputs $B_2$ through $B_4$ to respective carry save adders 2 through 4 are the carry output lines from respective carry save adders 1 through 3. For example, the $B_2$ input to carry save adder 2 is represented by signals on the output lines 421b through 436b from the carry save adder 1 in FIGS. 6 through 8. The symbol $S_1$ in the column labeled "From" signifies sum signals from the carry save adder 1, the subscript always indicating which carry save adder is involved, and the symbol $R_1$ indicates carries from the carry save adder 1, the subscript numeral always indicating the number of the carry save adder involved. The inputs $C_1$ through $C_4$ to respective carry save adders 1 through 4 in FIG. 35 are the multiples from respective multiplicand multiples generators 43 through 46, and these multiplicand multiples generators are designated by group numbers 1 through 4.

FIG. 36 depicts the multiple selected by the multiplier multiples decoders 43 through 46 in FIGS. 6, 10 and 15 which decoders are respectively labeled group 1 through group 4. Note that in step 1 no multiple on any decoder is selected. In step 2 the group 1 decoder selects four times the multiplicand in true form; the group 2 decoder selects two times the multiplicand in true form; the group 3 decoder selects four times the multiplicand in complement form; and the group 4 decoder selects four times the multiplicand in true form. In step 3 the group 1 decoder selects two times the multiplicand in true form; the group 2 decoder selects no multiple; the group 3 decoder selects two times the multiplicand in complement form; and the group 4 decoder selects four times the multiplicand in true form. In steps 4 and 5 no multiples are selected by the decoders of group 1 through group 4 because, as may be observed in FIG. 34, the eight lowest order bits of the multiplier register supplies zeros to the decoders of groups 1 through 4.

It is seen by the representations in FIGS. 34 through 36 how the multiplier and the multiplicand are manipulated to provide a correct final product which is depicted in the multiplier register in step 5 of FIG. 34. This final product is generated in the carry propagate adder 42 in FIG. 9 by adding the values of sum and carry stored in the multiplier register as indicated in step 4 of FIG. 34.

Figure 37:
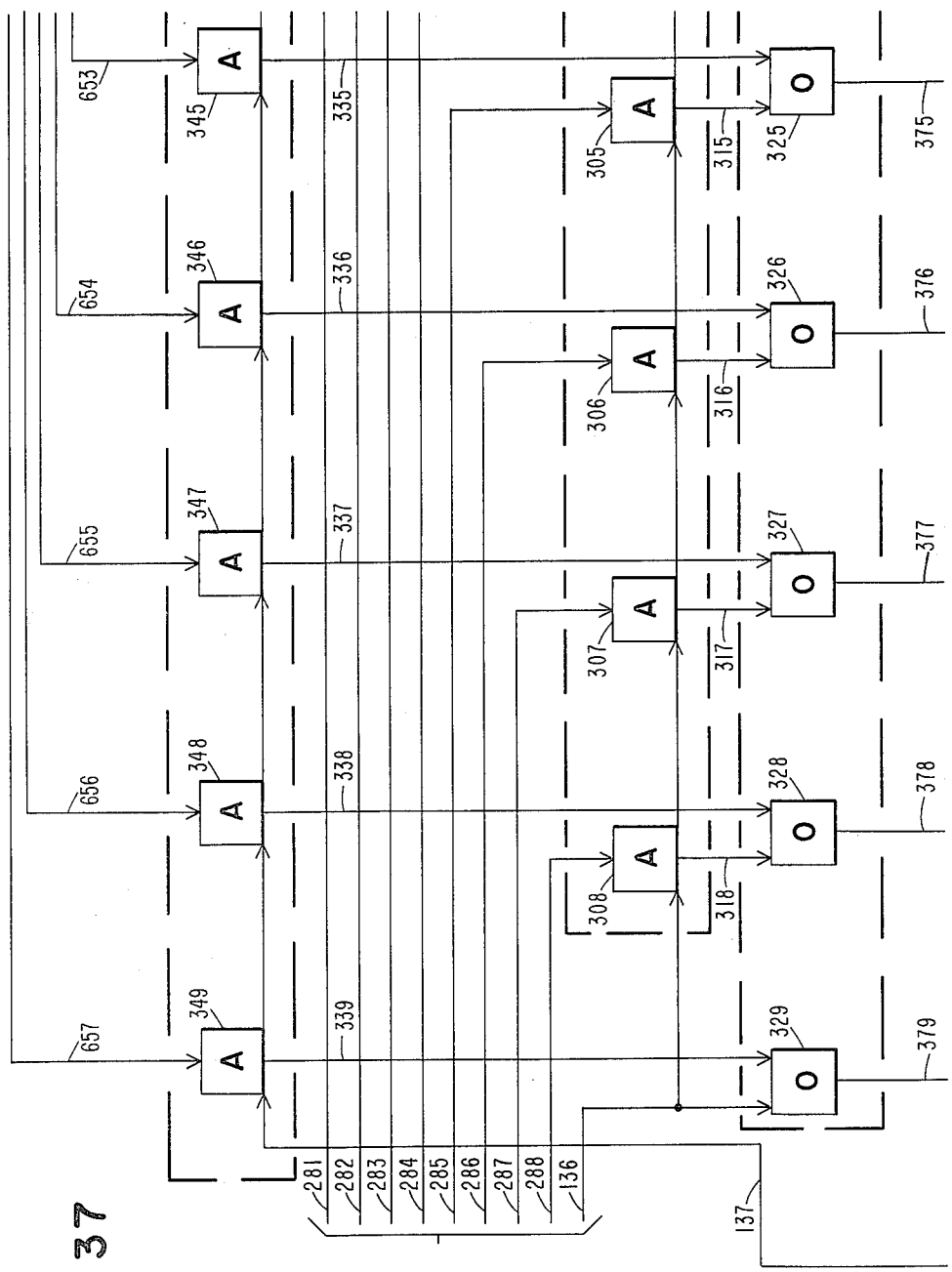
FIGS. 37 through 49 illustrate a modified arrangement of a multiplier according to this invention wherein a simplified carry save adder arrangement is employed.
Figure 38:
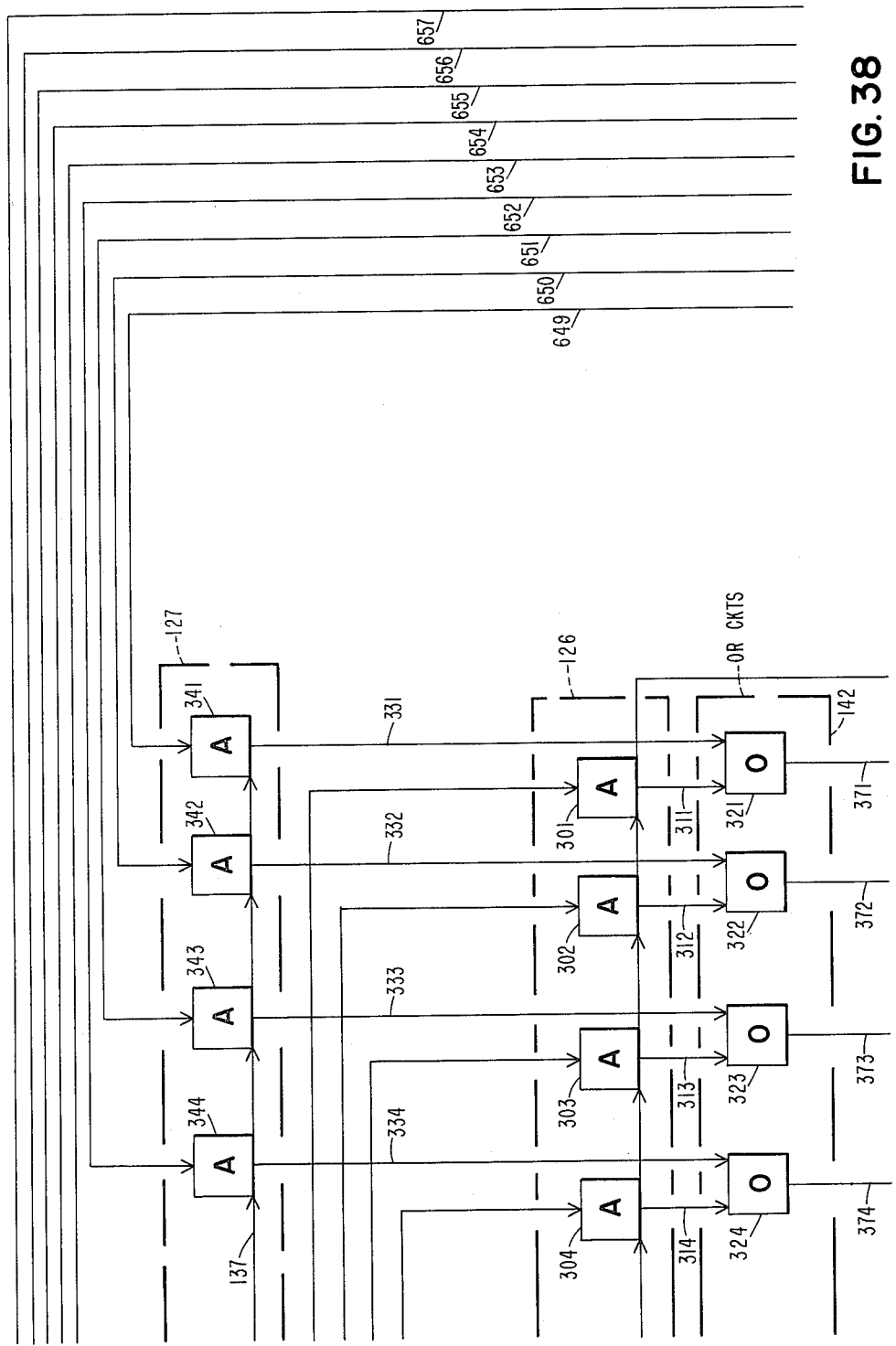
Figure 39:
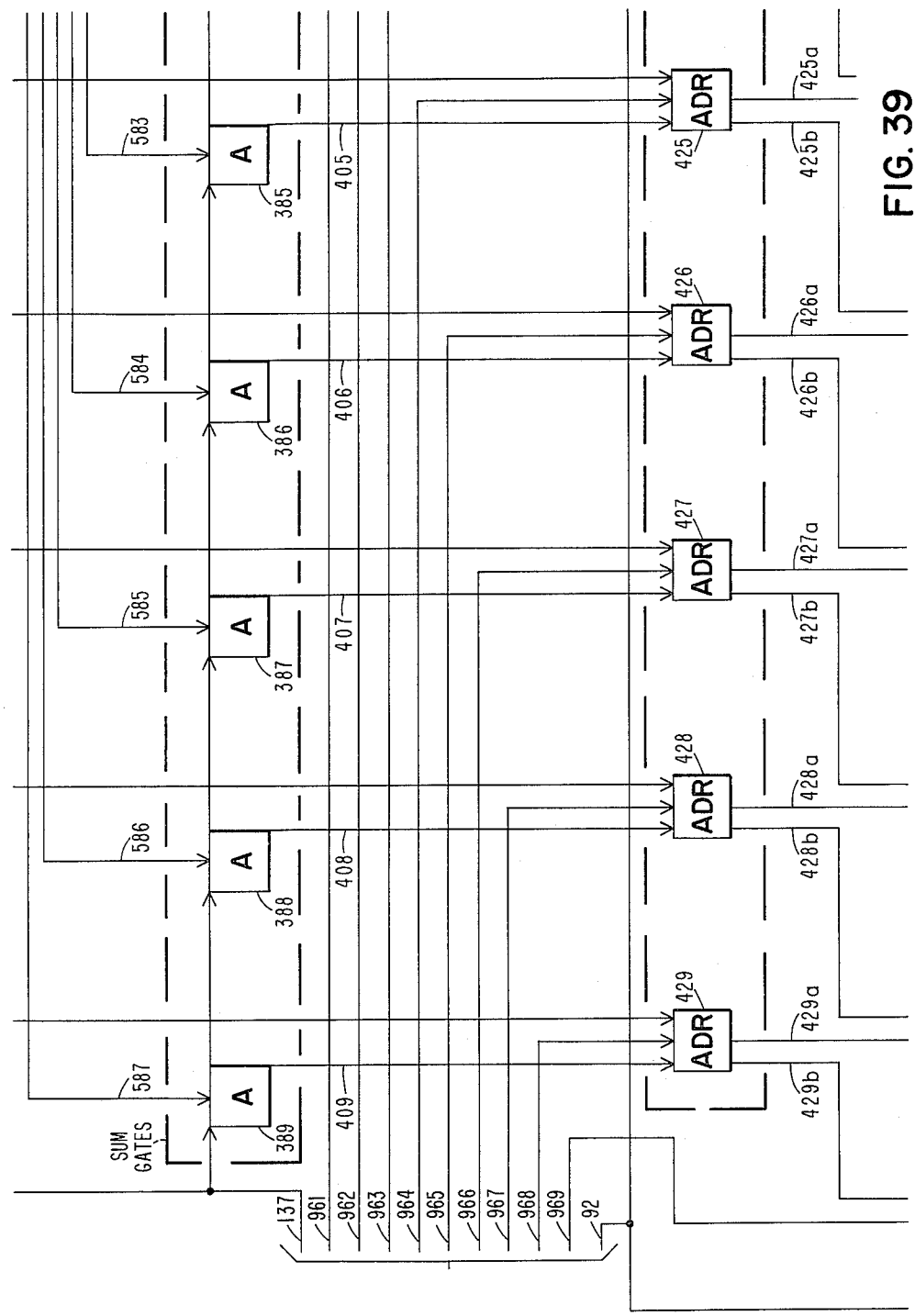
Figure 40:
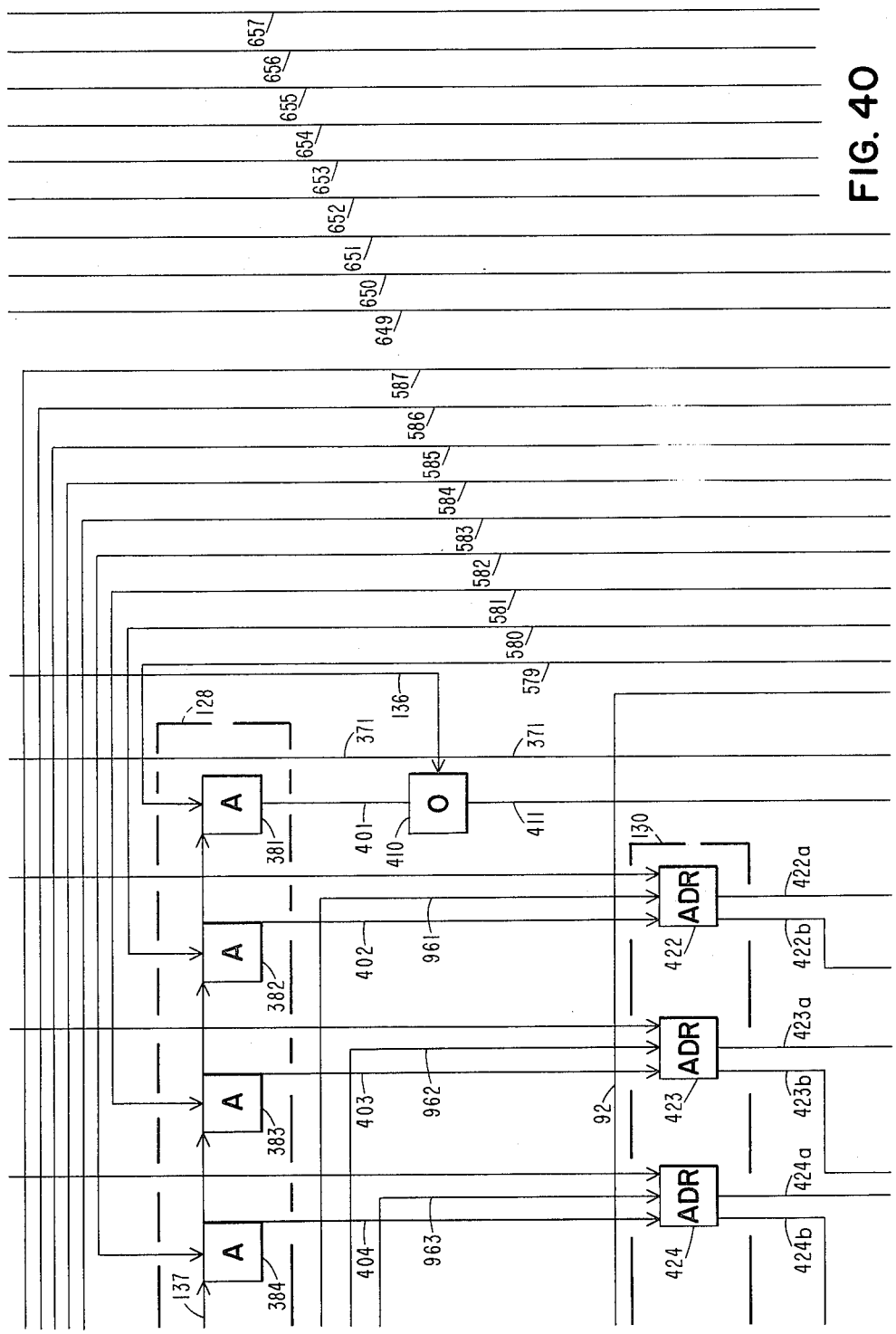
Figure 41:
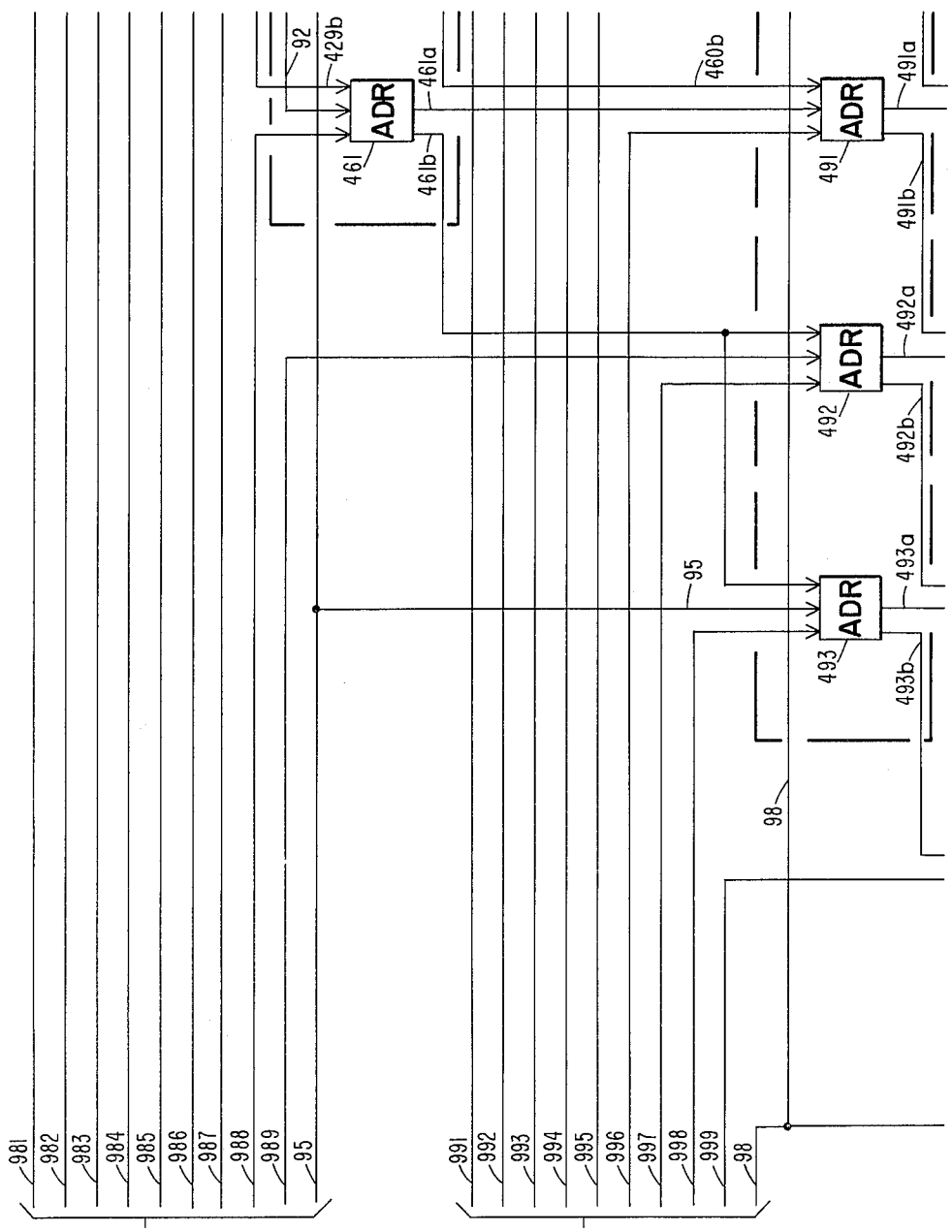
Figure 42:
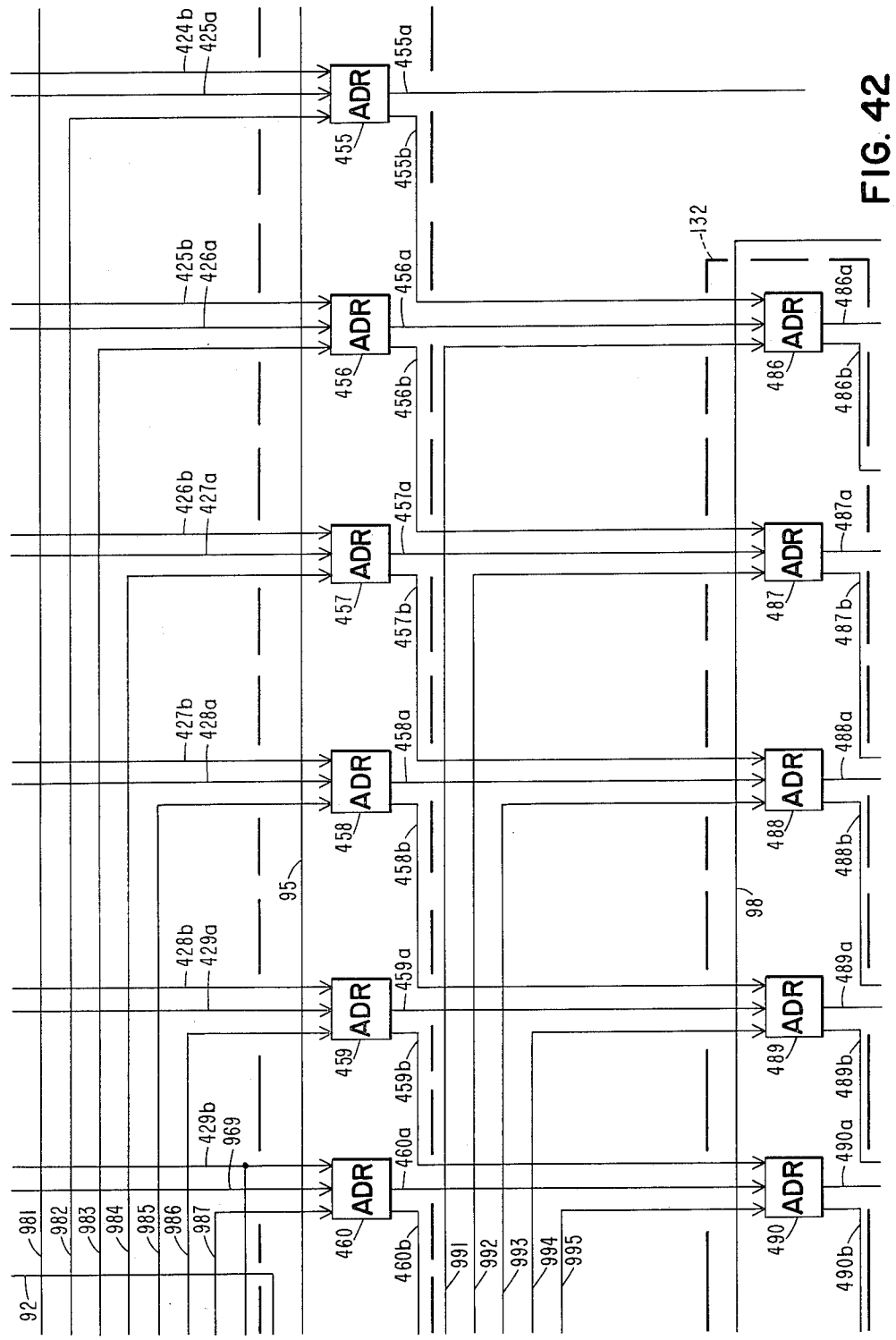
Figure 43:
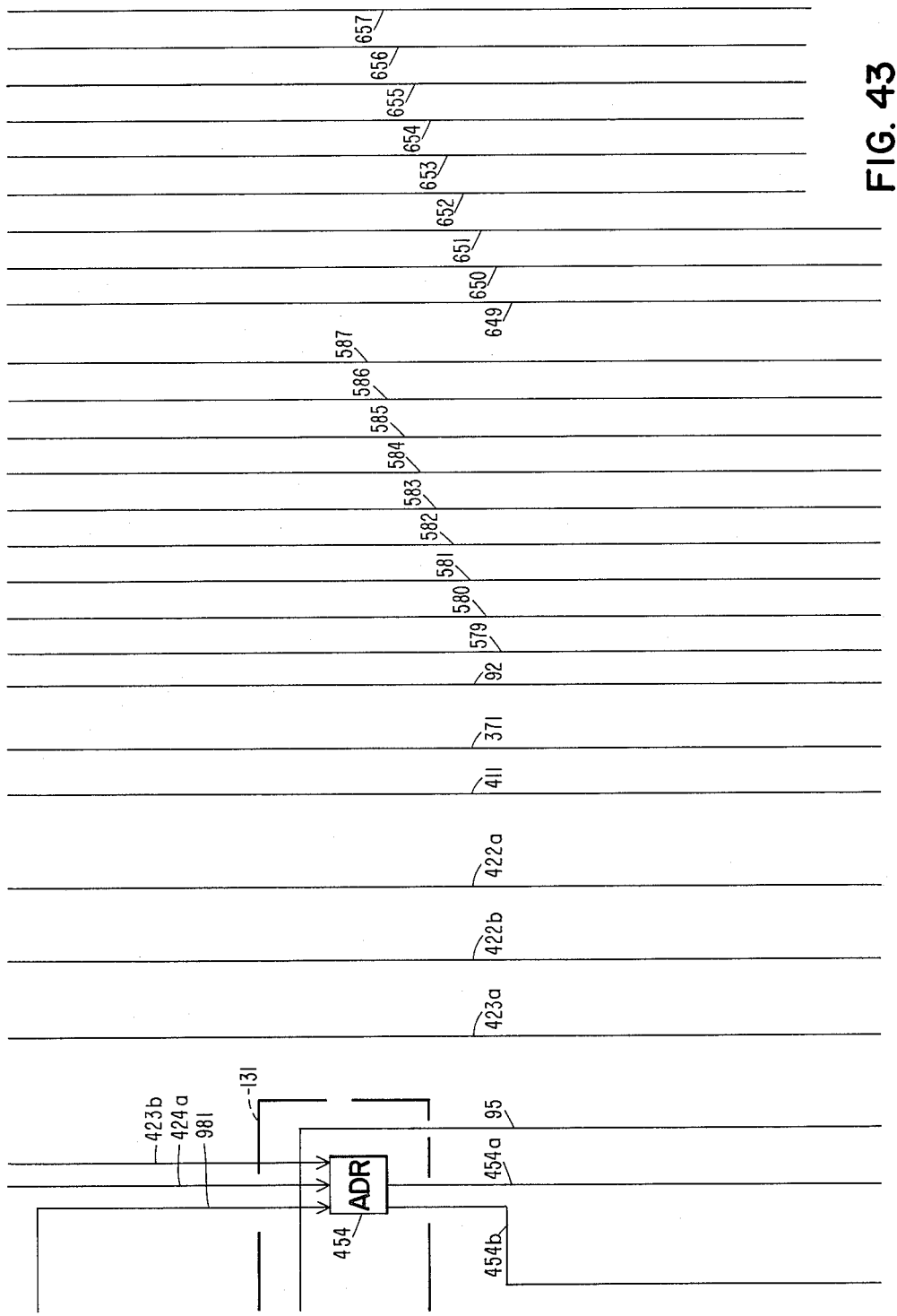
Figure 44:
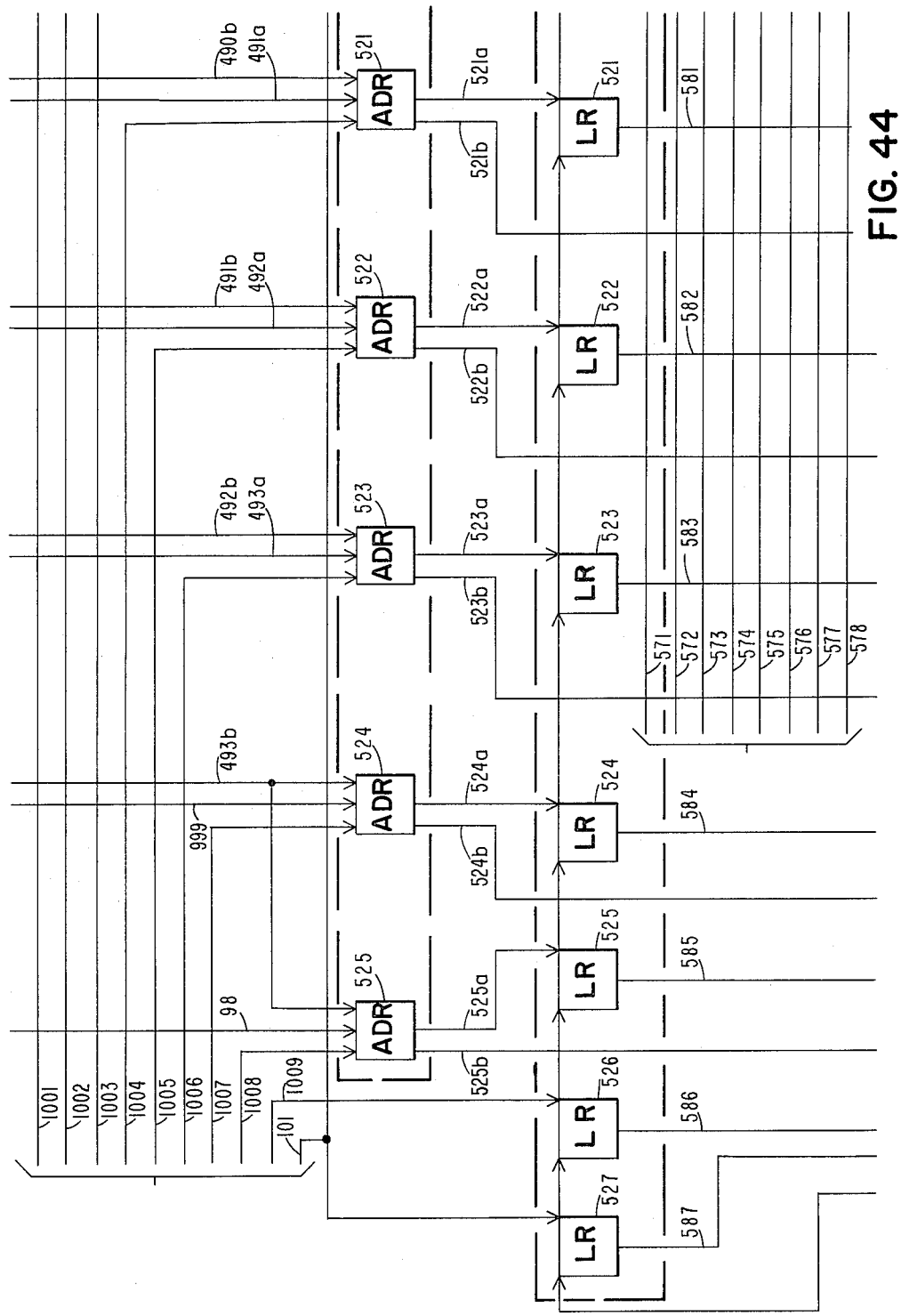
Figure 45:
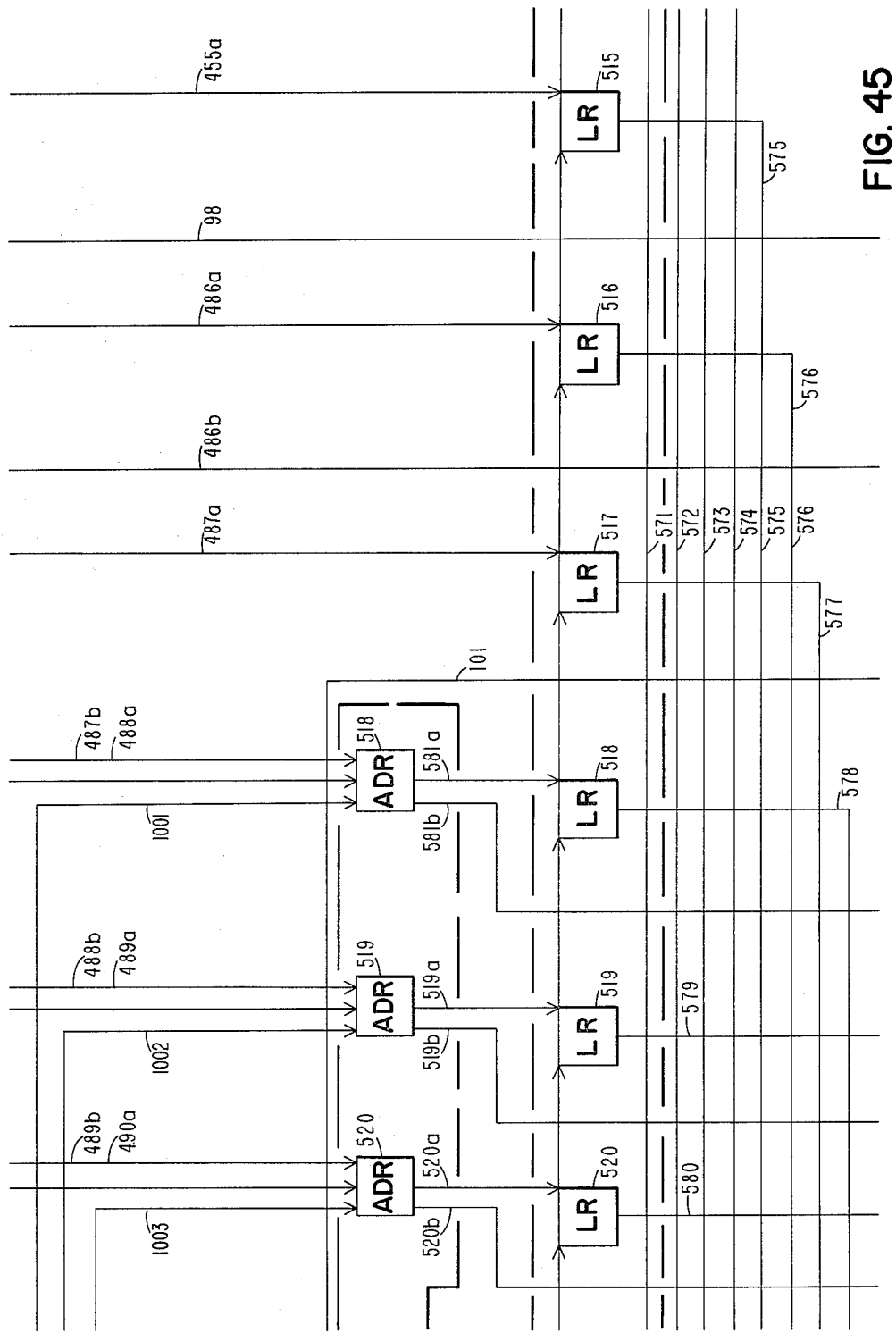
Figure 46:
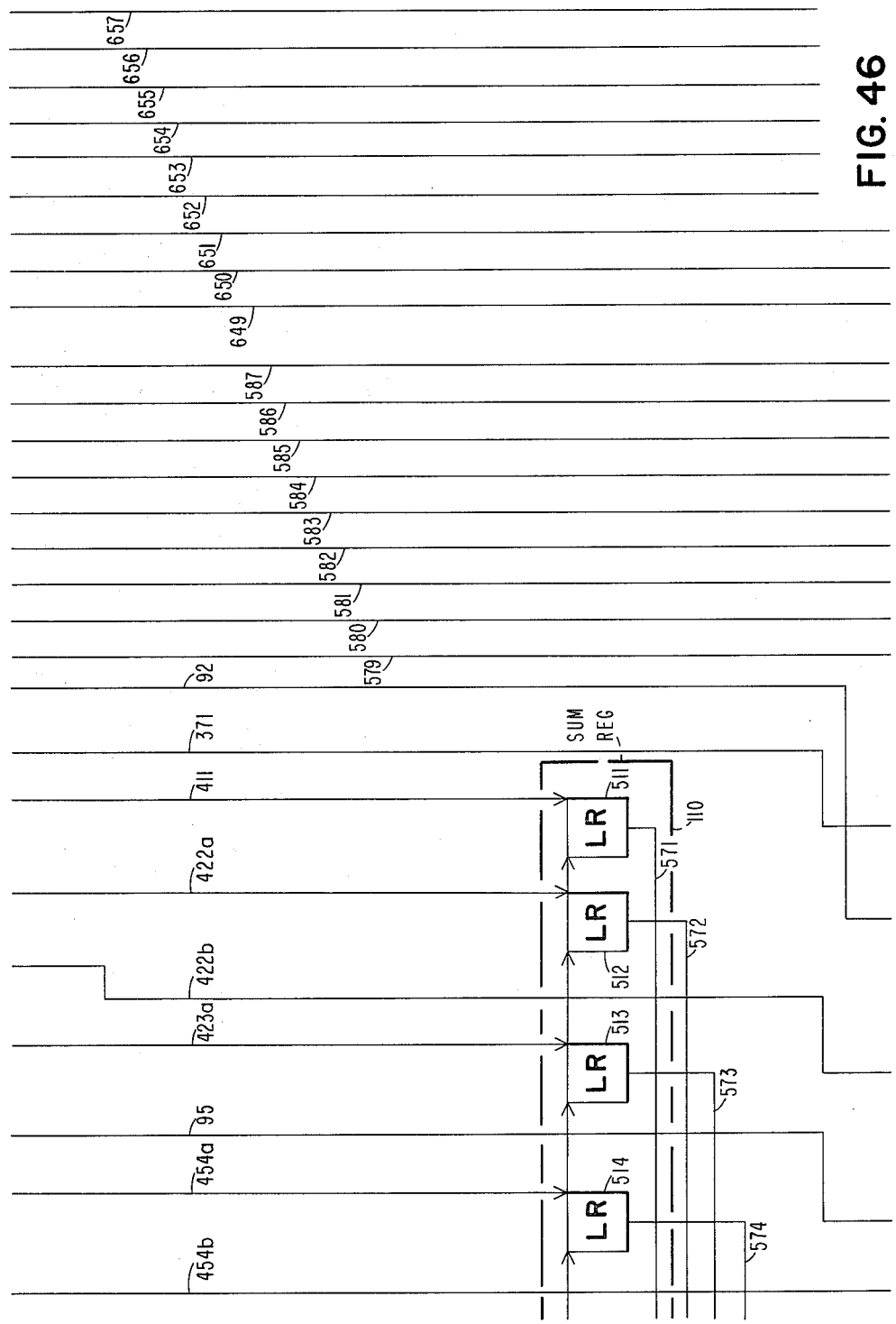
Figure 47:
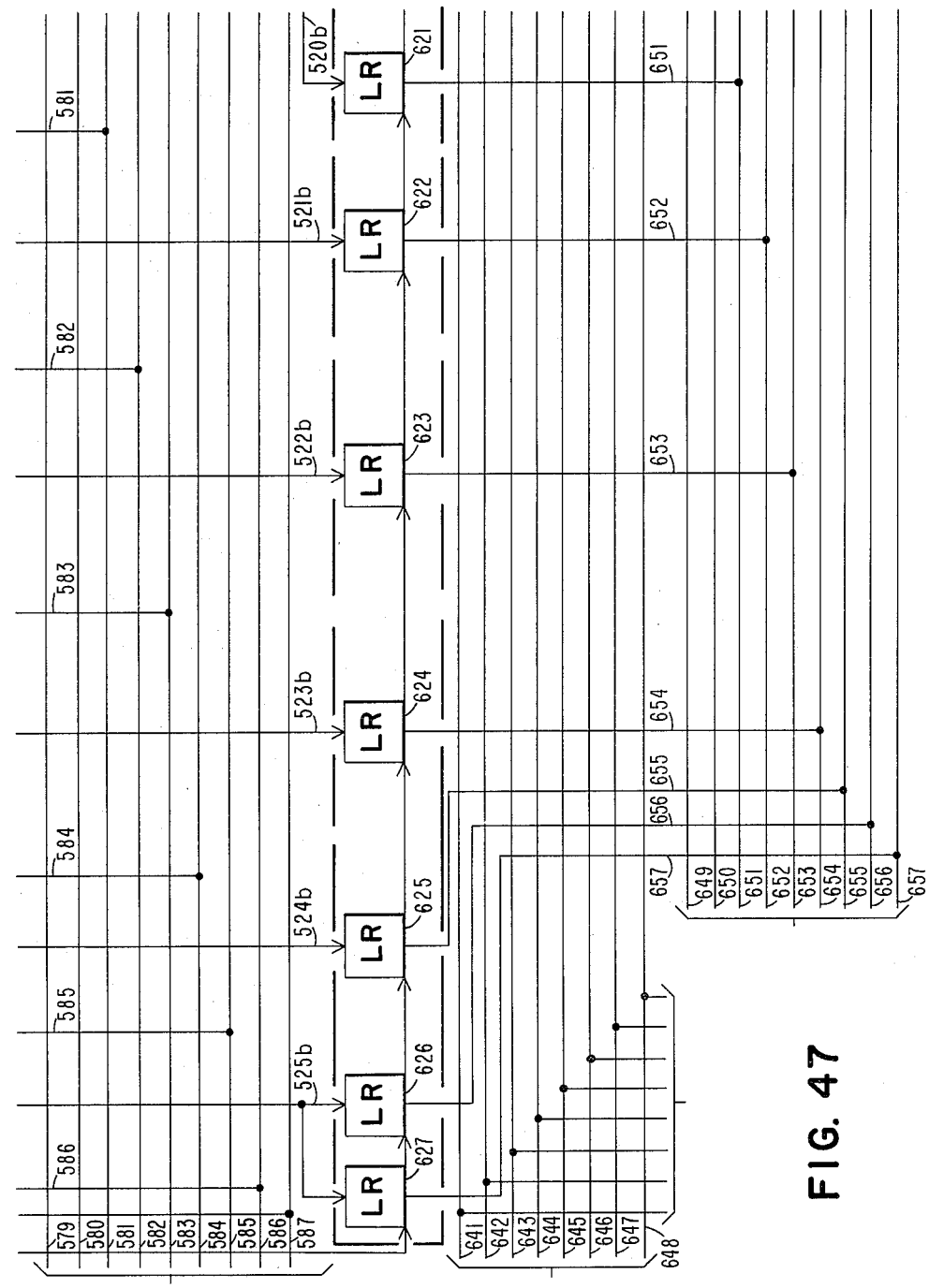
Figure 48:
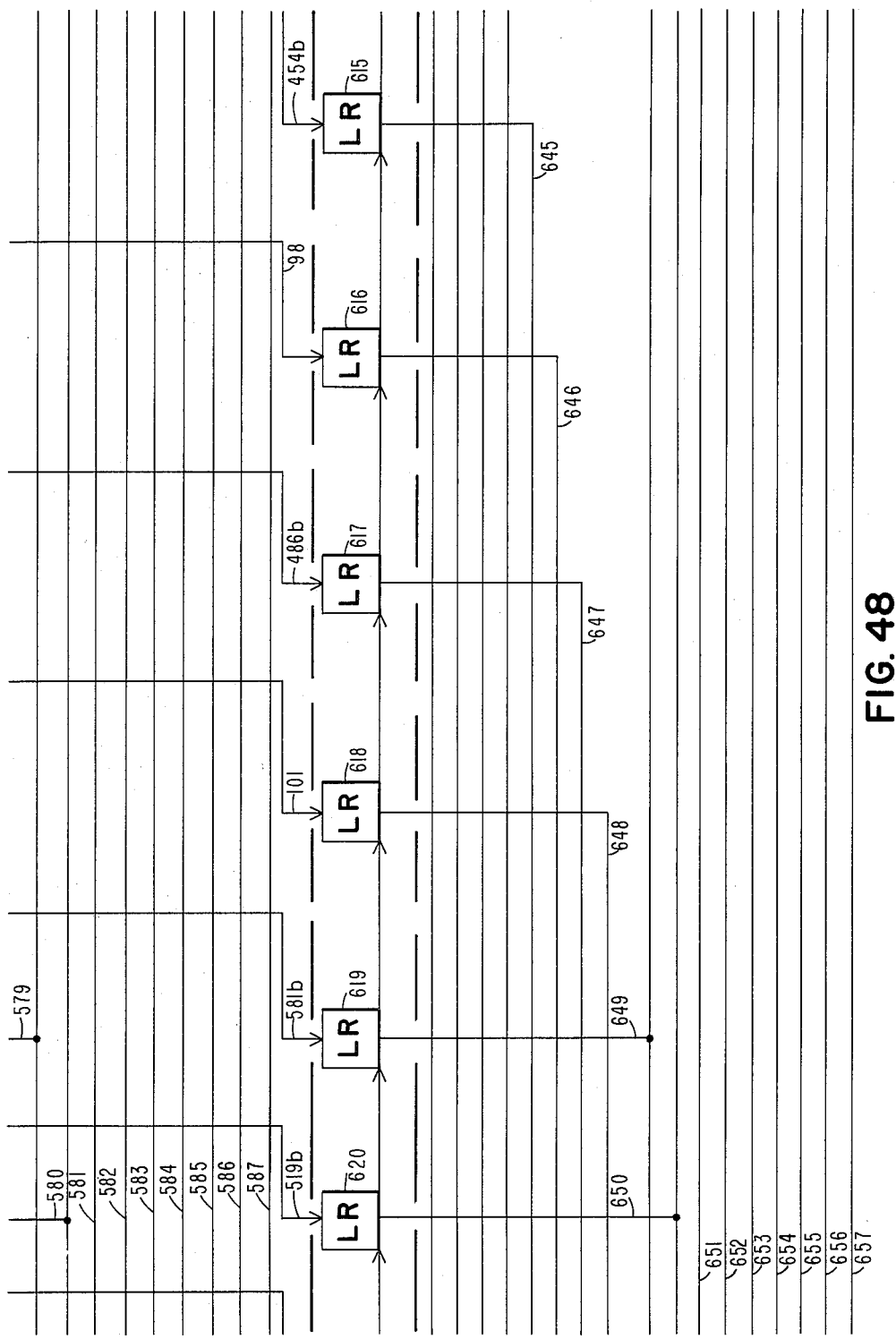
Figure 49:
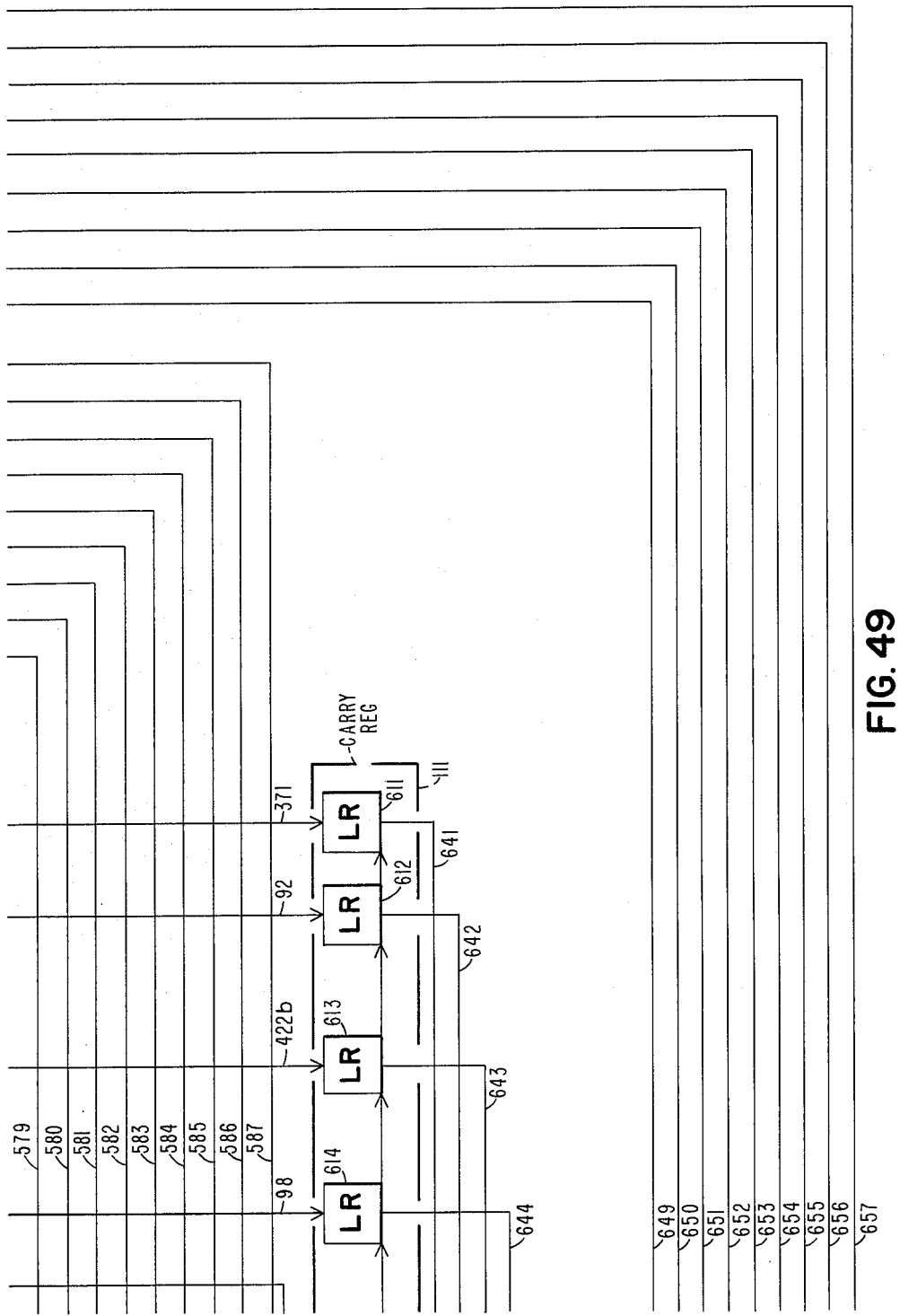

According to a further arrangement of the multiplier according to this invention the number of adders employed in the carry save adders 1 through 4 in FIG. 2 may be reduced from the number illustrated in FIGS. 6 through 8, 10 through 12 and 15 through 17. A simplified arrangement is illustrated in FIGS. 37 through 49. The carry save adders 130 through 133 in FIGS. 6 through 8, 10 through 12 and 15 through 17 are illustrated in the reduced form in FIGS. 39 and 40, FIGS. 41 through 43, and FIGS. 44 through 46. The sum register 110 shown in FIGS. 44 through 46 and the carry register 111 shown in FIGS. 47 through 49 are illustrated for the purpose of showing how various input lines from omitted portions of the carry save adders are associated with the inputs of the sum and carry registers, and the outputs of these registers which are re-entered into the carry save adders through the respective sum gates 128 in FIGS. 39 and 40 and the carry gates 127 in FIGS. 37 and 38 are illustrated for the purpose of showing how these re-entry inputs cooperate with the carry save adder 130 in FIGS. 39 and 40. The same reference numerals are used in the modified arrangement of FIGS. 37 through 49 to designate corresponding parts shown in the arrangement of FIGS. 1 through 22.

An individual adder in the carry-save adders takes three signals in and gives two out. Any one of the three inputs which always has zeros may be omitted. If the number of inputs is reduced to two, the number of outputs still remains at two. An input may be moved from any one place in a chain of adders to any other place as long as it is kept in the same column. After certain inputs are vacated, the number of remaining inputs may be divided by three to ascertain the total number of adders required. Where an adder is eliminated, this vacates two inputs to two positions in adjacent columns farther down the adder chain.

When the two's complement of a binary number is desired, the one's complement is obtained, then a one is added to this in the column of the lowest order bit. The column into which the one is entered may vary from this if the column selected is the same as, or of a lower order than the column containing the lowest order one in the true value of the number and provided further that the zeros to the right of the selected columns are not inverted when forming the one's complement of the number. The application of these principles will permit the elimination of a number of low order positions from the adder shown in FIG. 35. This reduction is illustrated in FIG. 50.

Referring to FIG. 50, the $C_1$ input to the carry-save adder 1 never needs to have anything except zeros in positions 1, 2 and 3, and since nothing needs to be added in these columns in any other adder below the carry-save adder one, there may be eliminated all of the adders in column 1 and all of the adders in columns 2 and 3 below the carry-save adder 1 provided that all of the inputs in column 1 which may be ones and the inputs $A_2$ and $B_2$ of columns 2 and 3 are shifted down directly to the sum and carry registers. In FIG. 50 the terminations for the adders are indicated by the heavy black vertical lines. Positions outside of these terminations are designated by numbers in circles, and the positions to which these inputs are transferred are designated by the same circled number disposed in the sum and carry registers.

The three inputs for carry-save adder 2 are the sum and carry from carry-save adder 1 and the multiple obtained by decoding group 3. The lowest order column required by the latter is four, and the inputs to columns 2 and 3 may be transferred. It should be noted that with the group 2 multiple ending at column 2, the forced carry for this multiple, designated by the circled one, is moved down as an input to position 1 of the sum register. The carry-save adders 3 and 4 may be treated in a similar manner to effect a reduction of adders, and as may be readily seen in FIG. 50 these modifications eliminate fifteen adder positions from the low order end of the carry-save adders.

The modification of the high order end of the adders is possible because the adders will have a number of high order positions containing either a string of ones or a string of zeros. It is readily observed from FIG. 50 that the string of ones or zeros to the left of position 9 of the carry-save adder 1 is eight, and it is six for carry-save adder 2, four for carry-save adder 3 and two for carry-save adder 4. When two of the three inputs to a group of adders in a column have ones or zeros in a string, these two inputs may always be replaced by a single input which in turn reduces the total number of required inputs to two. As has already been shown, when this condition exists, these stages of the adder may be eliminated and the pair of inputs moved down to the next adder in the chain. The operation of this principle is illustrated below in Table 4 for the various combinations that may occur.

TABLE 4

| | | | | | | | | | | | |
|---|---|---|---|---|---|---|---|---|---|---|---|
| 1 | 1 | 1 | 1 | ' | 1 | * | X | X | X | X | $A_1$ |
| 1 | 1 | 1 | 1 | ' | 1 | * | X | X | X | X | $B_1$ |
| D | E | F | G | | H | | X | X | X | X | $C_1$ |
| 1 | 1 | 1 | 1 | ' | 1 | | S | S | S | S | $A_2$ |
| D | E | F | G | ' | R | | R | R | R | R | $B_2$ |

TWO COMPLEMENT INPUTS

| | | | | | | | | | | | |
|---|---|---|---|---|---|---|---|---|---|---|---|
| 1 | 1 | 1 | 1 | ' | 1 | * | X | X | X | X | $A_1$ |
| 0 | 0 | 0 | 0 | ' | 0 | * | X | X | X | X | $B_1$ |
| D | E | F | G | ' | H | | X | X | X | X | $C_1$ |
| $\bar{H}$ | $\bar{H}$ | $\bar{H}$ | $\bar{H}$ | ' | S | | S | S | S | S | $A_2$ |
| D | E | F | G | ' | R | | R | R | R | R | $B_2$ |

ONE COMPLEMENT INPUT

| | | | | | | | | | | | |
|---|---|---|---|---|---|---|---|---|---|---|---|
| 0 | 0 | 0 | 0 | ' | 0 | * | X | X | X | X | $A_1$ |
| 0 | 0 | 0 | 0 | ' | 0 | * | X | X | X | X | $B_1$ |
| D | E | F | G | ' | H | | X | X | X | X | $C_1$ |
| 0 | 0 | 0 | 0 | ' | S | | S | S | S | S | $A_2$ |
| D | E | F | G | ' | R | | R | R | R | R | $B_2$ |

NO COMPLEMENT INPUTS

The three inputs shown together represent the inputs as they would be if the complete adder were used. The asterisks in two of the inputs indicate that there are never any high order true bits to the left of this point for these two inputs. The apostrophes indicate the point at which it is desired to terminate the adder shown with three inputs. The two inputs below are two of the three inputs of the next following adder. For columns to the right of the termination point of the first adder, the inputs to the following adder are the sum (S) and carry (R) outputs of the adder above. To the left of the termination of adder 1, the $B_2$ input of adder 2 becomes what would have been the $C_1$ input of adder 1 for the same columns. Note that the carry output of the highest order column of adder 1 after it is terminated does not go to the next higher order of column $B_2$ since this position is occupied by G from $C_1$. The corresponding $A_2$ inputs to the adder 2 are the same for all bit positions to the left of the termination point of adder 1, and they are determined from three inputs to the highest order column of the terminated adder 1.

The lower position of FIG. 50 illustrates the effect of applying this principle of adder reduction. The eliminated adder sections are illustrated in dotted line form. The numbers disposed within hexagons indicate that adders of the type illustrated in FIG. 33 should be employed. In carry-save adder 1 the input $A_1$ is determined by its true or complement condition starting with column 9, $B_1$ with column 10 and $C_1$ with column 11. It is therefore possible to terminate the carry-save adder 1 with position 9 by moving the normal $C_1$ inputs for columns 10 and 11 to the corresponding columns of $C_2$. The normal full adder used for each position of the carry-save adder contains the following logic:

(1) $\quad S = (A \veebar B) \veebar C$
(2) $\quad R = (A \veebar B) C \vee AB$

For the high order column of the terminated adder, in this case column 9, this is modified to the following:

(3) $\quad S = (A \veebar B) \veebar C$
(4) $\quad D = (A \veebar B) \overline{C} \vee AB$ In Equations 1, 2, and 3 the terms A, B and C may be applied to any of the three inputs to the adder. This is not true in Equation 4 where the terms A and B refer to the two inputs determined by the fact that they are in true or complement form, while C refers to the data input. D describes the input that goes to all high order positions of the next adder, and for that adder it may be treated as are those positions whose input is determined by knowledge of whether the input is true or complement.

By continuing this procedure the carry-save adder 2 may be terminated at position 11, the adder for position 11 being modified as described above; the carry-save adder 3 may be terminated with column 13, the adder for column 13 being modified as described; and carry-save adder 4 may be terminated with column 15, the adder for this column being modified as described above. The four carry-save adders as described in FIGS. 6 through 8, 10 through 12 and 15 through 17 required a total of sixty-eight full adders. The same carry-save adders with the modifications described above require only thirty-two adders four of which are modified as indicated in equations 3 and 4 above. There is a saving of thirty-six full adders. These thirty-six adders and the manner in which the inputs and outputs are changed are illustrated in FIGS. 39 through 46. For the modified arrangement illustrated in FIGS. 39 through 46 the length of the carry propagate adder 42 in FIGS. 1 and 9 should exceed the length of the numbers supplied thereto by two stages. One of the stages serves as a carry overflow position and the other stage is employed to indicate whether the product is in true or complement form. The modifications required to permit the use of three-bit multiplier groups instead of two-bit groups are readily apparent. The question of how many adders to connect in series is a matter of economy to be decided for a particular arrangement. The example given is intended merely to help describe the general technique, and many modifications of it to suit special conditions should be readily apparent.

Reference is made to FIG. 51 which shows how the modified adder arrangement of FIGS. 39 through 46 performs the same multiply problem illustrated in FIG. 35. The symbols employed in FIG. 51 have the same meaning as those used in FIG. 35. In view of the previous explanation of how the multiply problem in FIG. 35 is performed in five steps, it should be readily seen from FIG. 51 how the multiplier arrangement in FIGS. 1 through 22 performs the multiply operation illustrated in FIG. 51 if the carry save adders in FIGS. 39 through 46 are substituted for the carry save adders of FIGS. 6 through 8, 10 through 12 and 15 through 17. It is seen from FIG. 51 that the same final product is generated as was generated in FIG. 35 and a reduction of thirty-six full adders is accomplished.

The foregoing arrangements for performing multiply operations has been considered in terms of decoding two bits of the multiplier in a given decoder and using as many such decoders, for example four are illustrated, as required in order to reduce the time of multiplication to a given length of time. The multiplier may be decoded alternatively in terms of three bits for each decoder, and as many such decoders may be employed as are necessary to perform multiplication in a given length of time. The time required to perform a given multiply operation may be decreased by using decoders when decode three bits of the multiplier at a given time. The technique of handling three bits of the multiplier at a time requires being able to obtain two, four, six or eight times the multiplicand. One times may also be required to handle the condition of a one in the low order bit position of the multiplier. One, two, four and eight times can all be obtained by proper positioning of the multiplicand, but the six times must be generated in some manner. This can be done by adding one times the multiplicand to two times the multiplicand, shifting the result one position and storing it in a register. The development of the decoding rules for this method follows the same basic requirements already described for handling two bit groups. The decoding for three bit groups is indicated in Table 2 above.

There are some general statements that apply to both the two bit decoder and the three bit decode approaches of multiplication, and they are stated as follows:

(1) The choice of true or complement entry of the multiplicand into the adder is dependent only on the condition of the low-order bit of the next higher order group of the multiplier.

(2) Special provision must be made for the presence of a one in the low-order bit position of the multiplier. The procedure is the same for both methods.

(3) Whenever complement inputs are used for multiplicand multiples, there must also be provision for entering a low order one into the adder to change the one's complement to a two's complement. This includes the complement of one times the multiplicand used because of a low order multiplier one. This can result in a problem since odd numbers in the two low order groups of the multiplier may call for the entry of two additional ones into the low order position of the adder, making a total of four entries where only three are possible. A solution to this is to decode the low-order group of the multiplier to call for the desired multiple or one less instead of one more. Then the true value of one times the multiplicand can be used in the partial product position on the first add cycle when the multiplier has a low order one because the partial product position always has zeros on the first add cycle. This may be done very easily on the first add cycle by forcing the low-order bit of the group to enter the decoder as a zero, but using its actual value to determine whether or not to add one times the multiplicand. The justification for this may be seen from either Table 1 or Table 2. This modification of the decoding will not work for any add cycle except the first, and only when operating from the low order end of the multiplier.

FIG. 52 shows in chart form the decoding for handling three bits of the multiplier at a time. The letters A, B and C are used to designate the three bits of the multiplier being decoder with bit A being the lowest order bit and bit C the highest order bit. The bit D is the lowest order bit of the next highest order group, and this bit is the bit $A_2$ for the next highest order decoder. The various multiples of the multiplicand are indicated under the column labeled "multiple." The Boolean algebra indicates what decoding is required.

Referring next to FIG. 53, the logic required for decoding three bits of a multiplier is illustrated. The decoder includes latch registers 1250 through 1253 with associated inverters 1260 through 1263 which are connected as shown to exclusive OR circuits 1270 and 1271 and AND circuits 1272 through 1275. The output of the exclusive OR circuit 1271 is supplied through an inverter 1276 to an AND circuit 1280. The exclusive OR circuits 1270 and 1271 and the AND circuits 1272 through 1276 are connected as shown to the circuits 1280 through 1283. The AND circuits 1280 and 1282 select respective multiples of two and six times the multiplicand, and the OR circuits 1281 and 1283 select the respective multiples of four and eight times the multiplicand. The output lines 1284 from the latch register 1253 indicates the true or complement condition of the selected multiple. The output of only one of the circuits 1280 through 1283 is rendered positive at any one time, and a positive output is effective to select the indicated multiple. When the line 1284 is positive, it selects the complement of the indicated multiple and when this lines is negative, it selects the true value of the indicated multiple.

While the invention has been particularly shown and described with reference to preferred embodiments thereof, it will be understood by those skilled in the art that various changes in form and details may be made therein without departing from the spirit and scope of the invention.

What is claimed is:

1. An adder device including two or more carry-save adders wherein each carry-save adder has two or more positions with each position including an adder having three inputs A, B and C and a sum output and a carry output where all high order A inputs starting with $A_n$ are identical and all high order B inputs starting with $B_n$ are also identical although the A and the B inputs are not necessarily the same value, means interconnecting the carry-save adders whereby the sum outputs of the first carry-save adder are coupled to corresponding positions as inputs to the second carry-save adder and the carry outputs of the first carry-save adder are coupled as inputs to the second carry-save adder shifted one position, the second carry-save adder having its outputs connected in like fashion to the third carry-save adder and each succeeding carry-save adder being connected in like fashion to the adjacent succeeding carry-save adder, and means coupled to each carry-save adder which gives all of the highest order B bits the value $D=(A_n \underline{\vee} B_n)\overline{C}_n \vee AB$ with the carry output of the adder in position $n$ not being used and all high order A bits starting with $A_n+1$ are made equal to zero.

2. The apparatus of claim 1 wherein two or more carry-save adders are connected in series and in which the final sum and carry combination is added in a carry propagate adder, any positions in the first carry-save adder which always have one of its three inputs are equal to zero is eliminated and its other two inputs entered into the corresponding inputs of the next carry-save adder, the process of adder elimination being continued in the next and subsequent carry-save adders.

3. A device for adding a plurality of numbers including a plurality of carry-save adders wherein each carry-save adder has a plurality of positions with each position including a full adder having three inputs A, B and C, a sum output and a carry output, means interconnecting the carry-save adders whereby the sum outputs of the first carry-save adder are coupled to corresponding positions as inputs to the second carry-save adder and the carry outputs of the first carry-save adder are coupled as inputs to the second carry-save adder shifted one position, the second carry-save adder having its outputs connected in like fashion to the third carry-save adder and each succeeding carry-save adder being connected in like fashion to the adjacent succeeding carry-save adder.

4. A device for adding a plurality of numbers including N carry-save adders wherein each carry-save adder has a plurality of positions with each position including a full adder having three inputs A, B and C, a sum output and a carry output, means interconnecting the carry-save adders whereby the sum outputs of the first carry-save adder are coupled to corresponding positions as inputs to the second carry-save adder and the carry outputs of the first carry-save adder are coupled as inputs to the second carry-save adder shifted one position, the second carry-save adder having its outputs connected in like fashion to the third carry-save adder and each succeeding carry-save adder being connected in like fashion to the adjacent succeeding carry-save adder, a sum register and a carry register, and means connecting the sum outputs of the Nth carry-save adder to said sum register and means connecting the carry outputs of the Nth carry-save adder to said carry register.

5. A device for adding a plurality of numbers including N carry-save adders wherein each carry-save adder has a plurality of positions with each position including a full adder having three inputs A, B and C, a sum output and a carry output, means interconnecting the carry-save adders whereby the sum outputs of the first carry-save adder are coupled to corresponding positions as inputs to the second carry-save adder and the carry outputs of the first carry-save adder are coupled as inputs to the second carry-save adder shifted one position, the second carry-save adder having its outputs connected in like fashion to the third carry-save adder and each succeeding carry-save adder being connected in like fashion to the adjacent succeeding carry-save adder, a sum register and a carry register, means connecting the sum outputs of the Nth carry-save adder to said sum register and means connecting the carry outputs of the Nth carry-save adder to said carry register, and means connecting the outputs of the sum and carry registers as inputs to the first carry-save adders along with additional sets of A and B values to each carry-save adder whereby further values of A and B may be accumulated with the numbers held in said sum and carry registers.

6. A device for adding a plurality of numbers including N carry-save adders wherein each carry-save adder has a plurality of positions with each position including a full adder having three inputs A, B and C, and a sum output and a carry output, means interconnecting the carry-save adders whereby the sum outputs of the first carry-save adder are coupled to corresponding positions as inputs to the second carry-save adder shifted one position, the second carry-save adder having its outputs connected in like fashion to the third carry-save adder and each succeeding carry-save adder being connected in like fashion to the adjacent succeeding carry-save adder, a sum register and a carry register, means connecting the sum outputs of the Nth carry-save adder to said sum register and means connecting the carry outputs of the Nth carry-save adder to said carry register, means connecting the outputs of the sum and carry registers as inputs to the first carry-save adders along with additional sets of A and B values to each carry-save adder whereby further values of A and B may be accumulated with the numbers held in said sum and carry registers, a carry propagate adder, and means connecting the outputs of the sum and carry registers to said carry propagate adder whereby a final sum is produced from the sum and carry signals stored in the sum and carry registers.

7. A device for adding a plurality of numbers including N carry-save adders wherein each carry-save adder has a plurality of positions with each position including a full adder having three inputs A, B and C and a sum output and a carry output, means interconnecting the carry-save adders whereby the sum outputs of the first carry-save adder are coupled to corresponding positions as inputs to the second carry-save adder and the carry outputs of the first carry-save adder are coupled as inputs to the second carry-save adder shifted one position, the second carry-save adder having its outputs connected in like fashion to the third carry-save adder and each succeeding carry-save adder being connected in like fashion to the adjacent succeeding carry-save adder, each carry-save adder including a like number of positions, and each carry-save adder being shifted at least one position with respect to the preceding carry-save adder.

8. A device for adding a plurality of numbers including N carry-save adders wherein each carry-save adder has a plurality of positions with each position including a full adder having three inputs A, B and C and a sum output and a carry output, means interconnecting the carry-save adders whereby the sum outputs of the first carry-save adder are coupled to corresponding positions as inputs to the second carry-save adder and the carry outputs of the first carry-save adder are coupled as inputs to the second carry-save adder shifted one position, the second carry-save adder having its outputs connected in like fashion to the third carry-save adder and each succeeding carry-save adder being connected in like fashion to the adjacent succeeding carry-save adder, each carry-save adder including a like number of positions, and each carry-save adder being shifted at least one position with respect to the preceding carry-save adder, a sum register and a carry register, means connecting the sum outputs of the Nth carry-save adder to said sum register, and means connecting the carry outputs of the Nth carry-save adder to said carry register.

9. A device for adding a plurality of numbers including N carry-save adders wherein each carry-save adder has a plurality of positions with each position including a full adder having three inputs A, B and C and a sum output and a carry output, means interconnecting the carry-save adders whereby the sum outputs of the first carry-save adder are coupled to corresponding positions as inputs to the second carry-save adder and the carry outputs of the first carry-save adder are coupled as inputs to the second carry-save adder shifted one position, the second carry-save adder having its outputs connected in like fashion to the third carry-save adder and each succeeding carry-save adder being connected in like fashion to the adjacent succeeding carry-save adder, each carry-save adder including a like number of positions, and each carry-save adder being shifted at least one position with respect to the preceding carry-save adder, a sum register and a carry register, means connecting the sum outputs of the Nth carry-save adder to said sum register, means connecting the carry outputs of the Nth carry-save adder to said carry register, and means for connecting outputs of the sum and carry register as inputs to the first carry-save adder along with additional sets of A and B values to each carry-save adder whereby further values of A and B may be accumulated with the number disposed in the sum and carry registers.

10. A device for adding a plurality of numbers including N carry-save adders wherein each carry-save adder has a plurality of positions with each position including a full adder having three inputs A, B and C and a sum output and a carry output where all high order A inputs starting with $A_n$ are identical and all high order B inputs starting with $B_n$ are also identical although the A and B inputs are not necessarily the same value, means interconnecting the carry-save adders whereby the sum outputs of the first carry-save adder are coupled to corresponding positions as inputs to the second carry-save adder and the carry outputs of the first carry-save adder are coupled as inputs to the second carry-save adder shifted one position, the second carry-save adder having its outputs connected in like fashion to the third carry-save adder and each succeeding carry-save adder being connected in like fashion to the adjacent succeeding carry-save adder and any position in each carry-save adder which always has one of its three inputs equal to zero is omitted and its other two inputs are entered into the corresponding position of another carry-save adder.

11. A device for adding a plurality of numbers including N carry-save adders wherein each carry-save adder has a plurality of positions with each position including a full adder having three inputs A, B and C and a sum output and a carry output, means interconnecting the carry-save adders whereby the sum outputs of the first carry-save adder are coupled to corresponding positions as inputs to the second carry-save adder and the carry outputs of the first carry-save adder are coupled as inputs to the second carry-save adder shifted one position, the second carry-save adder having its outputs connected in like fashion to the third carry-save adder and each succeeding carry-save adder being connected in like fashion to the adjacent succeeding carry-save adder, each carry-save adder including a like number of positions, and each carry-save adder being shifted at least one position with respect to the preceding carry-save adder, a sum register and a carry register, means connecting the sum outputs of the Nth carry-save adder to said sum register, means connecting the carry outputs of the Nth carry-save adder to said carry register, means for connecting the outputs of the sum and carry register as inputs to the first carry-save adder along with additional sets of A and B values to each carry-save adder whereby further values of A and B may be accumulated with the number disposed in the sum and carry registers, a carry propagate adder, and means connecting the outputs of the sum and carry register as inputs to said carry propagate adder whereby a final sum may be derived from the numbers disposed in the sum and carry registers.

12. A device for adding a plurality of numbers including N carry-save adders wherein each carry-save adder has a plurality of positions with each position including a full adder having three inputs A, B and C, a sum output and a carry output where all high order A inputs starting with $A_n$ are identical and all high order B inputs starting with $B_n$ are also identical although the A and B inputs are not necessarily the same value, means interconnecting the carry-save adders whereby the sum outputs of the first carry-save adder are coupled to corresponding positions as inputs to the second carry-save adder and the carry outputs of the first carry-save adder are coupled as inputs to the second carry-save adder shifted one position, the second carry-save adder having its outputs connected in like fashion to the third carry-save adder and each succeeding carry-save adder being connected in like fashion to the adjacent succeeding carry-save adder, a sum register and a carry register each having inputs and outputs, any adder position in each carry-save adder which always has one of its three inputs equal to zero or the complement of zero is omitted and its other two inputs are entered selectively into the corresponding position of another carry-save adder, the sum register or the carry register, and means to provide all of the remaining highest order B bits of certain carry-save adders with the value $$D = (A_n \veebar B_n)\overline{C}_n \vee AB$$

and means connecting the sum outputs of the Nth carry-save adder as inputs to the sum register and the carry outputs of the Nth carry-save adder as inputs to said carry register.

13. A device for adding a plurality of numbers including N carry-save adders wherein each carry-save adder has a plurality of positions with each position including a full adder having three inputs A, B and C, a sum output and a carry output where all high order A inputs starting with $A_n$ are identical and all high order B inputs starting with $B_n$ are also identical although the A and B inputs are not necessarily the same value, means interconnecting the carry-save adders whereby the sum outputs of the first carry-save adder are coupled to corresponding positions as inputs to the second carry-save adder and the carry outputs of the first carry-save adder are coupled as inputs to the second carry-save adder shifted one position, the second carry-save adder having its outputs connected in like fashion to the third carry-save adder and each succeeding carry-save adder being connected in like fashion to the adjacent succeeding carry-save adder, a sum register and a carry register each having inputs and outputs, any adder position in each carry-save adder which always has one of its three inputs equal to zero or the complement of zero is omitted and its other two inputs are entered selectively into the corresponding position of another carry-save adder, the sum register or the carry register, means to provide all of the remaining highest order B bits of certain carry-save adders with the value $$D = (A_n \mathbin{\underline{\vee}} B_n) \overline{C}_n \vee AB$$

means connecting the sum outputs of the Nth carry-save adder as inputs to the sum register and the carry outputs of the Nth carry-save adder as inputs to said carry register, means selectively connecting the outputs of the sum register and the outputs of the carry register as inputs to the first carry-save adder, a carry-propagate adder and means selectively connecting the outputs of the sum register and the outputs of the carry register to said carry-propagate adder whereby a complete summation is obtained of the numbers held in the sum and carry registers.

14. A device for adding a plurality of numbers including N carry-save adders wherein each carry-save adder has a plurality of positions with each position including a full adder having three inputs A, B and C, a sum output and a carry output, each full adder including means to provide a sum $S = (A \mathbin{\underline{\vee}} B) \mathbin{\underline{\vee}} C$ and a carry $$R = (A \mathbin{\underline{\vee}} B) C \vee AB$$

the highest order position of each of said carry-save adders except the first carry-save adder including means to provide a sum $S = (A \mathbin{\underline{\vee}} B) \mathbin{\underline{\vee}} C$ and a carry $$D = (A \mathbin{\underline{\vee}} B) \overline{C} \vee AB$$

each carry-save adder being shifted at least one position with respect to the preceding carry-save adder, and means interconnecting the carry-save adders whereby the sum outputs of the first carry-save adder are coupled directly as inputs to the second carry-save adder and the carry outputs of the first carry-save adder are coupled as inputs to the second carry-save adder shifted one position, the second carry-save adder having its outputs connected in like fashion to the third carry-save adder and each succeeding carry-save adder being connected in like fashion to the adjacent succeeding carry-save adder.

15. A device for adding a plurality of numbers including N carry-save adders wherein each carry-save adder has a plurality of positions with each position including a full adder having three inputs A, B and C, a sum output and a carry output, each full adder including means to provide a sum $S = (A \mathbin{\underline{\vee}} B) \mathbin{\underline{\vee}} C$ and a carry $$R = (A \mathbin{\underline{\vee}} B) C \vee AB$$

the highest order position of each of said carry-save adders except the first carry-save adder including means to provide a sum $S = (A \mathbin{\underline{\vee}} B) \mathbin{\underline{\vee}} C$ and a carry $$D = (A \mathbin{\underline{\vee}} B) \overline{C} \vee AB$$

each carry-save adder being shifted at least one position with respect to the preceding carry-save adder, means interconnecting the carry-save adders whereby the sum outputs of the first carry-save adder are coupled directly as inputs to the second carry-save adder and the carry outputs of the first carry-save adder are coupled as inputs to the second carry-save adder shifted one position, the second carry-save adder having its outputs connected in like fashion to the third carry-save adder and each succeeding carry-save adder being connected in like fashion to the adjacent succeeding carry-save adder, a sum register and a carry register each having inputs and outputs, means coupling the sum outputs of said Nth carry-save adder as inputs to said sum register, means coupling the carry outputs of said Nth carry-save adder as inputs to said carry register, means coupling the sum outputs of selected adder positions in said carry-save adders as inputs to corresponding positions of said sum register, means coupling the carry outputs of selected adder positions in said carry-save adders as inputs to corresponding positions of said carry register.

16. A device for adding a plurality of numbers including N carry-save adders wherein each carry-save adder has a plurality of positions with each position including a full adder having three inputs A, B and C, a sum output and a carry output, each full adder including means to provide a sum $S = (A \mathbin{\underline{\vee}} B) \mathbin{\underline{\vee}} C$ and a carry $$R = (A \mathbin{\underline{\vee}} B) C \vee AB$$

the highest order position of each of said carry-save adders except the first carry-save adder including means to provide a sum $S = (A \mathbin{\underline{\vee}} B) \mathbin{\underline{\vee}} C$ and a carry $$D = (A \mathbin{\underline{\vee}} B) C \vee AB$$

each carry-save adder being shifted at least one position with respect to the preceding carry-save adder, means interconnecting the carry-save adders whereby the sum outputs of the first carry-save adder are coupled directly as inputs to the second carry-save adder and the carry outputs of the first carry-save adder are coupled as inputs to the second carry-save adder shifted one position, the second carry-save adder having its outputs connected in like fashion to the third carry-save adder and each succeeding carry-save adder being connected in like fashion to the adjacent succeeding carry-save adder, a sum register and a carry register each having inputs and outputs, means coupling the sum outputs of said Nth carry-save adder as inputs to said sum register, means coupling the carry outputs of said Nth carry-save adder as inputs to said carry register, means coupling the sum outputs of selected adder positions in said carry-save adders as inputs to corresponding positions of said sum register, means coupling the carry outputs of selected adder positions in said carry-save adders as inputs to corresponding positions of said carry register, a carry propagate adder, means selectively connecting the outputs of said sum register and said carry register as inputs to the first carry-save adder along with additional sets of A and B values to each carry-save adder whereby further values of A and B may be added to the numbers held in the sum and carry registers, and means selectively connecting the sum and carry outputs of the respective sum and carry registers to the carry propagate adder whereby a final sum may be produced from the numbers held in said sum and carry registers.

References Cited by the Examiner

UNITED STATES PATENTS

| | | | |
|---|---|---|---|
| 2,641,407 | 6/1953 | Dickinson | 235—159 |
| 2,693,907 | 11/1954 | Tootill | 235—176 |
| 2,765,115 | 10/1956 | Beloungie | 235—176 |
| 2,924,383 | 2/1960 | Weiss | 235—159 |
| 3,115,574 | 12/1963 | Paul et al. | 235—176 |

OTHER REFERENCES

Pages 48–65, 1959, Erich Block, The Engineering Design of the Stretch Company, published in the Proceedings of the EJCC.

ROBERT C. BAILEY, *Primary Examiner.*

CORNELIUS D. ANGEL, WALTER W. BURNS, JR.,
*Examiners.*

K. R. STEVENS, G. D. SHAW, *Assistant Examiners.*